US005745640A

United States Patent [19]

Ishii et al.

[11] Patent Number: 5,745,640

[45] Date of Patent: Apr. 28, 1998

[54] AV DATA BASE FOR VTR

[75] Inventors: Toshiyuki Ishii; Kousuke Misono, both of Kanagawa; Seiichi Misawa, Saitama; Joji Fukuda; Tetsuo Nishigaki, both of Kanagawa; Kiyoshi Ota, Tokyo, all of Japan

[73] Assignee: Sony Corporation, Tokyo, Japan

[21] Appl. No.: 443,373

[22] Filed: May 17, 1995

Related U.S. Application Data

[62] Division of Ser. No. 383,614, Feb. 2, 1995, abandoned, which is a division of Ser. No. 643,207, Jan. 18, 1991, abandoned.

[30] Foreign Application Priority Data

Jan. 21, 1990 [JP] Japan .................................... 2-010864

[51] Int. Cl.[6] ................................ H04N 5/91; H04N 7/00

[52] U.S. Cl. ................................................ 386/83; 386/46

[58] Field of Search .................................... 358/335, 342, 358/310, 3.1; 360/32, 33.1; 348/211, 734; 386/46, 83, 1; H04N 5/91, 7/00

[56] References Cited

U.S. PATENT DOCUMENTS

| | | |
|---|---|---|
| 4,213,163 | 7/1980 | Lemelson . |
| 4,224,644 | 9/1980 | Lewis . |
| 4,425,586 | 1/1984 | Miller . |
| 4,426,684 | 1/1984 | Sechet et al. . |
| 4,519,003 | 5/1985 | Scholz . |
| 4,587,577 | 5/1986 | Tsunoda . |
| 4,634,386 | 1/1987 | Tamak . |
| 4,641,205 | 2/1987 | Bexers, Jr. . |
| 4,656,536 | 4/1987 | Furumoto et al. . |
| 4,675,753 | 6/1987 | Takayama et al. . |
| 4,689,022 | 8/1987 | Peers et al. . |
| 4,796,107 | 1/1989 | Hiraki . |
| 4,796,223 | 1/1989 | Sugita et al. . |
| 4,807,060 | 2/1989 | Takahashi et al. . |
| 4,841,386 | 1/1989 | Schiering . |
| 4,899,233 | 2/1990 | Yoshidon . |
| 4,939,598 | 7/1990 | Kulakowski et al. . |
| 4,942,488 | 7/1990 | Osawa . |
| 4,977,455 | 12/1990 | Young . |
| 5,032,927 | 7/1991 | Watanabe et al. ........................ 386/43 |
| 5,038,231 | 8/1991 | Harigaya et al. . |
| 5,047,867 | 9/1991 | Strubbe et al. . |
| 5,274,617 | 12/1993 | Terashima et al. ....................... 369/54 |

FOREIGN PATENT DOCUMENTS

| | | |
|---|---|---|
| 0 323 890 | 7/1989 | European Pat. Off. . |
| 2 507 045 | 12/1982 | France . |
| 33 42 520 | 6/1984 | Germany . |
| 35 04 354 | 8/1985 | Germany . |
| 38 18 801 | 12/1989 | Germany . |
| 1 137 466 | 5/1989 | Japan . |
| 2 083 364 | 3/1982 | United Kingdom . |
| 2 131 221 | 6/1984 | United Kingdom . |
| WO 88/05955 | 8/1988 | WIPO . |

OTHER PUBLICATIONS

Tooru Ariga, Auxiliary Memory Device, *Patent Abstracts of Japan*, vol. 9 No. 262 (P-398) [1985] Oct. 19, 1985.

*Primary Examiner*—Robert Chevalier
*Attorney, Agent, or Firm*—Frommer Lawrence & Haug LLP; William S. Frommer

[57] ABSTRACT

In a recording and reproducing apparatus having at least one program recorded to recording tracks on a recording medium, management database is recorded on the recording tracks with the program so as to form a management database recording field. The management data is reproduced on being loaded the recording medium to the recording and reproducing apparatus to manage each program recorded on the recording tracks. In the case of video tape recorder, the management data is recorded on video recording tracks, audio recording tracks and/or a control signal recording tracks. therefore, to cover in the appended claims all such changes and modifications as fall within the true spirit and scope of the invention.

3 Claims, 31 Drawing Sheets

| ITEM | CONTAIN | BYTE |
|---|---|---|
| A 1 | FORMAT VERSION | 1 |
| A 2 | NUMBER OF TIMES RECORDING | 1 |
| A 3 | NUMBER OF PICTURES USED | 1 |
| A 4 | NUMBER OF PROGRAMS USED | 1 |
| A 5 | DATE OF CREATION | 5 |
| A 6 | DATE OF UPDATE | 5 |
| A 7 | SYSTEM VOLUME NUMBER | 8 |
| A 8 | SCREEN DISPLAY COLOR | 2 |
| A 9 | VARIOUS FLAGS | 1 |
| A 10 | TYPE OF VIDEO CASSETTE | 2 |
| A 11 | PASS WORD | 2 |
| A 12 | USER VOLUME NUMBER | 2 |
| A 13 | REPRODUCING ORDER | 32 |
| A 14 | RECORDING ORDER | 32 |
| A 15 | VOLUME LABEL | 40 |

$D_{VMX}$

FIG.5

| ITEM | CONTAIN | BYTE |
|---|---|---|
| B 1 | START ADRESS | 3 |
| B 2 | END ADDRESS | 3 |
| B 3 | VARIOUS FLAGS | 1 |
| B 4 | SYSTEM PROGRAM NUMBER | 1 |
| B 5 | PROGRAM NUMBER | 1 |
| B 6 | CATEGORY CODE | 1 |
| B 7 | INPUT SOURCE | 1 |
| B 8 | RECORDING/ OPERATION MODE | 1 |
| B 9 | RECORDING START TIME | 5 |
| B 1 0 | RECORDING END TIME | 2 |
| B 1 1 | PRESET RECORDING CONTROL INFORMATION | 10 |
| B 1 2 | TITLE | 40 |

$D_{PRX}$

FIG.6

TBL

| | | | | | | | | | | |
|---|---|---|---|---|---|---|---|---|---|---|
| TODAY | TOMORROW | DAYAFTER TOMORROW | MONTH | 1 | 2 | 3 | 0 | BS | DISPLAY | STOP... |
| NEXT WEEK | EVERY WEEK | EVERY DAY | DAY | 4 | 5 | 6 | βIII | LINE | CHANGE | CALENDAR |
| SUNDAY | MONDAY | TUESDAY | IN THE MORNING | 7 | 8 | 9 | O'CLOCK | CABLE | CANCEL | • |
| WEDNESDAY | THURSDAY | FRIDAY | IN THE AFTERNOON | 10 | 11 | 12 | MINUTE | ch | CONTINUE TILL | RECORD PRESETTING |
| SATURDAY | FROM | TILL | THE PROGRAM OF | OF | AT | TO | BETWEEN | YES | NO | END |

FIG.11

| | ADP1 | ADP2 | ADP3 | CH1,CH2 |

| | VDP1 | VDP2 | VDP3 | TA,TB |

| CT$_{DAV}$ | CT$_{P1}$ | CT$_{P2}$ | CT$_{P3}$ | TCT |

| | ADP1 | ADP2 | ADP3 | CH1,CH2 |

| VD$_{DAV}$ | VDP1 | VDP2 | VDP3 | TA,TB |

| MK$_0$ CT$_0$ | MK$_{P1}$ CT$_{P1}$ | MK$_{P2}$ CT$_{P2}$ | MK$_{P3}$ CT$_{P3}$ | TCT |

TBL

| | | | | | | | |
|---|---|---|---|---|---|---|---|
| | VTR PRESET 12 AV DATABASE | | | | | | POWER END |
| TODAY 1 | TOMO-RROW 2 | EVERY DAY 3 | β II MONTH DISPLA | β III ch AV◁◁ | RECORD PRESET. AV ▷ | | AV . ▷▷ |
| NEXT 4 | EVERY WEEK 5 | SUN 6 | DAY ANT TV/VTR | | DISPLAY. □ | | AFTER N. AT AV ×2 |
| MON 7 | TUE 8 | WED 9 | OF MAIN/S | PRO.OF AV-REC REC | CANCEL. AV ‖ ‖ | | |
| THUS 0 10 | FRI HOUR 11 | SAT MINUTE 12 | FROM INDEX | TO AV ◁‖ | | YES. AV ‖▷ | NO. AV ×1/5 |

FIG.28

TBL — AV DATABASE

| | | | | | | | END |
|---|---|---|---|---|---|---|---|
| 1 | 2 | 3 | DISPLA | AV ◁▽ | AV △ | | AV △△ |
| 4 | 5 | 6 | ANT TV/VTR | | □ | | AV ×2 |
| 7 | 8 | 9 | MAIN/S | AV-REC REC | == | | |
| 10 | 11 | 12 | INDEX | AV ◁= | | AV ==△ | AV ×1/5 |

| TBL | | | | | |
|---|---|---|---|---|---|
| | PRESET.1 | | | | END |
| 1 | 2 | 3 | MONTH | ch | REC. RESER. AV | AV . |
| 4 | 5 | 6 | DAY | | DISPLAY. | AFTERN. |
| 7 | 8 | 9 | OF | PRO.OF | CANSEL. | |
| | 0 | HOUR | MIN | FROM | TO | YES. | NO. |

TBL

| | | | | | | | |
|---|---|---|---|---|---|---|---|
| | PRESET 2 | | | | | | END |
| TODAY | TOMMO-RROW | EVERY DAY | β II | β III | RECORD PROC. | | • |
| NEXT WEEK | EVERY WEEK | SUN | DAY | | DISPLAY. | | AFTER N. |
| MON | TUE | WED | OF | PRO.OF | CANCEL. | | |
| THUS | FRI | SAT | FROM | TO | | YES. | NO. |

FIG.32

AV DATA BASE FOR VTR

This application is a divisional of application of Ser. No. 08/383,614 filed Feb. 2, 1995 now abandoned and which is a division of application Ser. No. 07/643,207, filed Jan. 18, 1991 now abandoned.

BACKGROUND OF THE INVENTION

The present invention relates to a recording and reproducing apparatus and more particularly to a recording and reproducing apparatus which provides substantially easier control over the programs recorded or preset to be recorded on recording medium.

There have been a tape recorder of above-described type disclosed in U.S. Pat. No. 4,224,644.

In conventional video tape recorders for household use, a plurality of programs are recorded on a video tape in the running direction thereof, and a cue signal is recorded at the beginning of each program. When the user wants to reproduce a given program from the recorded video tape, a series of operations need to be carried out: putting the video tape recorder in search mode, forwarding the tape fast up to the position where the cue signal of the program is located and may be reproduced from, putting the video tape recorder in reproducing mode, and reproducing the tape to see if the program reached is indeed the one desired.

With the above-described conventional video tape recorders, the data about a plurality of programs recorded on the video tape is actually located at the beginning of each individual program. This arrangement involves one disadvantage. That is, whenever the user wants to see 1 if a desired program is indeed recorded, wants to determine the program to be reproduced, wants to search for another program, or want to overwrite a new program onto a previously recorded program it is necessary to undergo the chores of repeatedly forwarding fast and reproducing the video tape on the video tape recorder in search of the desired program, for a considerable period of time, until the desired program is located and accessed.

In addition, the prior art video tape recorders only detect, as program-describing data, the position of each program recorded on the video tape when in search therefore. Thus when it is necessary to use fairly complicated data such as timer presetting data, there arises a need to utilize a method whereby presetting data is written to a timer preset memory separately provided.

However, using the above method fails to preserve the data specific to each of the individual video tapes because the timer preset memory is common to all video tapes used. So the presetting data above cannot be used as control data about the individual programs.

If the user wants to control a large number of recorded or unrecorded video tapes or to have control over a program in "series" recorded on a plurality of video tapes, keeping a record of these tapes is a time-consuming and tiresome task. That task involves writing beforehand, onto labels of the video cassettes and cassette cases, control data as to the contents of the programs recorded on the tape, the recording times of these programs, and the preferences for preserving or not preserving each recorded program.

The more programs and video tapes to be recorded or preset, the more troublesome and complicated the chores involved in writing down the control data thereabout, reading the data and making decisions based on the data. An acute need has been recognized to simplify as much as possible the necessary operations and record-keeping activities.

Especially, if a plurality of programs constituting, for example, a serial drama were recorded in a random order on one tape, viewing these programs later in the correct order requires the user to repeatedly carry out the chores described above so as to access each program. These aspects of the conventional devices are an inconvenience that has long annoyed their users.

The present invention relates to a recording and reproducing apparatus and, more particularly, to a video tape recorder for household use.

The typical conventional video tape recorder uses a detection head (called the control head) to detect the position data (cue signal) of any program recorded on the video tape in the running direction thereof. If a plurality of programs are recorded on the video tape and if any of the programs is desired to be reproduced, the cue signal of the target program is searched for and reached.

Thus when any of the multiple programs recorded on the video tape is to be singled out and overwritten with a new program, the conventional video tape recorder reaches the target program by searching for its cue signal, and starts recording the new program onto the tape field containing the target program.

The conventional video tape recorder has the erase head located upstream of the magnetic head for recording and reproducing video signals and the control head downstream thereof in the running direction of the video tape. In operation, the downstream control head searches through program cue signals for the one corresponding to the target program. With the target program located, the erase head erases it sequentially and the downstream magnetic head records the new program in its place.

The fact that the erase head is located upstream of the control head in the conventional video tape recorder involves one disadvantage. That is, where the tape field containing the program to be erased is followed by a field containing a program to be preserved, the upstream erase head tends to erase the position data (cue signal) of the subsequent program field before the downstream detection head can detect the position data thereof. The inadvertent erasure of the position data can cause the program that should be preserved to be erased following the preceding program from the video tape.

Household electronic appliances of the above-described type allow the user to record or preset the recording of at least one broadcast program desired. Using the preset data, the appliances execute sophisticated functions of diverse kinds. A number of ways have been devised to make the input of program presetting data easier. for example, switches for setting necessary items are provided so as to be manually operated, and a bar code reading means is used to input the necessary data.

Conventional preset data input means have one disadvantage in common. That is, these household use devices have their recording-related operations designated in machine-oriented terms. The items required by the machine are represented in characters and/or symbols which are arranged on an operation panel. The user at the operation panel selects and specifies one or a plurality of these items as needed.

These, specification items are established as such on the assumption that the user has a certain level of understanding of the functions and the structure regarding the device in question (i.e., a working knowledge of the basics, expressed in such terms as "Recording Start Time," "Recording End Time" and "Input," which are explained in the instruction manual). In other words, those who have difficulty understanding such fundamentals about the device they want to operate may not be able to correctly input the program presetting data required.

SUMMARY OF THE INVENTION

In view of the foregoing, an object of this invention is to provide a recording and reproducing apparatus in which substantially simplifies the steps that the user carries out in controlling programs to be preset or recorded.

Another object of the invention is to provide a recording and reproducing apparatus in which recognizes the recording area containing data about all programs recorded on a video tape as recording medium before the tape is actually forwarded fast or otherwise manipulated, thereby readily accessing any desired program on the tape in the shortest possible time.

Another object of the invention is to provide a data recording and reproducing apparatus which will be a convenient, easy-to-use solution to the above-described inconvenience of the conventional apparatus.

Another object of the invention is to provide a recording and reproducing apparatus capable of overwriting a new program onto the desired program recorded field alone from among a plurality of program recorded fields on the video tape.

The foregoing objects and other objects of the invention have been achieved by the provision of A video tape recorder having at least one program recorded to video recording tracks and audio recording tracks on a video tape; wherein a management database recording field is formed at a predetermined position on the video recording tracks, or on the audio recording tracks, or on control signal recording tracks, the management database recording field having management data recorded thereto, the management data corresponding to said program, the management data being used to control each program recorded on said video tape, a video tape recorder for recording at least one program onto a video tape; wherein the address data representing the recording start point of the program is recorded to the tape top part of the video tape, whereby the recorded position of the program on the video tape is controlled in a concentrated manner, a data recording and reproducing apparatus for recording management data to management database recording fields located in recording tracks of a recording medium, the apparatus utilizing the management data in the management database recording fields to control the data recorded in the recording tracks or in areas with reference to the recording tracks; wherein reproduction order data representing the order in which to reproduce the recorded data is recorded to the management database recording fields, a recording and reproducing apparatus containing a recording head means for sequentially recording at least one program on a recording medium in the running direction thereof, the recorded program having the data of the position thereof recorded by the recording head means into a control signal recording track formed on the recording medium in the running direction thereof, the program and the position data being erased by an erase head means in recording mode from the recording medium in the running direction thereof, the erasure being followed by recording of a new program and the position data there onto the recording medium in the running direction thereof through the use of the recording head means in the recording mode, wherein comprises:

a control head means for reading the position data, the control head means being located upstream of the erase head means in the running direction of the recording medium, a data recording and reproducing apparatus having management data recorded to a management database recording field in recording tracks of a recording medium, the control data being used by the apparatus to manage the data recorded in the recording tracks, a data input device comprising: a data input means to which specification items are assigned, the data input device writing the management data to the management database recording field when the data input means is specified.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 1 including

FIGS. 4 through 6 are schematic and tabular representations of the control database used by the embodiment;

FIG. 7 including

FIGS. 8 including

FIG. 11 is a tabular representation of the language-based items to be specified by the user;

FIG. 12 including

FIG. 18 including

FIG. 19 including FIG. 19A–19C is a schematic diagram of another recording format on the video tape for use with another embodiment;

FIGS. 20A through 22C are schematic diagrams of other recording formats on the video tape for use with other embodiments;

FIG. 23 including

FIG. 24 including

FIG. 26 including

FIG. 27 including FIGS. 28 through 32 are tabular representations showing other embodiments of the remote controller.

DETAILED DESCRIPTION OF THE INVENTION

Preferred embodiments of this invention will be described with reference to the accompanying drawings.

[1] First Embodiment (1) Overall Construction of the Video Tape Recorder

Figure 1A:
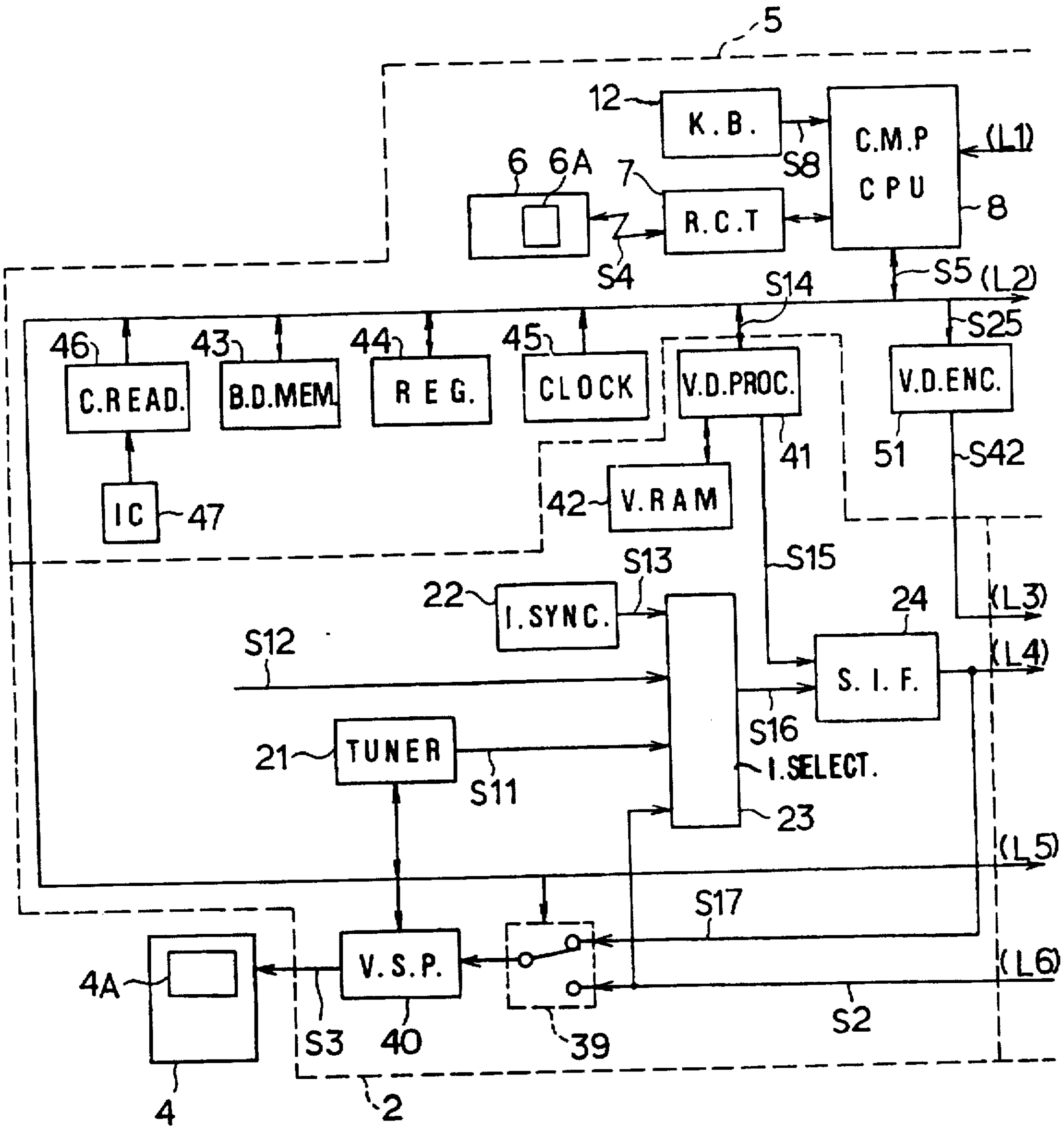
FIG. 1A–1B is a block diagram of the video tape recorder in its entirety as embodied according to the invention.
Figure 1B:
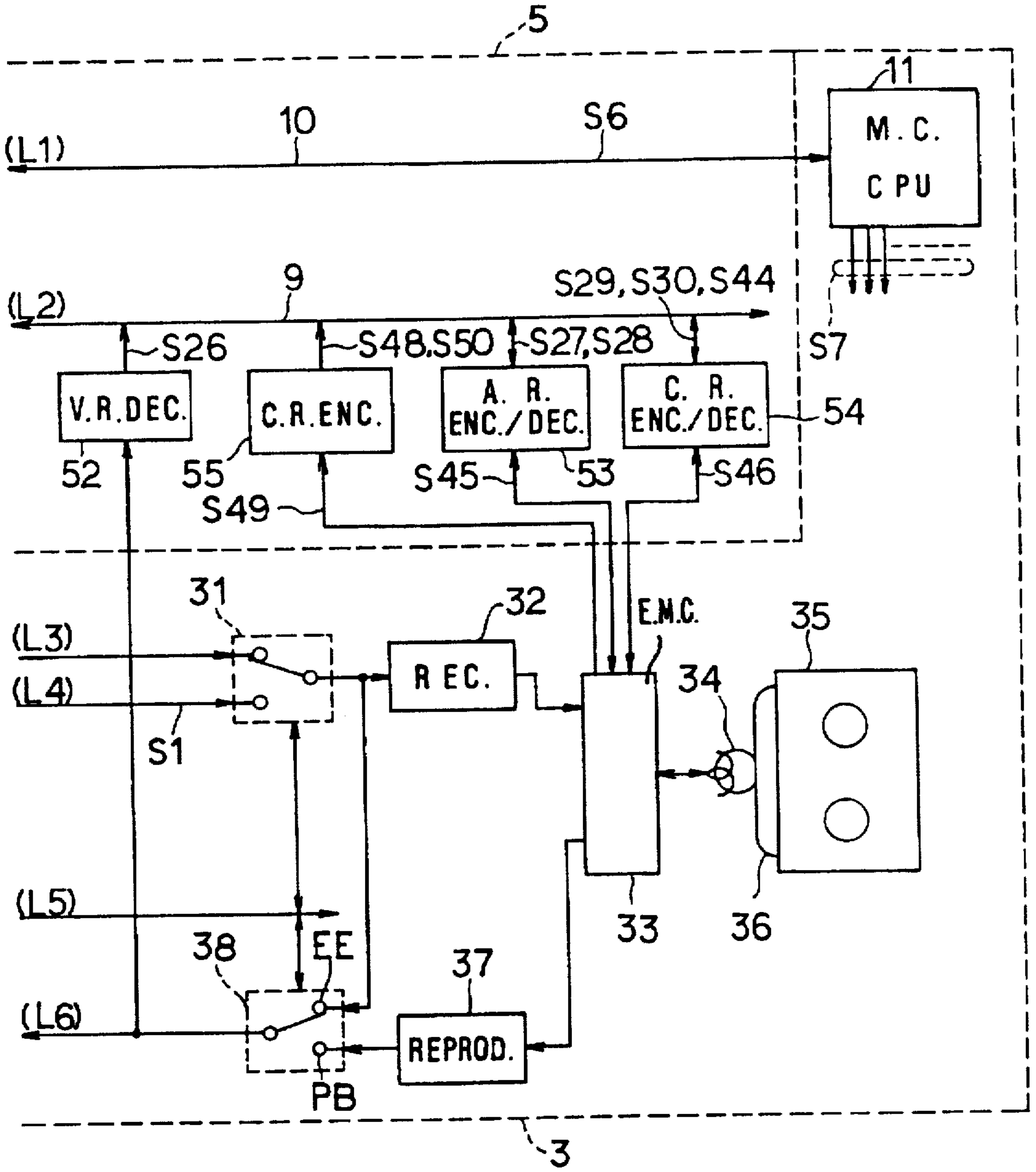

In FIG. 1, reference numeral 1 is a video tape recorder (VTR) in which a recording video signal S1 input through a video signal processing unit 2 is supplied to a video tape recorder unit 3 to be recorded thereby. A reproduced video signal S2 is supplied to a monitor 4 as a video output signal S3 through the video signal processing unit 2.

In addition, a control management data processing unit 5 is provided. An I/O data signal S4 is given by a remote controller 6 and supplied to a control management data processing CPU 8 through a remote control transceiver 7. In turn, the CPU 8 places control data S5 onto a bus 9 for control over circuit elements constituting the video signal processing unit 2 and the video tape recorder unit 3. Control data S6 is exchanged between a mechanism control CPU 11 of the video tape recorder unit 3 and the control management data processing CPU 8 via a bus 10. The exchange produces a control signal S7 for control over mechanisms constituting the video tape recorder unit 3.

The video signal processing unit 2 supplies a superimpose fader circuit 24 with a received video signal S11, an external line video signal S12 and an internal synchronizing signal S13 through an input selection circuit 23. The signal S11 is received by a tuner 21, the signal S12 is fed over an input line from an external video signal source, and the signal S13 is generated by an internal synchronizing circuit 22. This arrangement causes the recording video signal S1 to appear at the output end of the superimpose fader circuit 24.

The recording video signal S1 is supplied to a recording circuit 32 via a recording switchover circuit 31. In recording mode, the signal S1 is forwarded from the recording circuit 32 through an electromagnetic conversion circuit 33 to a magnetic head 34 which records the signal onto a video tape 36 in a video cassette 35.

The video signal thus recorded on the video tape 36 is picked up in reproducing mode by a reproducing circuit 37 through the magnetic head 34 and the electromagnetic conversion circuit 33. The reproduction circuit 37 then sends the video signal via a reproduction switchover circuit 38 to the video signal processing unit 2.

The reproduced video signal S2 passes through an output selection circuit 39 and is converted by a video processing circuit 40 into a video output signal S3 for display onto a display screen 4A of the monitor 4.

The control management data processing CPU 8 in the control data processing unit 5 processes the basic data stored in a ROM-type basic data memory 43 and the processing data stored in a RAM-type register 44. The processing is performed based on the I/O data signal S4 coming from the remote controller 6 or on an input data signal S8 from a VTR keyboard 12 in synchronization with a clock signal from a clock circuit 45. Thus the control data S5 and S6 are placed onto the buses 9 and 10.

In this embodiment, the bus 9 is connected to a card reader 46. The control management data processing CPU 8 may supply the register 44 with the basic data which the card reader 46 has read from an IC card 47.

There may arise a need to inform the user of the result of the processing done by the control management data processing CPU 8. In that case, the control management data processing CPU 8 supplies a video display processor 41 with a video display data signal S14 as part of the control data S5. A video display signal S15 is read from a video RAM 42 based on the video display data signal S14 and is sent to the superimpose fader circuit 24. The video display signal S15 is superimposed onto a video signal S16 given by the input selection circuit 23. This produces a superimpose output signal S17 which is supplied to the video processing circuit 40 via the output selection circuit 39. The video processing circuit 40 displays, on the screen 4A of the monitor 4, an image on which the video signal comprising characters, diagrams and other indications is superimposed. The display provides an interactive interface for the user.

While displaying the image comprising characters and diagrams on the screen 4A of the monitor 4, the control management data processing CPU 8 of this embodiment also supplies the remote controller 6 with the video signal representing the same image via the remote control transceiver 7 as the I/O data signal S4. This arrangement causes the same image as that on the screen 4A of the monitor 5 to appear on a display screen 6A of the remote controller 6.

The control management data processing CPU 8 records write control data S25 to a video recording track of the video tape 36. The write control data S25, part of the control data S5 and associated with the recording and reproduction of the video tape recorder unit 3, is forwarded through a video recording encoder 51, the recording switchover circuit 31, the recording circuit 32 and the electromagnetic conversion circuit 33, in that order, before reaching the track. When control data is read from the video recording track via the electromagnetic conversion circuit 33, reproducing circuit 37 and reproducing switchover circuit 38, the data is supplied to the control management data processing CPU 8 as read control data S26 through a video recording decoder 52 and the bus 9.

The control management data processing CPU 8 of this embodiment also supplies the electromagnetic conversion circuit 33 with write control data S27 via an audio recording encoder decoder 53, the data S27 being the same as the write control data S25 fed to the video recording encoder 51. This allows management data $D_{AV}$ to be recorded onto audio recording tracks CH1 and CH2 on the video tape 36 through the magnetic head 34. At the same time, the management data $D_{AV}$ is read from the audio tracks CH1 and CH2 by the electromagnetic conversion circuit 33 using the magnetic head 34 and sent to an audio recording encoder/decoder 53. Thus the management data is supplied to the control management data processing CPU 8 as read management data S28.

Furthermore, the control management data processing CPU 8 of this embodiment supplies the electromagnetic conversion circuit 33 with write management data S29 via a CTL recording encoder/decoder 54, the data S29 being the same as the write management data S25 fed to the video recording encoder 51. This allows management data $D_{AV}$ to be recorded onto the control signal recording track TCT on the video tape 36 through a first control head 34D (FIG. 13) of the magnetic head 34. At the same time, the management data $D_{AV}$ is read from the control signal recording track TCT on the video tape 36 by the electromagnetic conversion circuit 33 using a first control head 34D (FIG. 13) and sent to the CTL recording encoder/decoder 54. Thus the management data is supplied to the control management data processing CPU 8 as read control data S30.

In addition, the control management data processing CPU 8 of this embodiment has the management data $D_{AV}$ read from the control signal recording track TCT on the video tape 36 by the electromagnetic conversion circuit 33 using a second control head 34A (FIG. 13) of the magnetic head 34 and sent to a CTL reproducing decoder 65. Thus the management data is supplied to the control management data processing CPU 8 as read management data S48.

(2) Function Blocks of the Video Tape Recorder

Figure 2:
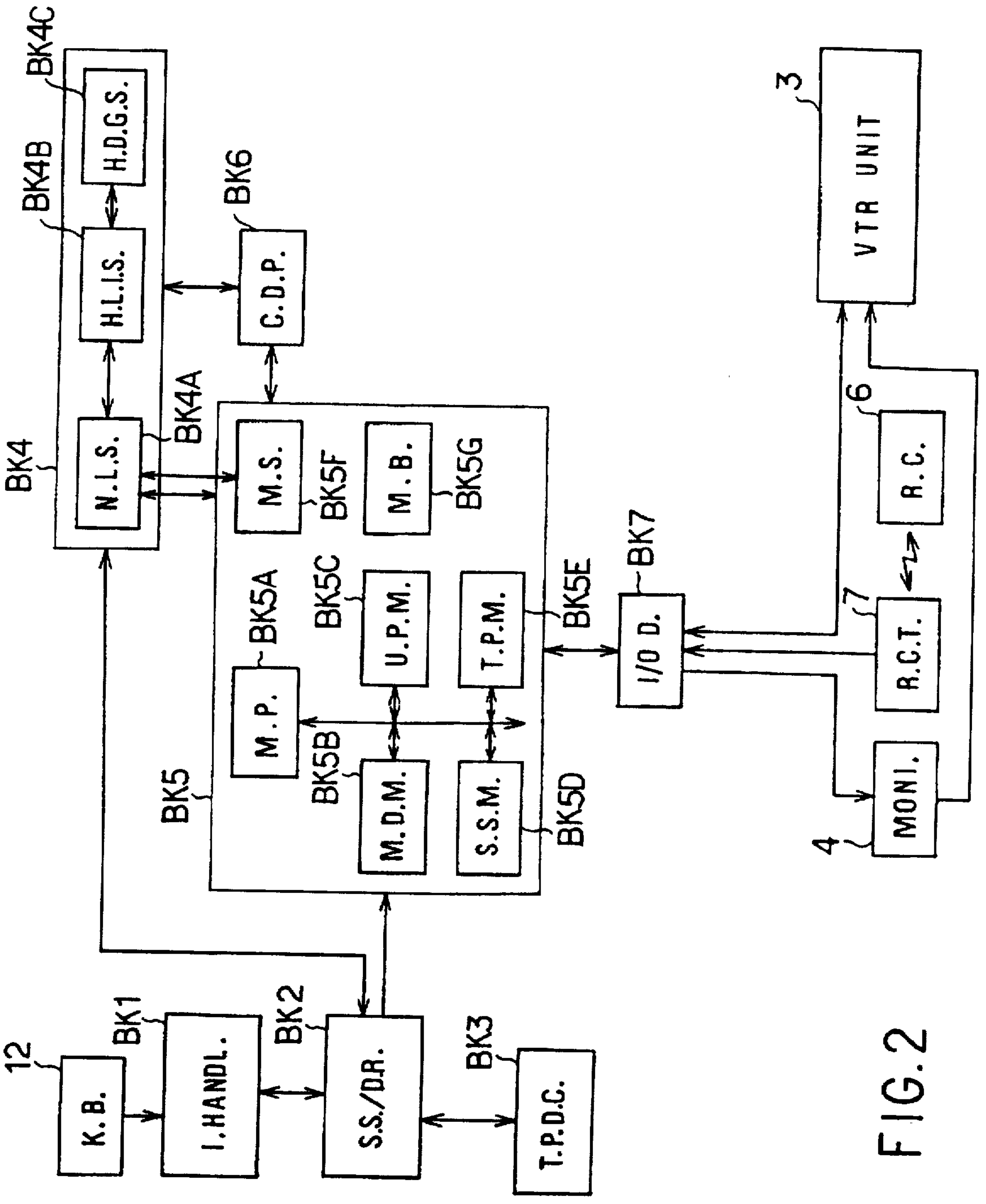
FIG. 2 is a function block diagram of the embodiment of FIG. 1.

The control management data processing CPU 8 controls the video tape recorder as a whole in accordance with the function blocks depicted in FIG. 2.

Referring to FIG. 2, the CPU 8 acts as an interrupt handling means in a block BK1 upon receipt of a command from the keyboard 12. Thereafter, the CPU 8 acts as a system scheduling means and a database retaining means in a block BK2. At this point, while controlling the entire system on a time series basis, the system scheduling means and database retaining means BK2 communicate with a timer preset database creating means in a block BK3 in order to execute the functions of an artificial intelligence module in a block BK4 and of an application processing means in a block BK5.

In the artificial intelligence module BK4, the CPU 8 interprets the contents of the command entered in natural language in accordance with the input command items expressed in natural language by a natural language system BK4A.

The CPU 8 infers and learns the habit of the user using a habit learning and inference system BK4B based on how the command is given in the applicable natural language. At the same time, the CPU 8 generates a habit database through the use of a habit database generation system BK4C.

In the application processing means BK5, the CPU 8 executes the functions of a management database module BK5B, a user preference module BK5C, a system setting module BK5D and a timer preset module BK54 using a module processing means BK5A.

In the application processing means BK5, the CPU 8 also provides a message display using a message system BK5F. At the same time, the CPU 8 causes the monitor 5 to perform its display in a monitor block BK5G.

In handling the artificial intelligence module BK4 and application processing means BK5, the CPU 8 processes a timer preset packet and flags in a common data area processing block BK6.

The processing in the application processing means BK5 is connected via an I/O driving means BK7 to the video tape recorder proper 3, the monitor 4, the remote control transceiver 7 and the remote controller 6 which are external devices.

(3) Recording Format of the Video Tape

Figure 3:
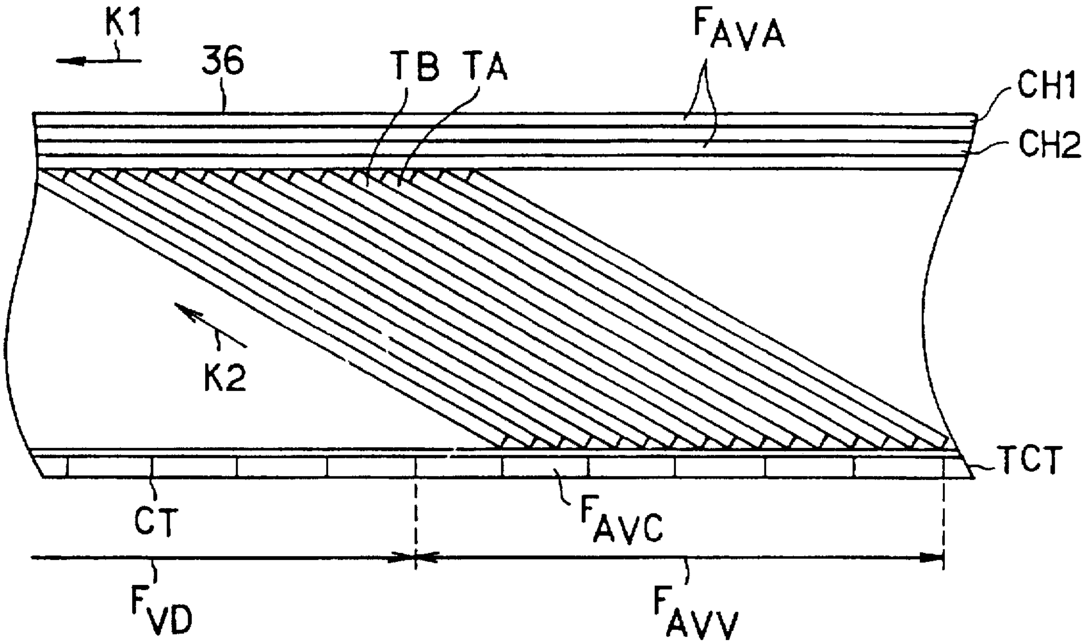
FIG. 3 is a schematic diagram of the recording format on the video tape for use with the embodiment.

As illustrated in FIG. 3, the video tape 36 contains video recording tracks TA and TB, a control signal (CTL) recording track TCT and audio recording tracks CH1 and CH2. The video recording tracks TA and TB have a different azimuth angle each, are formed diagonally relative to the tape running direction K1 and in the head scanning direction K2, and sequentially adjoin one another in the tape running direction K1. The CTL recording track TCT is formed at the outer fringe of the entry ends of the video recording tracks TA and TB in the running direction of the video tape 36. The audio recording tracks CH1 and CH2 are formed outside the exit ends of the video recording tracks TA and TB on the tape 36.

A recording start leader of the video tape 36 contains a management database video track recording field $F_{AVV}$ covering a predetermined number of video recording tracks TA and TB. The management database video track recording field $F_{AVV}$ is followed by a video signal recording field $F_{VD}$ with one field of video signal recorded onto each of the video recording tracks TA and TB.

Figure 4:
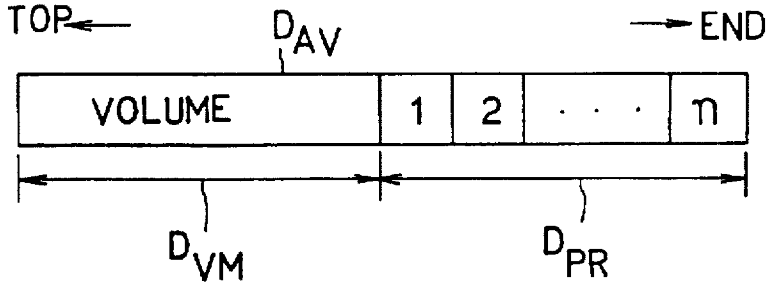

The management data $D_{AV}$ whose structure is shown in FIG. 4 is recorded onto each of the recording tracks TA and TB. The tracks TA and TB belong to the management database video track recording field $F_{AVV}$.

A management database audio track recording field $F_{AVA}$ is formed at a predetermined track position of, say, the tape top of the audio recording tracks CH1 and CH2. The management data $D_{AV}$, with its structure depleted in FIG. 4, is similarly recorded onto the management database audio track recording field $F_{AVA}$.

Furthermore, a management database control signal track recording field $F_{AVC}$ is formed at a predetermined track position of, say, the tape top of the control signal recording track TCT. The management data $D_{AV}$ whose structure is described in FIG. 4 is likewise recorded onto the management database control signal track recording field $F_{AVC}$.

The management data $D_{AV}$ comprises a volume data block $D_{VM}$ and a program data block $D_{PR}$ recorded in that order from the top side of recording tracks.

The volume data block $D_{VM}$ contains management data about the video cassette 35 loaded in the video tape recorder proper 3. For example, the volume data block $D_{VM}$ is constituted by items A1–A15 in 135 bites, as illustrated in FIG. 5.

Referring to FIG. 5, the data in the item A1 represents a format version. The version number of the current management data $D_{AV}$ is recorded in one byte. When the video cassette 35 is loaded, the format version is identified according to this item. This sets up the system to process any old version of the management data $D_{AV}$ that may be encountered.

The item A2 indicates the number of times recording is carried out. For example, this item retains in one byte the number of times the management data $D_{AV}$ is recorded onto the control database audio track recording field $F_{AVA}$. Thus the number of times the management data $D_{AV}$ is recorded using an audio system recording method is recorded for subsequent reference.

The item A3 indicates the number of PICTURES used. For example, this item retains in one byte the number of pictures used when the management data $D_{AV}$ is recorded onto the video cassette 35. The number is identical to the number of recording tracks occupied by the management database video track recording field $F_{AVV}$. This allows the system to determine the position of the first track in the video signal recording field $F_{VD}$.

The item A4 indicates the number of programs used. For example, this item retains in one byte the number of programs preset or recorded on the video cassette 35 as well as the availability of the recording space thereon.

In this embodiment, bits 0–6 are used to indicate up to a count of 32 programs to be preset or recorded. Bit 7 is used to indicate the availability of any more recording space (recording space available if set to 0; not available if set to 1). This bit arrangement makes it possible to detect the unavailability of the recording space on the video tape if fewer than 32 programs preset or recorded take up all available recording space because of the tape length constraints or due to the extended program lengths.

The item A5 indicates the data of creation. For example, this item retains in five bytes the data on which the control data $D_{AV}$ was first written to the video cassette 35.

With this embodiment, bytes 1 through 6 retain minutes, hours, day, month and year, respectively, in a two-digit binary-coded decimal number each. This allows the system to determine how old the video cassette 35 is with reference to the volume data $D_{VM}$ in the item A5 indicating the date of creation.

The item A6 indicates the date of update. For example, this item retains in five bytes the date on which the management data $D_{AV}$ was updated.

With this embodiment, bytes 1 through 5 retain minutes, hours, day, month and year, respectively, in a binary-coded decimal number each. This allows the system to find out when the currently used management data $D_{AV}$ was last altered.

The item A7 indicates a system volume number. For example, this item retains in eight bytes the current serial number, i.e., volume number, of the video cassette 35 recorded in "series." The item A7 indicates that the currently loaded video cassette is a part of a series while verifying the serial number thereof. When the system volume number is added to the recording preset data retained by the video tape recorder unit 3, the number is displayed on the monitor. By watching the monitor, the user obtains data about the video tape 36 preset for recording.

The item A8 indicates a screen display color. For example, this item specifies in two bytes the color in which to display a list or other indications. When the user loads a video cassette 35 and gets a list screen displayed, the color of the currently displayed screen immediately tells the user which cassette is being loaded.

The item A9 indicates various flags. For example, this item retains a plurality of flag data in one byte. This embodiment allows the user to set a "write inhibit" flag to bit 0 so as to keep the recorded contents of the video cassette 35 intact.

The system is allowed to set a "formatted" flag to bit 1. This makes it possible to verify whether or not all recording areas of the video tape 36 have been formatted.

The system is also allowed to set an "address mode" flag to bits 2 and 3 indicating the type of each program end address. This bit arrangement makes it possible to always detect any program end address in a mode that varies depending on the video cassette 35.

The item A10 indicates the type of video cassette. For example, this item records in two bytes the length and type of the cassette tape used.

With this embodiment, byte 1 is set automatically by the system, whereas byte 2 is set as needed by the user. When the video cassette 35 is loaded, the type and the length thereof are verified. That in turn permits verification of the appropriate hub diameter to be used.

The item A11 indicates a password. For example, the user may enter into this item a password in a four-digit binary-coded decimal number of two bytes. When the video cassette 35 is loaded in the video tape recorder unit 3, the user is required to enter correctly the password registered for cassette use. If the password is not correctly input, neither recording nor reproduction of the video cassette 35 is allowed. Then the contents of the video tape 36 remain unknown.

The item A12 indicates a user volume number. For example, this item retains in two bytes a video cassette number, i.e., a volume number that the user may attach to the video cassette 35. With this embodiment, the user volume number may range from 0 to 64,000 in binary-coded decimal notation. When the user volume number is added to the recording preset data retained by the video tape recorder unit 3, the number may be displayed on the monitor. The display on the monitor informs the user of the volume number for the video tape 36 to be preset for recording.

The item A13 indicates a reproducing order. For example, this item records in 32 bytes the order in which up to 32 programs are to be reproduced as needed. When program reproducing mode is selected, the programs whose numbers are recorded in byte 1 through byte 32 are specified in that order for reproduction.

The item 14 indicates a recording order. For example, this item records in 32 bytes the order in which up to 32 programs are to have their corresponding numbers registered for recording. When program reproducing mode is selected, the programs recorded in the order set in byte 1 through byte 32 are reproduced in the same order.

The item A15 indicates a volume label. For example, this item indicates in 40 bytes a label such as a title that the user may attach to the video cassette 35. When the volume label is added to the recording preset data retained by the video tape recorder unit 3, the label may be displayed on the monitor. The display on the monitor in turn informs the user of the volume label attached to the video tape 36.

With this embodiment, the item A15 may record a label of up to 40 characters in ASCII or up to 20 characters in S-JIS code.

As illustrated in FIG. 4, the program data block $D_{PR}$ comprises program data $D_{PRX}$ which corresponds to the data on the programs recorded or preset to be recorded on the video tape 36 of the video cassette 35. A typical structure of the program data $D_{PRX}$ is shown in FIG. 6.

The item B1 indicates a start address. For example, the system write, into this item in three bytes, the start address of each program relative to the first address of the video tape 36 after the program has been recorded in the video signal recording field $V_{VD}$ of the video cassette 35.

With this embodiment, any of three address values modes may be selected: time-of-day mode (seconds, minutes and hours given in binary-coded decimal notation), program number mode (program numbers expressed under VASS (video address signal search) standards for VHS format), and control signal mode (address values expressed in CTL pulse counts under CTL standards for Beta format).

The item B2 indicates an end address. For example, this item records in three bytes the end address value of a program relative to the tape top of the video tape 36. In this embodiment, as with the program start address values, the program end address values may be expressed in any of three modes: time-of-day mode, program number mode or control signal mode.

The item B3 indicates various flags. For example, this item records in one byte the data about how a given program is handled. With this embodiment, bit 0 contains a "recording done" flag indicating whether the program in question has been recorded. Bits 1 and 2 retain a "recording complete status" flag indicating the status in effect when the recording ended. Bit 3 contains a "write enable" flag indicating whether or or not the program may be overwritten. Bit 4 contains a "program viewing history" flag indicating whether or not the program has been viewed at least once.

The item B4 indicates system program numbers. For example, this item records in one byte a series of reference numbers given by the system to programs. With this embodiment, serial numbers 0, 1, 2, etc., from the tape top of the tape are written as system numbers.

The item B5 indicates a program number. For example, the user may enter, into this item in one byte, the number indicating which of the serials the current program is in its series (e.g., a serial drama).

The item B6 indicates a category code. For example, this item records in one byte the category of each given program (sports, news, drama, etc.).

The item B7 indicates an input source. For example, this item records in one byte the source from which a given program has been input. With this embodiment, the item B7 records the channel number selected by the tuner 21 (FIG. 1) or the external line number in the external line video signal S12 as the data representing the source.

The item B8 indicates a recording/operation mode. For example, this item records in one byte the type of recording mode specified for the video cassette 35 as well as the operation mode in effect during the recording. With this embodiment, the video cassette 35 is recorded in one of three broadly categorized modes: Beta mode, VHS mode or 8-mm Video mode. Each mode is set to the item B8 when the video cassette 35 is recorded by the corresponding type of video tape recorder. The Beta mode comprises "Beta Is" mode, "Beta II" mode and "Beta III" mode. The VHS mode contains "SP" mode, "LP" mode and "EP" mode. The 8-mm Video mode includes "SP" mode and "LP" mode. Illustratively, the operation mode for use with the recording is a normal recording mode or a reference signal write-only mode.

The item B9 indicates a recording start time. For example, the item records in five bytes the time of day at which a preset or recorded program is to start. With this embodiment, the user writes minutes, hours, day, month and year into bytes 1 through 5, respectively, in binary-coded decimal notation.

The item B10 indicates a recording end time. For example, this item records in two bytes the time of day at which a preset or recorded program is to end. With this embodiment, bytes 1 and 2 are set to minutes and hours in binary-coded decimal notation.

The item B11 indicates preset recording control information. For example, this item records in 10 bytes the data for activating the video tape recorder unit 3 (FIG. 1) for preset recording along with any other peripheral device required to function in synchronization therewith.

The item B12 indicates a title. For example, the user writes, into this item in 4 bytes, the character data representing the title of a given program.

(4) Settings of the Video Tape Recorder

Figure 7A:
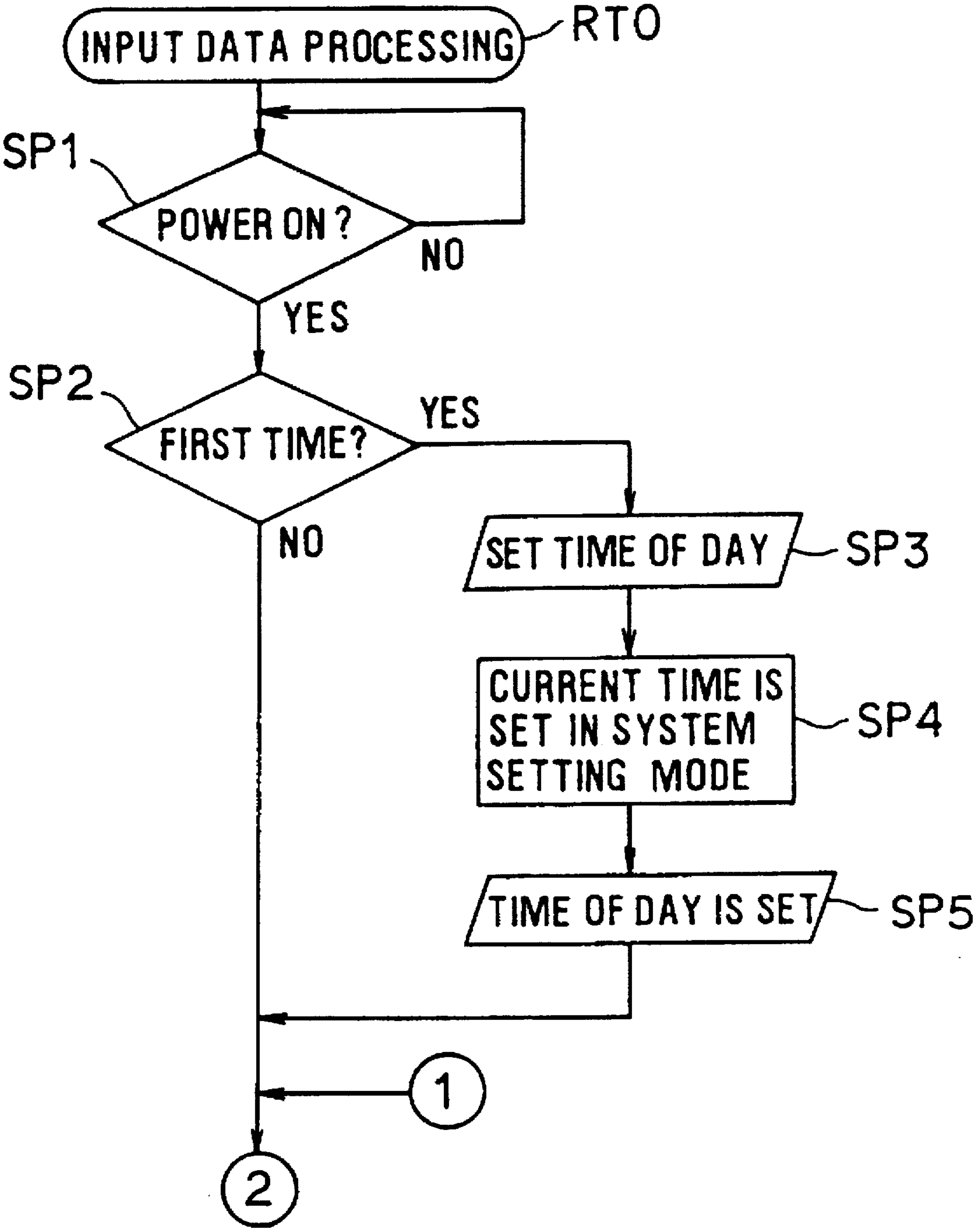
FIG. 7A–7B is a flowchart depicting the steps in which to process the input data of the video tape recorder.
Figure 7B:
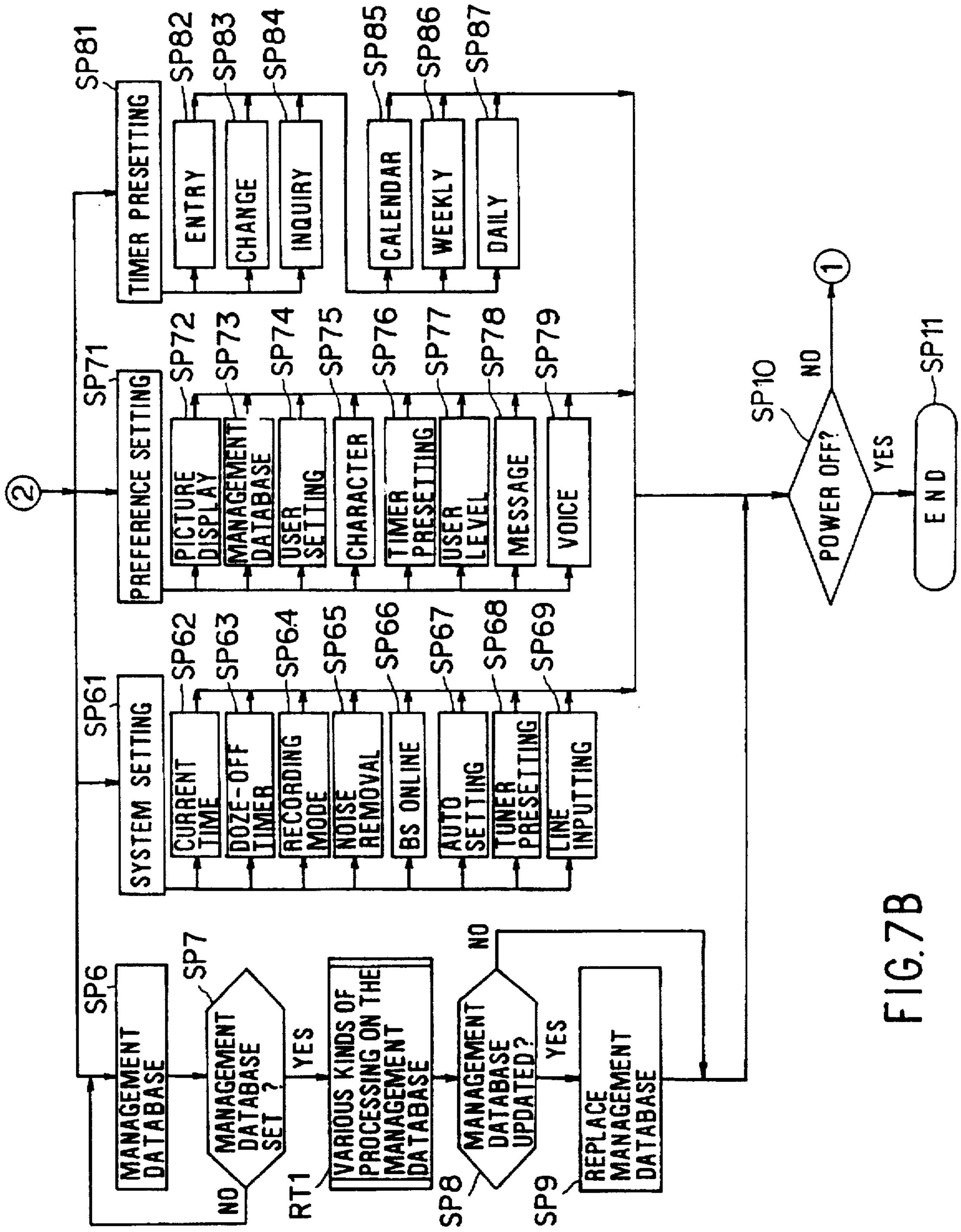
Figure 8A:
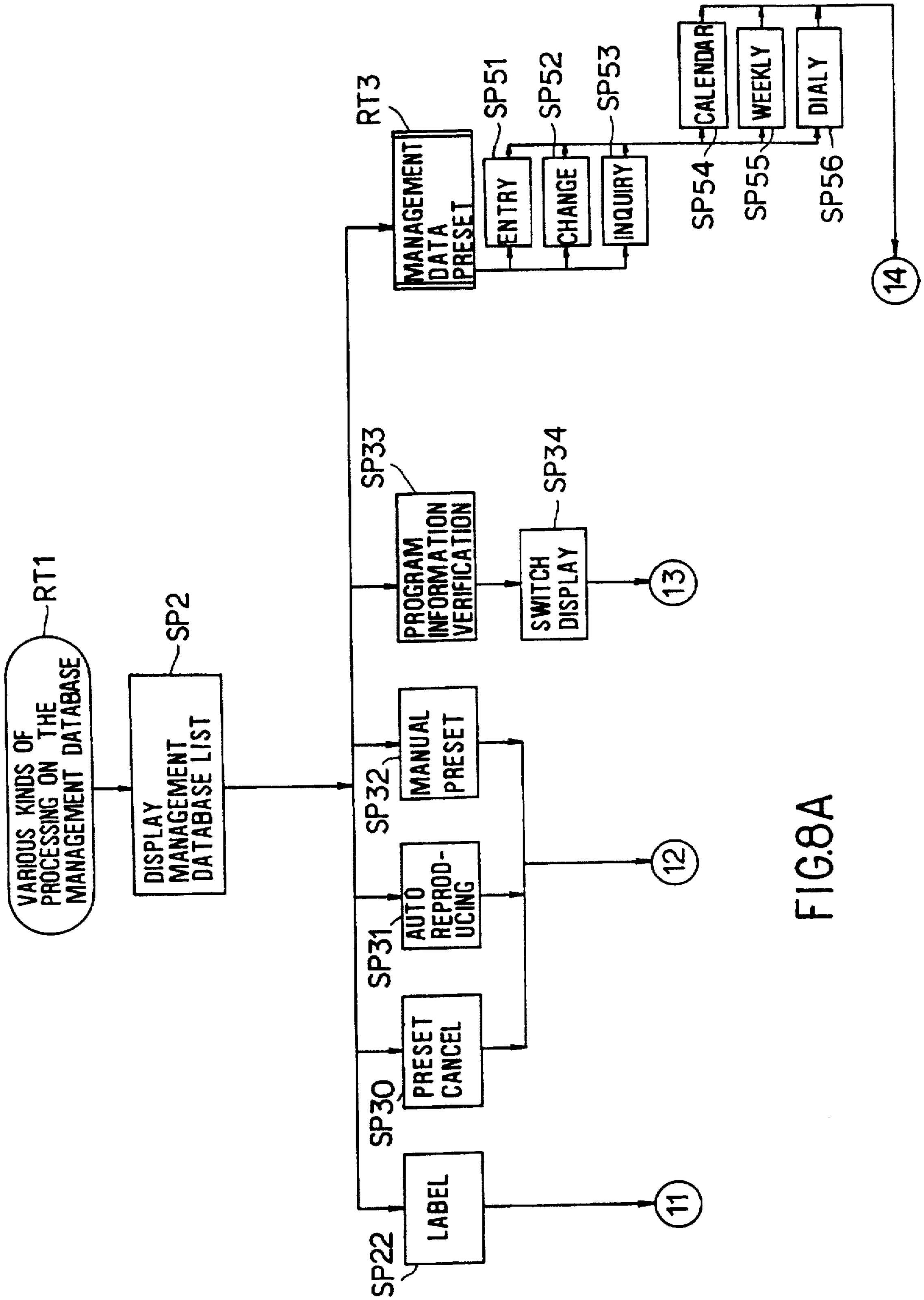
FIG. 8A–8B and 9 are flowcharts showing the steps in which to process the control database used by the video tape recorder.
Figure 8B:
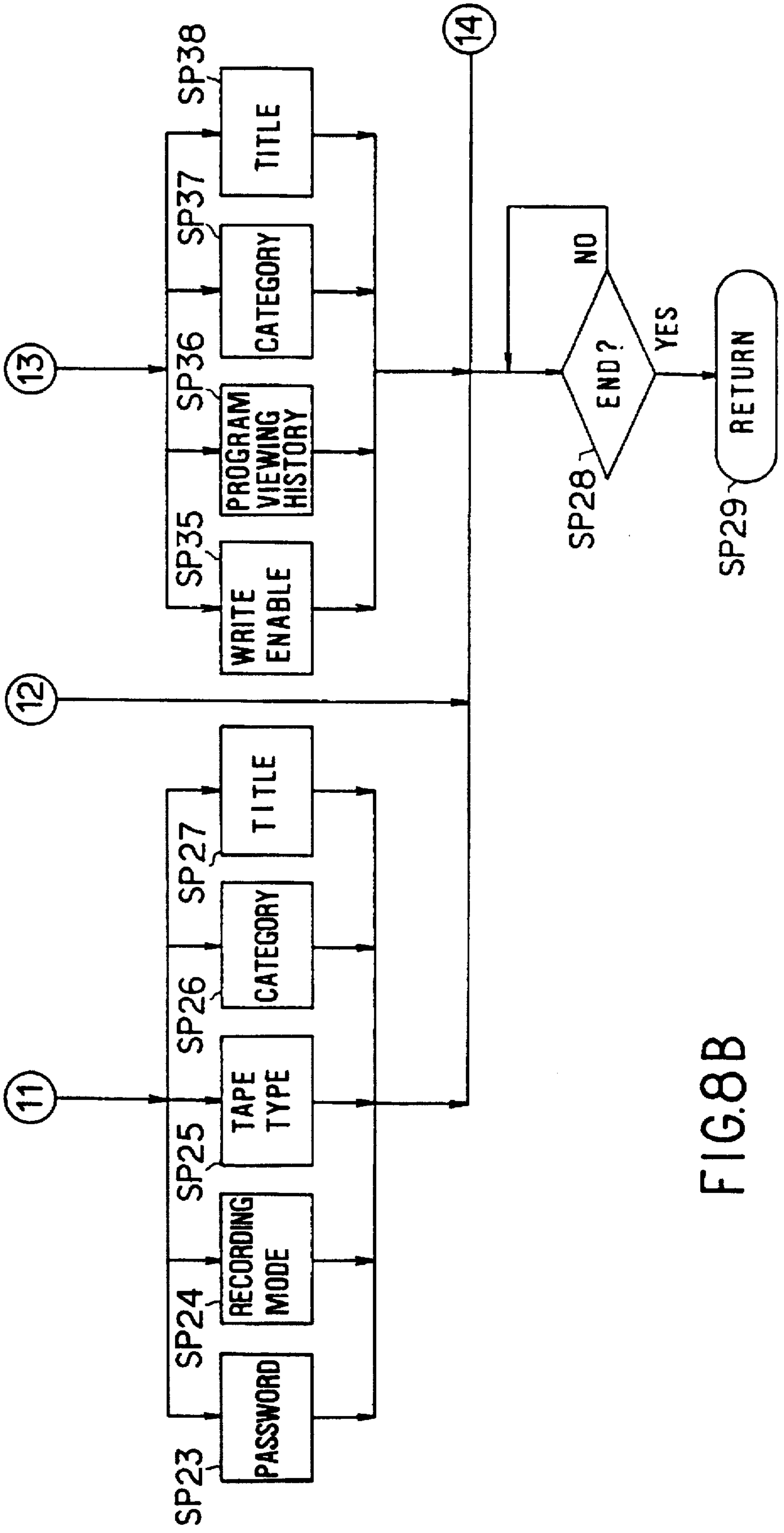
Figure 9:
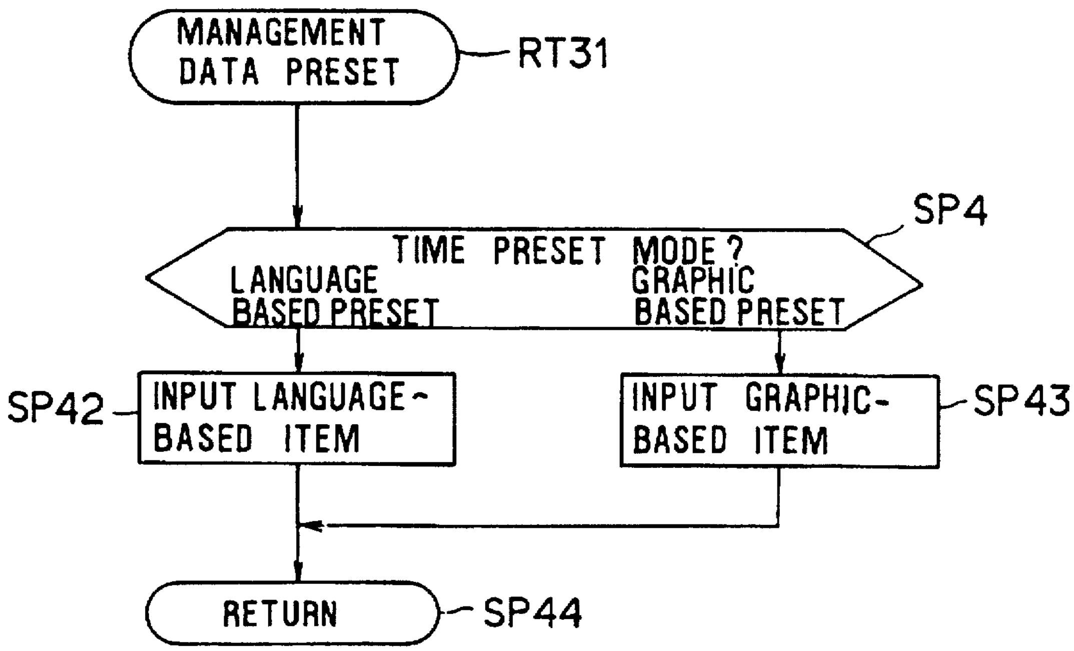

In response to a command signal from the remote controller 6 or from the keyboard 12, the CPU 8 activates processing programs RT0, RT1 and RT31 to control the control data processing unit 5, video signal processing unit 2 and video tape recorder unit 3 as desired by the user. The processing programs are depicted in FIGS. 7 through 9.

Figure 10:
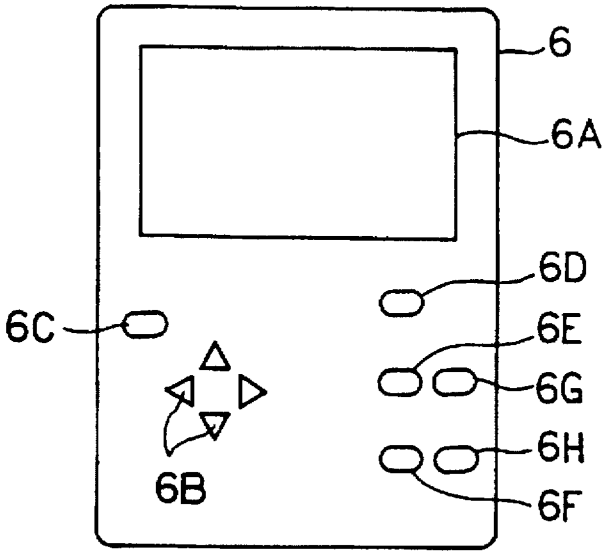
FIG. 10 is a front view illustrating how the remote controller for use with the video tape recorder is constructed.

In this embodiment, the remote controller 6 comprises the display screen 6A on the housing surface, the screen having an LCD panel with a touch panel provided thereon, as shown in FIG. 10. When a table of setting items is displayed on the display screen 6A, a desired item is touched directly with the user's fingertip. The touching action generates a signal corresponding to the selected item for input. In addition, a cursor appearing on the display screen 6A is moved by four-direction cursor keys 6B and is set to a target item. Operating an ENTER key 6C inputs the signal representing the target item.

The remote controller 6 has a normal operation setting key 6D, a menu display setting key 6E, a control data mode setting key 6F, a first preset operation mode setting key 6G, and a second preset operation mode setting key 6H. These mode setting keys are used to specify for the CPU 8 the operation mode in which to operate the video tape recorder 1.

How the input data processing program RT0 runs will now be described with reference to FIG. 7. In step SP1, the CPU 8 waits for power to be turned on. If power is applied, step SP2 is reached. In step SP2, a check is made to see if power is applied for the first time. If power is found to be applied for the first time in step SP2, steps SP3, SP4 and SP5 are executed in sequence. In step SP3, a message "SET TIME OF DAY" appears on the display screen 4A of the monitor 4 as well as on the display screen 6A of the remote controller 6. In step SP4, the current time is set in system setting mode. In step SP5, a message "TIME OF DAY IS SET" appears on the display screens 4A and 6A.

With the above steps completed and the time of day established, the video tape recorder 1 again enters the same command wait state as that in which the time of day has just been set.

If the check in step SP2 reveals that power is not applied for the first time, the command wait stat is also reached. In this state, the user may select any of such mode options as management database, system setting, preferences setting and time presetting.

In practice, when the menu display mode setting key 6E is operated on the remote controller 6 (or on the keyboard 12) in the command wait state, the CPU 8 displays a list of mode options, "MANAGEMENT DATABASE," "SYSTEM SETTING," "PREFERENCE SETTING" and "TIMER PRESETTING," on the display screens 6A and 4A. The user selects one of these modes by touching it with his or her fingertip.

The management database mode is a mode in which to record the management data $D_{AV}$ (FIG. 4) to the management database video track recording field $F_{AVV}$ or to the management database audio track recording field $F_{AVA}$ on the video tape 36 (FIG. 3); it is also a mode in which to drive and control the video tape recorder unit 3 using the management data $D_{AV}$ previously recorded. When the management database item is selected in step SP6, step SP7 is reached. In step SP7, a check is made to see if a video cassette 35 containing a tape with the management data $D_{AV}$ recorded thereon (called a management data tape) is loaded. If that tape is found to be loaded, a subroutine RT1 is reached. The subroutine RT1 executes various kinds of processing on the management database before step SP8 is reached. In step SP8, a check is made to see if the contents of the management database have been updated. If the contents of the management database are found to be updated, step SP9 is reached. In step SP9, the data recorded in the management database video track recording field $F_{AVV}$ or in the management database audio track recording field $F_{AVA}$ is replaced with the updated control data.

When all processing on the management database comes to an end, a check is made in step SP10 to see if power is turned off. If power remains applied, the above-described command wait state is again reached. If power is found to be removed in step SP10, step SP11 is reached in which the input data processing program RT0 is ended.

Referring to FIG. 8, how the subroutine RT1 executes various kinds of processing on the control database will now be described. When the subroutine RT1 is entered, step SP21 is reached. In step SP21, the CPU 8 displays a management data list on the display screen 6A of the remote controller 6 as well as on the display screen 4A of the monitor 4. Thereafter, the CPU enters the command wait state.

At this point, each display screen shows such items as "LABEL", "RESET CANCEL", "AUTO REPRODUCING", "MANUAL PRESET", "PROGRAM INFORMATION VERIFICATION" and "MANAGEMENT DATA PRESET" any of which the user may select.

The label item represents an operation mode in which to select and set from among the management data $D_{AV}$ the volume data or program data contained in the volume data block $D_{VM}$ or in the program data block $D_{PR}$ (FIG. 4). If the label item is selected in step SP22, each display screen displays items "PASSWORD", "RECORDING MODE", "TAPE TYPE", "CATEGORY" and "TITLE" any of which the user may again select.

If the user selects the password item, step SP23 is reached. In step SP23, the CPU 8 allows the user to alter the password data recorded in the item A11 of the volume data $D_{VMX}$ (FIG. 5).

If the user selects the recording mode item, step SP24 is reached. In step SP24, the CPU 8 specifies the recording/operation mode recorded in the item B8 of the program data $D_{PRX}$ (FIG. 6) and writes the applicable recording mode data.

If the user selects the tape type item, step SP25 is reached. In step SP25, the CPU 8 alters the tape type data among the data representing the video cassette type recorded in the item A10 of the volume data $D_{VMX}$ (FIG. 5).

If the category item is selected by the user, step SP26 is reached. In step SP26, the CPU 8 alters the category code data recorded in the item B6 of the program data $D_{PRX}$ (FIG. 6).

If the title item is selected by the user, step SP27 is reached. In step SP27, the CPU 8 alters the title data recorded in the item B12 of the program data $D_{PRX}$ (FIG. 6).

In the manner described, the CPU 8 alters the data in the password item through the title item in steps SP23–SP27 before reaching step SP28. In step SP28, a check is made to see if an "END" item is specified. If the end item is found to be specified, the processing on the applicable management database is terminated and step SP29 is reached. Step SP29 is followed by step SP8 back in the control database processing loop illustrated in FIG. 7.

If, in step SP21 of FIG. 8, the user selects the preset cancel item in the control data list displayed in the command wait state, step SP30 is reached. In step SP30, the CPU 8 cancels all programs preset in the current control data list.

If the user selects the auto reproducing item in step SP21, step SP31 is reached. In step SP31, the CPU 8 reproduces in a predetermined order, and alters as needed, the reproducing order data in the item A13 of the volume data $D_{VMX}$ (FIG. 5).

If the manual preset item is selected by the user in step SP21, step SP32 is reached. In step SP32, the CPU consecutively accepts the manual settings of a predetermined number of programs and enters the settings as control data.

When step SP30, SP31 and SP32 are completed, the CPU 8 returns to the management database processing loop (FIG. 7) through steps SP28 and SP29.

While the CPU 8 is in the command wait state in step SP21 of FIG. 8, with the control data list displayed, the user may select the program information verification item. This causes the CPU 8 to enter step SP33 which is followed by step SP34. In step SP34, the CPU 8 switches displays on each display screen. Depending on the screen selected, step SP35, SP36, SP37 or SP38 is reached. Of the volume data $D_{VMX}$ (FIG. 5) and the program data $D_{PRX}$ (FIG. 6), the write enable item, the program viewing history item, the category item or the title item is verified and/or altered in step SP35, SP36, SP37 or SP38, respectively.

In this embodiment, characters are used to represent the write enable item, the program viewing history item, the category item and the title item. This representation scheme makes it possible to check and alter the data about a plurality of preset programs in a relatively narrow display area.

When steps SP35 through SP38 are completed, the CPU 8 returns to the management database processing loop. (FIG. 7) through steps SP28 and SP29.

If the user selects the management data preset item in the command wait state where the control data list is being displayed, the CPU 8 enters a management data subroutine RT3. There, the CPU 8 executes the management data reset processing subroutine RT31 which constitutes part of the subroutine RT3 and which changes types of preset mode, as illustrated in FIG. 9.

With the subroutine RT31 activated, the CPU 8 prompts the user in step SP41 to select the type of time preset mode. As shown in FIG. 11, this embodiment provides two types of timer preset mode, language-based preset mode or graphic-based preset mode, one of which the user is asked in step SP41 to select for the preset screen. In language-based preset mode, the items to be specified are expressed in the form of a language-based item table (TBL) in natural language (Japanese). In graphic-based preset mode, which is usually used, the specification items are expressed in the form of a graphic-based item table in graphic elements such as alphanumeric characters and symbols.

If the user selects the above language-based preset mode, the CPU 8 enters step SP42. In step SP42, the CPU 8 causes the language-based item table (TBL) to appear on each display screen, and moves into a register 44 the data which corresponds to the language-based input item selected by the user.

On the other hand, if the user selects the graphic-based preset mode, the CPU 8 enters step SP43. In step SP43, the CPU 8 causes the graphic-based item table on each display screen, and moves into the register 44 the data corresponding to the graphic-based input item selected by the user.

After the user has completed necessary input operations in the above steps, the CPU 8 terminates its management data preset processing and returns to the management database processing loop of FIG. 8.

The CPU 8 then displays items "ENTRY," "CHANGE" and "INQUIRY" on the screen. When the user selects the entry item, change item or inquiry item in step SP51, SP52 or SP53, respectively, the CPU 8 initiates the corresponding processing.

Thereafter, depending on the item selected by the user, the CPU 8 displays a calendar-based preset table, weekly preset table or daily preset table in step SP54, SP55 or SP56, respectively. The user is prompted to write the start time and/or the end time of each program to be preset into the calendar-based preset table, into the weekly preset table or into the daily preset table.

With the above settings completed, the CPU 8 goes to step SP28 where it is ascertained that the current management database processing program has ended. The CPU 8 then returns to the management database processing loop of FIG. 7 through step SP29.

Described above is what subsequently happens when the user selects the management database item in step SP6 while the initial command wait state of FIG. 7 is in effect. After the selection, the management data is written to, altered or verified on the video tape. Alternatively, he user may select the system setting item, the preference setting item or the timer presetting item. If any of these three items is selected, the CPU 8 accordingly establishes the operating conditions for the affected parts of the video tape recorder 1.

Specifically, assume that the user selects the system setting item in step SP61 of FIG. 7. Each display screen then displays such items as "CURRENT TIME", "DOZE-OFF TIMER", "RECORDING MODE", "NOISE REMOVAL", "BS ONLINE", "AUTO SETTING", "TUNER PRESETTING" and "LINE PRESETTING" which may be selected by the user in steps SP62 through SP69, respectively. When any of these items is selected, the CPU 8 sets the operating conditions for the applicable component of the system. After completing the above processing, the CPU 8 terminates the system setting processing loop and moves on to step SP10.

If the user selects the preference setting item in step SP71, the CPU 8 causes each display screen to display such items as "PICTURE DISPLAY", "MANAGEMENT DATABASE", "USER SETTING", "CHARACTER", "TIMER PRESETTING", "USER LEVEL", "MESSAGE" and "VOICE" which may be selected by the user in steps SP72 through SP79, respectively. When any of these items is selected, the CPU 8 executes the processing which corresponds to the selected item. After completing that processing, the CPU 8 goes to step SP10, as described above.

Assume that in step SP81, the user selects the timer presetting item. The CPU 8 then causes each display screen to display the entry, change and inquiry items, which may be selected by the user in steps SP82, SP83 and SP84, respectively. When the user selects any of these items, each display screen displays the calendar-based preset table item, the weekly preset table item and the daily preset table item. The user then selects one of these three items. When the calendar-based preset table item, the weekly preset table item or the daily preset table item is selected by the user, the CPU 8 causes the calendar-based preset table, the weekly preset table or the daily preset table to appear on each display screen, respectively. Using the currently displayed preset table, the user presets any programs desired.

When completing the timer preset processing loop, the CPU 8 moves on to step SP10.

In the manner described above, the CPU 8 executes the input data processing program RT0 of FIG. 7. This provides reliable control over the video tape recorder unit 3 based on the data entered by the user.

(5) Presetting of Management Data Using the Language Input Items

As described above, when "MANAGEMENT DATA PRESETTING" is designated from the management data list displayed on the display screens in the command waiting state in step SP21 (FIG. 8), the CPU 8 in the control management data processing unit 5 enters the management data presetting subroutine RT3 and executes the management data presetting process. At that time, Table of Language Designated Items TBL shown in FIG. 11 is displayed on the display screens 4A and 6A so that the user can input the management data as if he or she talks to the computer.

When the timer setting process is executed in step SP81 in the initial command waiting state shown in FIG. 7, the CPU 8 displays on the display screens 4A and 6A Table of Language Designated Items TBL shown in FIG. 11, as in the case of execution of the management data presetting process, so as to allow the user to input the items easily and reliably using the daily used language.

In this embodiment, Table of Language Designated Items TBL is a list of terms with which the user can interactively input commands to the video tape recorder 1 using the natural language. The table contains the terms which represent the objects to be operated, the terms which represent the contents of the operations, the terms which represent the operation time or operation hour and so on. These terms are arranged in the table in such a manner that they can be designated by the unit of one or a plurality of words.

In this embodiment, the terms with which the time or hour can be designated include those with which the times before and after the current time can be designated by the unit of day or week, i.e., "TODAY", "TOMORROW", "DAY AFTER TOMORROW" and "NEXT WEEK", those with which repetition can be designated by the unit of week or day, i.e., "EVERY WEEK" and "EVERY DAY", those with which the date can be designated in accordance with the calendar, i.e., "MONTH", "DAY", "SUNDAY" to "SATURDAY", and those with which the time in a day can be designated, i.e., "IN THE MORNING", "IN THE AFTERNOON", "O'CLOCK", "MINUTE" and "BETWEEN".

The terms with which the input sources can be designated include "BS", "LINE", "CABLE", "ch" and "βIII".

The terms with which the operations can be designated include "DISPLAY", "CHANGE", "CANCEL", "CONTINUES UNTIL", "RECORD PRESETTING", "END", "STOP . . . " and ".".

The terms with which the above-described terms can be connected include "FROM", "UNTIL", "THE PROGRAM OF", "OF", "AT" and "TO". The terms with which numeral information can be input includes "0" to "12". The terms for the man-machine interaction with the CPU 8 include "YES" and "NO".

In this embodiment, Table of Language Designated Items TBL is displayed on the display screen 6A of the remote controller 6 and on the display screen 4A of the monitor 4 when the process of "MANAGEMENT DATA PRESETTING" is executed in the subroutine RT3 (FIG. 8) and when the process of "TIMER PRESETTING" is executed in step SP81 (FIG. 7), so that the user can designate one of the terms listed on Table of Language Designated Items TBL to input the command represented by the term designated to the CPU 8.

For example, when it is desired to program the recorder for the program which goes on the air the 1st channel from 8 o'clock to 9 o'clock on Monday night, the user may designate from Table of Language Designated Items TBL, "RECORD PRESETTING", "THE PROGRAM OF" "1", "ch", "FROM", "8", "O'CLOCK", "TO", "9", "O'CLOCK", "IN THE AFTERNOON", "OF", "MONDAY", "EVERY WEEK" and "." in that order or in another order.

When these operations are those executed in the subroutine RT3 on "MANAGEMENT DATA PRESETTING", the input data is stored in the register 44, and then recorded on the management data $D_{AV}$ recording area of the management database video track recording area $F_{AVV}$ or the management database audio track recording area $F_{AVA}$. That is, the recording starting time information, i.e., the numerical data representing "8 O'CLOCK IN THE AFTERNOON OF EVERY FRIDAY", is recorded as the program information $D_{PRX}$ of the program information block $D_{PR}$ which is identified by Item B9. Also, the information representing the recording ending time, i.e., the numerical data representing "9 O'CLOCK", is recorded as the program information $D_{PRX}$ identified by Item B10. The data representing the input source, i.e., the numerical data representing "1 channel", is recorded as the program information $D_{PRX}$ identified by Item B7.

If the above-described programming of the recorder 1 is the one which is made in the process of CHANGE of TIMER PRESETTING in step SP81, the input data is written as new recording information in the presetting information memory provided in the video tape recorder unit 3.

When it is desired to make a change on the preset program, e.g., to change the channel number of the preset program which will go on the air next day from 6 channel to 8 channel, the user may execute the process of MANAGEMENT DATA PRESETTING of the subroutine RT3 and designate from Table of Language Designated Items TBL, "CHANGE", "THE PROGRAM OF" "TOMORROW" "FROM" "6", "ch", "TO", "8", "ch" in that order or in another order.

That is, the input source data recorded on the management data $D_{AV}$ recording area of the management database video track recording area $F_{AVV}$ or the management database audio track recording area $F_{AVA}$ as the program information $D_{PRX}$ identified by Item B7, i.e., "6 ch", is replaced by "8 ch" to change the already set management data.

If the above-described programming of the recorder 1 is the one which is made in the process of CHANGE of TIMER PRESETTING in step SP81, the data already written in the presetting information memory provided in the video tape recorder unit 3 is replaced by the input data.

If it is desired to cancel the already preset program, e.g., to "cancel presetting of the program which will go on the air next Tuesday", the user may designate from Table of Language Designated Items TBL displayed on the screens in the subroutine RT3 or in step SP81 "CANCEL", "THE PROGRAM OF" "NEXT" "TUESDAY" in that order or another.

If the above operations are those executed in the process of "MANAGEMENT DATA PRESETTING" of the subroutine RT3, all the information on the program whose recording starting time information, i.e., the numerical data representing "TUESDAY ON EVERY WEEK", is recorded on the management data $D_{AV}$ recording area of the management database video track recording area $F_{AVV}$ or the management database audio track recording area $F_{AVA}$ as the program information $D_{PRX}$ identified by Item B9 is cancelled.

If the above operations are those executed in "TIMER PRESETTING" in step SP81, the corresponding information stored in the memory provided in the video tape recorder unit 3 is cancelled.

The user can input information more easily and accurately to program the recorder using Table of Language Designated Items TBL shown in FIG. 11 because the daily used language is used in the table as the item data input means.

(6) Recording of the Program Start Address

When one or a plurality of programs P1, P2, P3, etc., are recorded on the video tape 36, the control data processing CPU 8 writes to the start address item B1 of the program data $D_{PRX}$ (FIG. 6) the recording start point of each program as the program start address value relative to the tape top. Thereafter, when any of the recorded programs on the video tape 36 is to be reproduced or overwritten, the system can verify the recording position of that program by checking the address thereof without actually running the tape up to the tape position where the program is recorded.

By operating the remote controller 6, the user first enters the management data $D_{AV}$ of each item (FIG. 4) as the I/O data S4 through the remote control transceiver 7. The control management data processing CPU 8 places the control data into the register 44. Thereafter, if control data recording mode is selected when, say, the video cassette 35 is ejected, the control management data processing CPU 8 transfers the management data $D_{AV}$ from the register 44 to the video recording encoder 51 as the write control data S25. In turn, the video recording encoder 51 converts the management data into a data video signal S42 and supplies the signal to the recording circuit 32 through the recording switchover circuit 31.

At this point, the recording circuit 32 processes the data video signal S42 in the same manner as the recording video signal S1 is processed. The recording circuit 32 then records the processed signal as one corresponding to one field of video signal into the video recording tracks TA and TB (FIG. 3) on the video tape 36 through a video electromagnetic conversion circuit which constitutes part of the electromagnetic conversion circuit 33 as well as through video heads (write and read heads) making up the magnetic head 34.

Figures 12A, 12B, 12C:
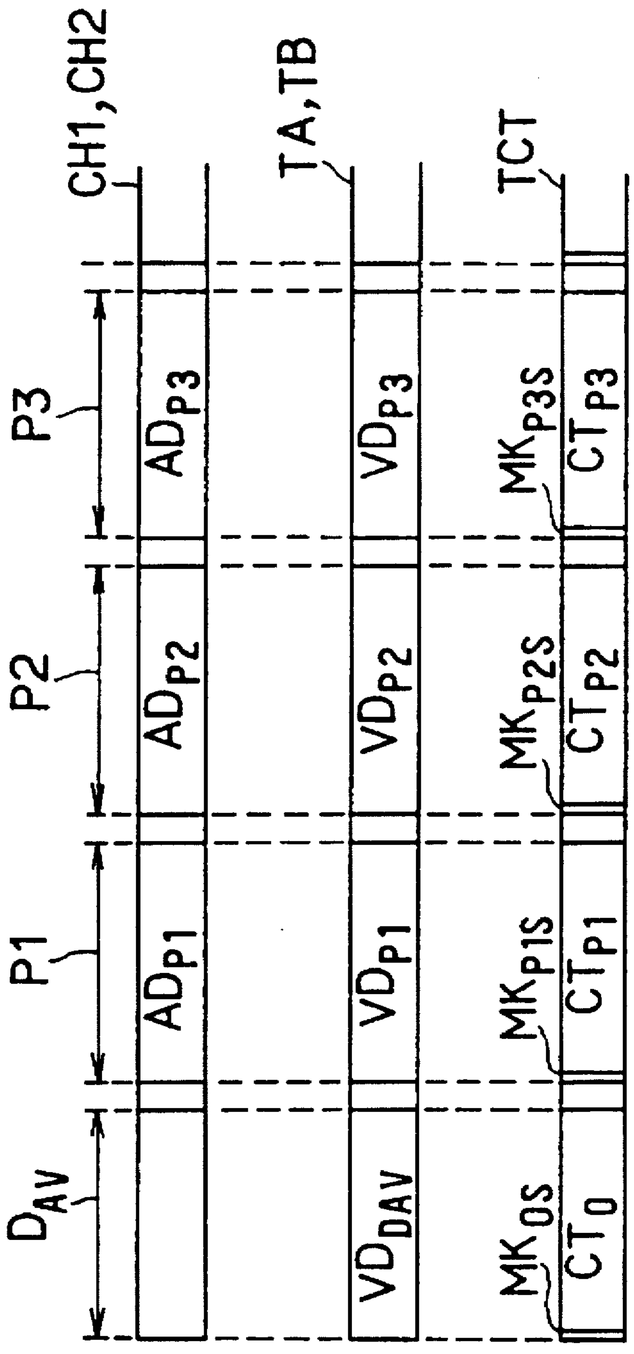
FIG. 12A–12C is a schematic diagram illustrating the format of the start address for use with the video tape recorder.

Thus the management database video track recording field $F_{AVV}$ (FIG. 3) is formed at the tape top of the video tape 36. As shown in FIG. 12B, a management data video signal $VD_{DAV}$ is recorded in the corresponding management database video track recording field $F_{AVV}$.

During the above recording operation, the control management data processing CPU 8 transfers mark recording data as control signal recording data S44 to CTL recording encoder/decoder 54. In turn, the CTL recording eocoder/decoder 54 converts the control signal recording data S44 into a data control signal S46. The data control signal S46 is written as a recording start point mark signal $MK_{OS}$ (FIG. 12C) to the control signal recording track TCT on the video tape 36 through a control signal electromagnetic circuit constituting part of the electromagnetic conversion circuit 33 and through the control head which is one of the magnetic head 34.

Thereafter, the control management data processing CPU 8 transfers the control signal as the control signal recording data S44. This causes a control signal $CT_0$ to be recorded onto the control signal recording track TCT.

In program recording mode, the control management data processing CPU 8 records program video signals $VD_{P1}$, $VD_{P2}$, $VD_{P3}$, etc., of programs P1, P2, P3, etc., consecutively into the video recording tracks TA and TB (FIG. 12B) of the video signal recording field $F_{VD}$ (FIG. 3) following the management database video track recording field $F_{AVV}$. In parallel with the above recording, the CPU 8 records the corresponding program audio signals $AD_{P1}$, $AD_{P2}$, $AD_{P3}$, etc., to the audio recording tracks CH1 and CH2 (FIG. 12A). At the same time, the CPU 8 writes control signals $CT_{P1}$, $CT_{P2}$, $CT_{P3}$, etc., to the control signal recording track TCT (FIG. 12C).

In the program recording mode described above, the control data processing CPU 8 supplies the CTL recording encoder/decoder 54 with the mark signal data in the form of the control signal recording data S44 upon start of the recording of the program video signals $VD_{P1}$, $VD_{P2}$, $VD_{P3}$, etc. This causes recording start point mark signals $MK_{P1S}$, $MK_{P2S}$, $MK_{P3S}$, etc., to be recorded as shown in FIG. 12C.

In this embodiment, the mark signals $MK_{OS}$, $MK_{P1S}$, $MK_{P2S}$, $MK_{P3S}$, etc., are each made up of a tape position address value relative to the reference point of the tape top on the video tape 36. The tape position address value is illustratively provided by transferring the value on a tape counter circuit in the video tape recorder unit 3 to the control management data processing CPU 8 via the mechanism control CPU 11.

Given the setup described above, when a recorded video cassette 35 is loaded into the video tape recorder unit, the control management data processing CPU 8 enters management database reproducing mode even as it communicates with the mechanism control CPU 11. Once in management database reproducing mode, the CPU 8 picks up the data video signal from the management database video track recording field $F_{AVV}$ on the video tape 36 and writes the data into the register 44, the data being forwarded through the magnetic heads 34, the electromagnetic conversion circuit 33, the reproduction circuit 37, the reproduction switchover circuit 38 and the video recording decoder 52.

The register 44 thus retains the management data $D_{AV}$ (FIG. 4) therein as the management data specific to the current video tape 36. The program data block $D_{PR}$ contains the program data $D_{PRX}$ (FIG. 6) about the programs P1, P2, P3, etc., recorded on the video tape 36.

As described, the position data comprising the recording start points $MK_{P1S}$, $MK_{P2S}$, $MK_{P3S}$, etc., is placed in the start address item B1 of the respective program data $D_{PRX}$. The position data constitutes an address representing the position of each program relative to the reference position of the tape top on the video tape 36. In this manner, the register 44 constitutes part of the setup that provides centralized control over the programs in terms of their addresses.

The user verifies the contents of the start address item B1 comprising the respective program data $D_{PRX}$. The verification allows the user to readily know the position of any program currently recorded on the video tape 36 without going through the chores of forwarding fast and reproducing the tape to see where the desired program actually starts. The user is now able to gain easy access to each of the programs recorded on the tape.

(7) Overwriting of the Recorded Program

Assume that one of a plurality of programs P1, P2, P3, etc., recorded in the video recording tracks TA and TB on the video tape 36 is to be overwritten with a new program. In that case, the control management data processing CPU 8 controls the second control head 34A, the erase head 34B, the recording and reproducing head (video head) 34C and the first control head 34D shown in FIG. 13 so as to record the new program.

For example, where a new program is to be overwritten onto the second recorded program P2 (FIG. 12), the control management data processing CPU 8 first supplies the mechanism control CPU 11 with a command via the bus 10 for searching the recording start point mark signal $MK_{P2S}$ of the second program P2.

Upon receipt of the command, the mechanism control CPU 11 supplies a video tape driving unit 57 with the control signal S7 specifying that the video tape 36 is to be forwarded fast or rewound as needed.

At this point, the control management data processing CPU 8 inputs the control signal that was read by the first control has 34D and forwarded through a recording and reproducing circuit 33B contained in the electromagnetic conversion circuit 33 and the CTL recording encoder/decoder. If the input control signal is the recording start point mark signal, the signal is sent to the mechanism control CPU 11 over the bus 10.

The mechanism control CPU 11 has previously input and retained the recording start point mark signal $MK_{P2S}$ corresponding to the second program, the signal being from the control management data processing CPU 8. Based on this signal, the CPU 11 checks to see if the recording start point mark signal entered during the above search operation coincides with the previously retained recording start point mark signal $KM_{P2S}$. If the signals match, it means that the first control head 34D has reached the recording start field of the second program P2. At this point, the mechanism control CPU 11 stops the video tape 36 and supplies the control management data processing CPU 8 with a signal indicating the end of the search operation.

The control management data processing CPU 8 then permits overwriting of the new program. Specifically, the erase head 34B erases the second program P2 from the tape. At the same time, the recording video signal S1 starts to be recorded from the beginning of the recorded field $VD_{P2}$ of the second program P2, the signal being forwarded through the recording circuit 32, a switchiching circuit 33C and the recording and reproducing head 34C in a rotating drum 3A. Concurrently, the control management data processing CPU 8 starts recording new control signal recording data S44 as a new control signal to the control signal recording track TCT of the second program P2 through the CTL recording encoder 54, the recording and reproducing circuit 33B and the first control head 34D.

At this point, a new audio signal is recorded onto the audio recording tracks CH1 and CH2 via an audio head, not shown.

Because the second control head 34A is located upstream of the erase head 34C in the running direction K1 of the video tape 36, the control management data processing CPU 8 can detect the control signal and the recording start point mark signal before they are erased by the erase head 34C.

Thus the control management data processing CPU 8 inputs the control signal that is read by the second control head 34A as control signal reproducing data S50, the signal being forwarded through the reproducing circuit 33A in the electromagnetic conversion circuit 33 and through the CTL reproduction decoder 55. The CPU 8 then waits for the third recording start point mark signal $MK_{P3S}$ to be input, the signal being recorded at the beginning of the field containing the third program P3 which follows the second program P2 on the tape.

With the third recording start mark signal $MK_{P3S}$ input, the control management data processing CPU 8 tells the mechanism control CPU 11 to terminate the recording operation. This prevents the third program P3 from getting inadvertently erased if the new program being recorded is longer than the second program P2 that has been overwritten.

Because the third recording start point mark $MK_{P3S}$ is read by the second control head, the recording operation is reliably stopped before an erase operation of the third program P3 that needs to be preserved. In this manner, only the second program P2, which was intended to be erased, is overwritten with the new program.

After the new program is recorded as described above, the control management data processing CPU 8 alters the management data $D_{AV}$ in the register 44 in accordance with the overwrite operation that took place. The CPU 8 then rewinds the video tape 36, alters the program data $D_{PRX}$ in the management data recording field at the tape top, and terminates the overwrite operation.

As described, the second control head 34A is located upstream of the erase head in the running direction K1 of the video tape 36. With the second control head reading recording start point mark signals from the video tape 36 during recording, the field into which a new program is being recorded is continuously checked for its ending. Thus only the desired portion of the tape is overwritten with the new program.

(8) Other Embodiments of the First Embodiment (8-1) In the embodiment described above, the management data $D_{AV}$ is recorded onto the video recording tracks TA and TB while a mark signal indicating the recording start point of each program is concurrently recorded onto the control signal recording track TCT. Alternatively, the management data $D_{AV}$ may be recorded onto the audio recording tracks CH1 and CH2 or onto the tape top part of the control signal recording track TCT.

Another alternative is to record the mark signals onto the audio recording tracks CH1 and CH2 or onto the video recording tracks TA and TB instead of the signals being recorded onto the control signal recording track TCT.

(8-2) The above-described embodiment is an application of the present invention to a recording and reproducing apparatus having a recording and reproducing head in a rotating drum. Alternatively, the invention may be applied to a recording and reproducing apparatus having a fixed head arrangement for recording and reproducing video signals.

(8-3) In the embodiment described above, the management data $D_{AV}$ has the volume data block $D_{VM}$ and the program data block $D_{PR}$ recorded, in that order, from the beginning of the recording tracks. Alternatively, the blocks may be switched between their positions, subdivided into more blocks for different arrangements, or otherwise allocated on the video tape.

(8-4) The above-described embodiment is an application of the present invention to the video tape recorder. Alternatively, the invention may be applied to other various recording and reproducing apparatus such as DATs (digital audio tape recorders) which record and reproduce audio signals.

Figure 14:
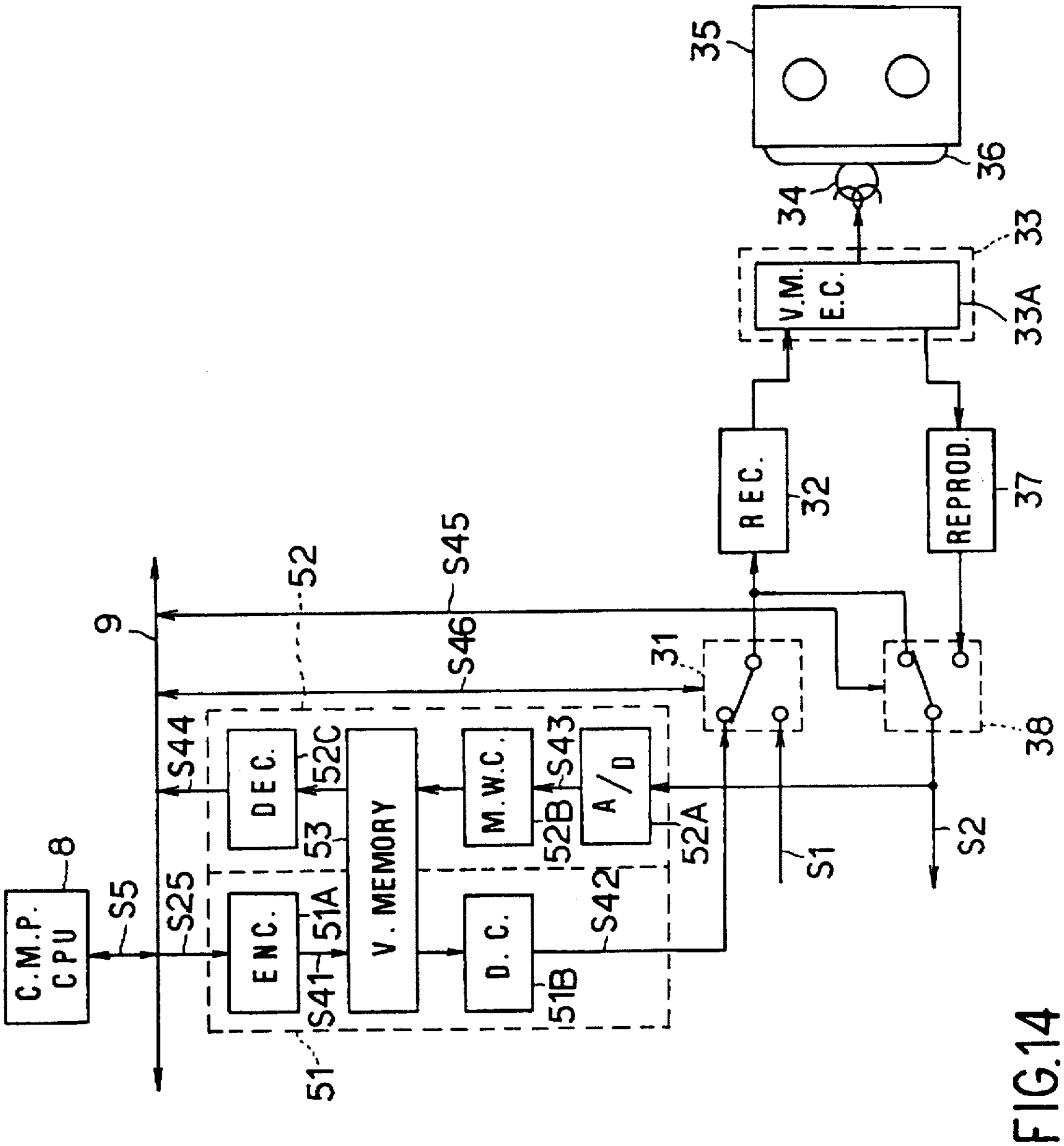
FIG. 14 is a detailed block diagram of the video recording encoder and decoder contained in the video tape recorder.

[2] Second Embodiment (1) Recording of Management Data $D_{AV}$ to Management Database Video Track Recording Field $F_{AVV}$ In the second embodiment, the video recording encoder 51 (FIG. 1) converts the management data $D_{AV}$ into a data video signal in the setup shown in FIG. 14, the management data thus being recorded on the video tape 36 as the signal having the same format as the video signal. At the same time, the video recording decoder 52 converts the data video signal into the management data $D_{AV}$ and supplies it to the control management data processing CPU 8 in the setup of FIG. 14, the data video signal being reproduced in the same format as the video signal reproduced from the video tape 36.

Specifically, once in management data recording mode, the video recording encoder 51 transfers the management data $D_{AV}$ as write management data S25 to the encoder circuit 51A and then converts the data into video data S41 for writing to the video memory 53, the management data $D_{AV}$ having being stored as part of the basic data in the basic data memory 43 (FIG. 1) based on the control data S5 for the control management data processing CPU 8.

The video data written to the video memory 53 is read out by the display control circuit 51B, and is converted from digital to analog format to make up a data video signal S42 which is supplied to the recording switchover circuit 31.

The recording switchover circuit 31 is controlled according to the control data for the control management data processing CPU 8 as described with reference to FIG. 1. Thus when the video cassette 35 is loaded into the video tape recorder unit 3, with management database recording mode selected before the recording video signal S1 is recorded to the video signal recording field $F_{VD}$ (FIG. 3), the recording switchover circuit 31 acts to supply the data video signal S42 to the recording circuit 32.

As a result, the recording circuit 32 records the data video signal S42 as a one-field video signal to the video recording tracks TA and TB (FIG. 3) on the video tape 36, the data video signal S42 being supplied from the video recording encoder 51 and forwarded, like the recording video signal S1, through the video electromagnetic conversion circuit 33A in the electromagnetic conversion circuit 33 and the video head comprising the magnetic head 34.

In this manner, the management database video track recording field $F_{AVV}$ is formed illustratively at the tape top part of the video tape 36.

When management data reproducing mode is selected, the data video signal is sent out as the reproduced video signal S2, the data video signal being reproduced via the video head containing the magnetic head 34 from the video recording tracks TA and TB of the management database video track recording field $F_{AVV}$, the reproduced signal being forwarded through the video electromagnetic conversion circuit 33A in the electromagnetic conversion circuit 33, the reproducing circuit 37 and the reproducing switchover circuit 38.

At this point, the video recording decoder 52 gets the analog/digital conversion circuit 52A to convert the data video signal into video data S43, the data video signal having being output as the reproduced video signal S2. The data S43 after conversion is written to the video memory 53 via the memory write control circuit 52B.

The video data thus written to the video memory 53 is converted by the decoder circuit 52C into reproduction management data S44 for output to the bus 9.

In the setup of FIG. 14, the control management data processing CPU 8 enters management database reproduction mode while communicating with the mechanism control CPU 11 when the video cassette 35 is loaded into the video tape recorder unit 3. Using the switchover control signal S45, the control management data processing CPU 8 switches the reproduction switchover circuit 38 to the side of the reproduction circuit 37. This causes the data video signal to be picked up from the management database video track recording field $F_{AVV}$ on the video tape 36 and fed to the video recording decoder 52 through the magnetic head 34, the video electromagnetic conversion circuit 33A, the reproducing circuit 37 and the reproducing switchover circuit 38. The video recording decoder 52 then converts the data video signal into the reproduction management data S44 and writes it to the basic data memory 43.

In the state above, the user may overwrite or alter the management data $D_{AV}$ by specifying the "management database" item in step SP6 of FIG. 7 to activate the management database diverse processing subroutine RT1 (FIG. 8). In that case, the control management data processing CPU 8 goes to step SP9 for management database modification and, communicating with the mechanism control CPU 11, enters management database recording mode. Using the switchover control signal S46, the CPU 8 switches the recording switchover circuit 31 to the side of the video recording encoder 51. This causes the management data $D_{AV}$ to be read from the basic data memory 43 and written as write control data S25 (data video signal) to the video tape 36, the data being forwarded through the video recording encoder 51, the recording switchover circuit 31, the recording circuit 32, the 'video electromagnetic conversion circuit 33A and the magnetic head 34.

Thus in the setup of FIG. 14, once the video cassette 35 is simply loaded into the video tape recorder unit 3, the user may write, verify or alter the management data about the programs recorded or preset to be recorded, the management data being located in the management database video track recording field $F_{AVV}$ of the video tape 36. This scheme frees the users of the prior art devices of this kind from the chores of running the video tape in search mode or reproducing mode every time it is necessary to verify the contents of a desired program recorded anywhere on the video tape.

Because various kinds of management data $D_{AV}$ may be retained on each video tape as the management data specific thereto, it is possible to further improve the intrinsic functions of the video tape recorder in terms of sophistication. When combined with external devices to constitute a system, the video tape recorder may function as the command center thereof.

(2) Other Embodiments of the Second Embodiment (2-1) In the embodiment of FIG. 14, the encoder circuit 51A is located inside the video recording encoder 51 between bus 9 and video memory 53, and the decoder circuit 52C is located inside the video recording decoder 52 between video memory 53 and bus 9. Alternatively, as shown in FIG. 15, the encoder circuit 51A may located between video memory 53 and display control circuit 51B, and the decoder circuit 52C may be located between memory write control circuit 52B and video memory 53.

Figure 15:
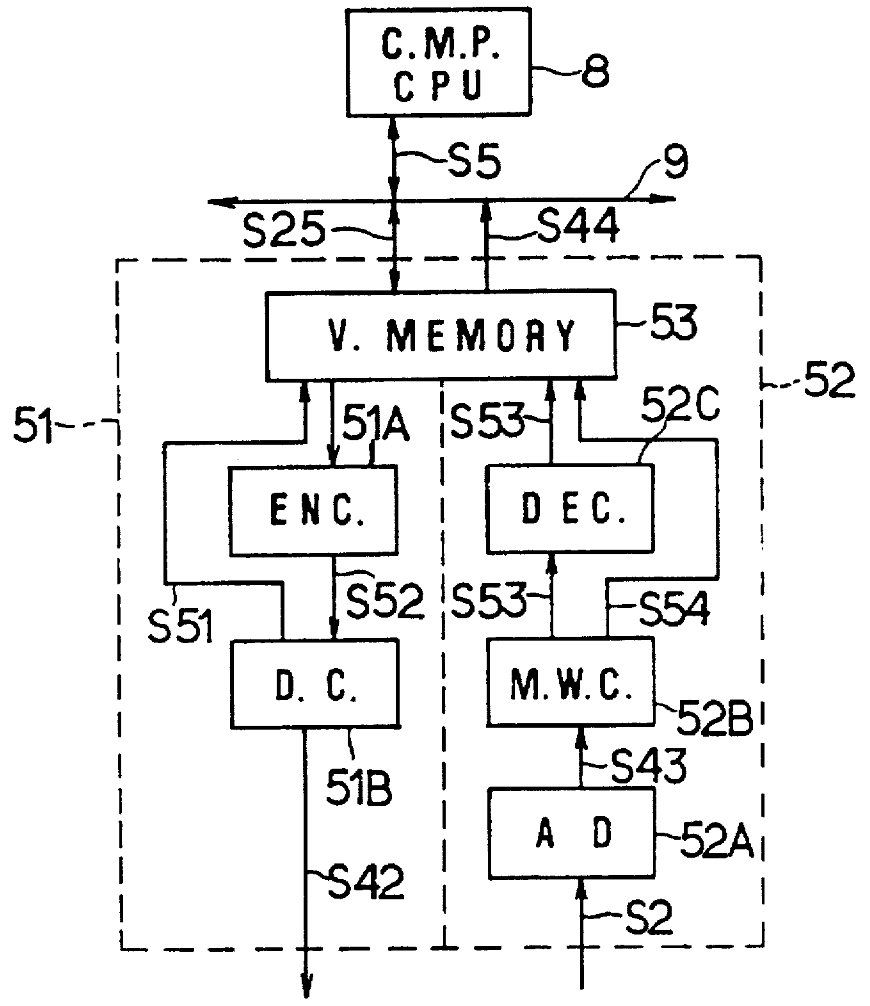
FIG. 15 is a block diagram of another embodiment of the invention.

In the setup of FIG. 15, the control management data processing CPU 8 writes the write management data S25 directly to the video memory 53 in management data recording mode, the write management data S25 being otherwise transferred thereto over the bus 9.

The write management data S25 thus written to the video memory 53 is read therefrom consecutively according to the read management signal S51 sent by the display control circuit 51B. The read data is converted by the encoder circuit 51A into the video data S52 and supplied to the display control circuit 51B. In turn, the display control circuit 51B outputs the video data S52 as the data video signal S52.

In management data reproducing mode, the control management data processing CPU 8 supplies the decoder circuit 52C with the video data S43 for conversion to the reproducing management data S53, the video data having been input to the memory write control circuit 52B from the analog/digital conversion circuit 52A. The converted data is written to the video memory 53 according to the write management signal S54 sent by the memory write control circuit 52B.

The reproducing management data thus written to the video memory 53 is read therefrom consecutively according to the control data S5 of the control management data processing CPU 8. The read data is placed onto the bus 9 as the reproducing management data S44.

In the setup of FIG. 15, the management data $D_{AV}$ is recorded to the management database video track recording field $F_{AVV}$ on the video tape 36 in the same manner as in the setup of FIG. 14. When the management data $D_{AV}$ is read to the basic data memory 43 upon loading of the video cassette 35, the data about the programs recorded or preset to be recorded on the video cassette 35 becomes known to the user. Thus the video tape recorder according to the invention makes it substantially easier for the user to have ready manage over the programs recorded or preset to be recorded (as well as over the video cassettes) than the conventional devices.

(2-2) In the above-described embodiment, the encoder circuit 51A and the decoder circuit 52C are located in the video recording encoder 51 and the video recording decoder 52, respectively. In this arrangement, the write management data, which is read from the basic data memory 43, is converted into video data signal format. In the same arrangement, the reproduced video data is converted to management data whose format is conducive to being written to the basic data memory 43. Alternatively, the conversion involved may be implemented by the control management data processing CPU 8 on a software basis.

(2-3) In the embodiments of FIGS. 14 and 15, the video data S43 obtained in management data reproducing mode from the analog/digital conversion circuit 52A is written temporarily to the video memory 53 before the data is read onto the bus 9. Alternatively, the same effect is obtained by installing a video memory 53 for dedicated use by the video recording encoder 51 and video recording decoder 52, or by omitting the video memory 53 so that the data may be forwarded directly to downstream processing circuits.

(2-4) In the embodiments of FIGS. 14 and 15, the management data $D_{AV}$ comprises the volume data block $D_{VM}$ and program data block $D_{PR}$ written in that order from the beginning of the recording tracks. Alternatively, the blocks may be switched between their positions, subdivided into further blocks for different arrangements, or otherwise allocated on the tape.

(2-5) In the embodiments of FIGS. 14 and 15, the management database video track recording field $F_{AVV}$ is located at the tape top part of the video tape 36. Alternatively the field may be located somewhere else on the tape.

Figure 16:
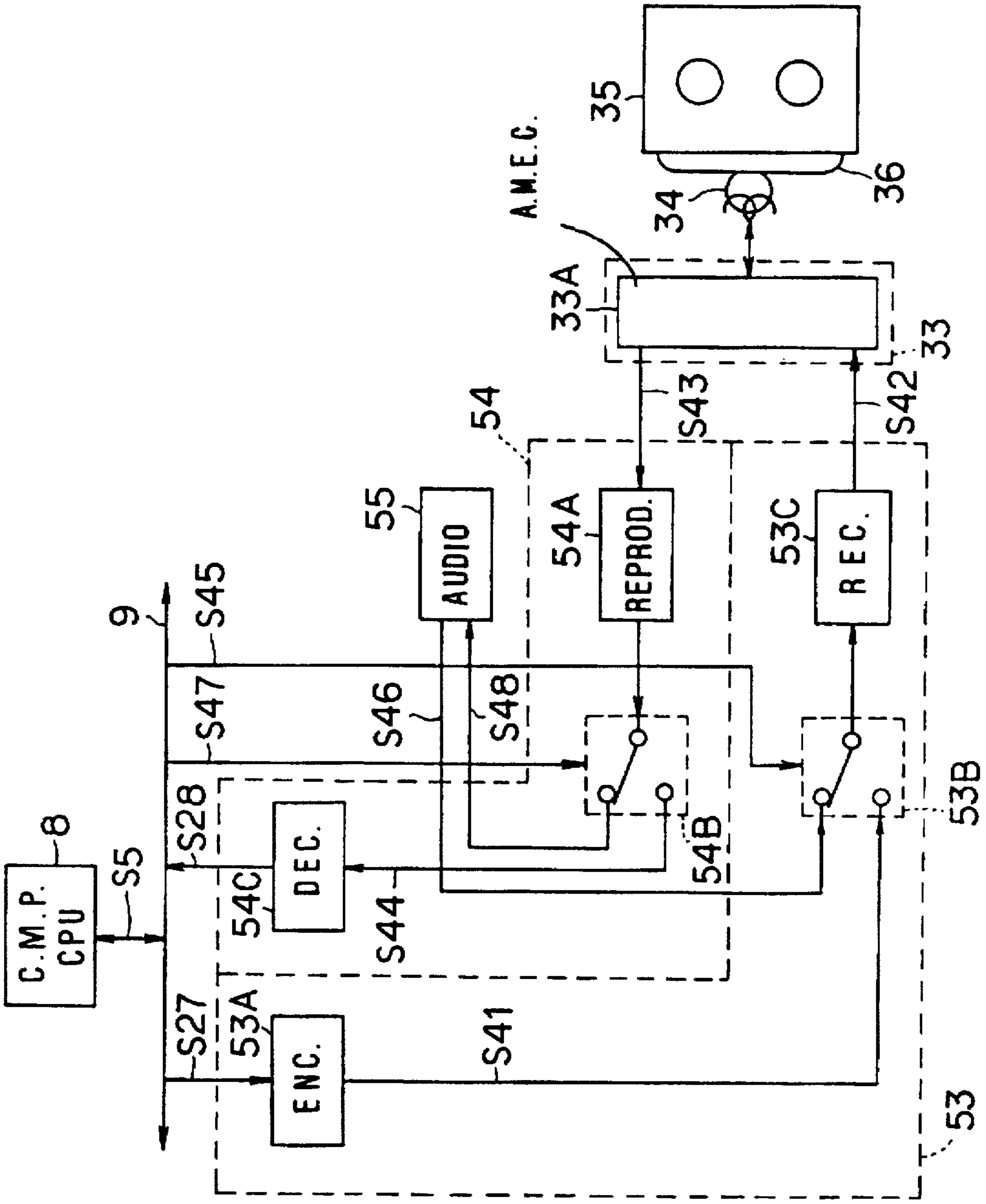
FIG. 16 is a detailed block diagram of the audio recording encoder and decoder contained in the video tape recorder.

[3] Third Embodiment (1) Recording of Management Data $D_{AV}$ to Management Database Audio Track Recording Field $F_{AVA}$ In the third embodiment, the audio recording encoder 53 (FIG. 1) converts the management data $D_{AV}$ into a data audio signal in the setup shown in FIG. 16, the management data being recorded on the video tape 36 as the signal having the same format as the audio signal. At the same time, the audio recording decoder 54 converts the data audio signal into the management data $D_{AV}$ and supplies it to the control management data processing CPU 8 in the setup of FIG. 16, the data audio signal being reproduced in the same format as the audio signal reproduced from the video tape 36.

Specifically, according to the control data S5 of the control data processing CPU 8, the audio recording encoder 53 reads the management data $D_{AV}$ stored as part of the basic data in the basic data memory 43 (FIG. 1) and transfers the data as write management data S27 to the encoder circuit 53A for conversion thereby into a data audio signal S41. The data audio signal S41 is supplied as a recording audio signal S42 to the audio electromagnetic conversion circuit 33A in the electromagnetic conversion circuit 33, the signal being forwarded through the recording switchover circuit 53B and the recording circuit 53C. The signal is then written by the audio head comprising the magnetic head 34 to the audio recording tracks CH1 and CH2 (FIG. 3) on the video tape 36.

As a result, the management database audio track recording field $F_{AVA}$ (FIG. 3) is formed at the tape top part of the video tape 36.

When the control management data processing CPU 8 enters management data reproducing mode, the audio recording decoder 54 has the reproducing circuit 54A receive the data audio signal as the reproduced audio signal S43 via the audio electromagnetic conversion circuit 33A in the electromagnetic conversion circuit 33, the data audio signal being picked up by he audio head containing the magnetic head 34 from the audio recording tracks CH1 and CH2 of the video tape 36. The reproduced audio signal S43 is then supplied to the decoder circuit 54C through the reproduction switchover circuit 54B.

The decoder circuit 54C converts the input data audio signal S44 into read management data S28 for output to the bus 9. At this point, the control management data processing CPU 8 writes to the basic data memory 43 the read management data S28 that was sent from the decoder circuit 54C.

In the setup of FIG. 16, the control management data processing CPU 8 receives a management data write command. In turn, the CPU 8 supplies the mechanism control CPU 11 (FIG. 1) with a command telling the latter to get to a designated write start cue part on the video tape 36. In response, the mechanism control CPU 11 forwards the video tape 36 fast until the designated position thereon is reached.

The control management data processing CPU 8 then supplies the recording switchover signal S45 to the recording switchover circuit 53B. This causes the recording switchover circuit 53B to route the data audio signal S41 of the encoder circuit 53A to the recording circuit 53C.

In this manner, the recording switchover circuit 53B continuously allows the recording audio signal S46 from the audio circuit 55 to be input to the recording circuit 53C. Thus the audio signal is recorded to the audio recording tracks CH1 and CH2 on the video tape 36.

Figure 17:
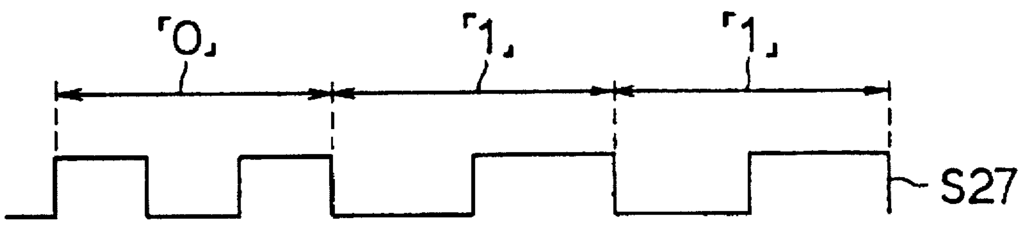
FIG. 17 is a waveform chart showing the signal format of the write control data for use with the embodiment of the invention.

In the state above, the control management data processing CPU 8 reads the management data $D_{AV}$ from the basic data memory 43 and supplies the data as write management data S27 to the encoder circuit 53A, the write management data S27 being comprised of an FSK demodulation signal whose waveform is shown in FIG. 17. The data audio signal S41 that appears at the output terminal of the encoder 53A is recorded to the audio recording tracks CH1 and CH2 (FIG. 3) on the video tape 36 through the recording switchover circuit 53B, the recording circuit 53C, the audio electromagnetic conversion circuit 33A in the electromagnetic conversion circuit 33, and the magnetic head 34.

When the management database audio track recording field $F_{AVA}$ has all been recorded on the video tape 36, the control management data processing CPU 8 supplies a management data recording end command to the mechanism control CPU 11. This action resets management data recording mode and causes the recording switchover signal S45 to switch the recording switchover circuit 53B to the side of the audio circuit 55. The switchover completes the series of the management database recording operations involved.

Upon receipt of a management database reproducing command, the control management data processing CPU 8 supplies the mechanism control CPU 11 with a management data start cue command.

At this point, the mechanism control CPU 11 runs the video tape 36 until the recording start position of the management database audio track recording field $F_{AVA}$ (FIG. 3) is reached thereon.

Thereafter, the control management data processing CPU 8 sends out the reproducing switchover signal S47 over the bus 9. This signal switches the reproducing switchover circuit 54B to the side of the decoder circuit 54C.

Concurrently, the control management data processing CPU 8 feeds an audio reproduction start command to the mechanism control CPU 11 so as to get the video tape recorder unit 3 ready for audio reproduction.

Thus the management data $D_{AV}$ recorded in the management database audio track recording field $F_{AVA}$ on the video tape 36 is supplied as the data audio signal S44 to the decoder circuit 54C, the management data being forwarded through the magnetic head 34, the audio electromagnetic conversion circuit 33A, the reproduction circuit 54A and the reproduction switchover circuit 54B. At this point, the control management data processing CPU 8 writes the read management data S28 to the basic data memory 43 over the bus 9, the data S28 having being output from the decoder circuit 54C.

When reproduction of the management data $D_{AV}$ comes to an end, the control management data processing CPU 8 uses the reproducing switchover signal S47 to switch the reproducing switchover circuit 54B to the side of the audio circuit 55. At the same time, the CPU 8 outputs an audio reproducing end signal to the mechanism control CPU 11. This completes the series of the management database reproducing operations involved.

In the above setup, the user may write, verify or alter the management data about the programs recorded on preset to be recorded on the video tape 36, the management data being located in the management database audio track recording field $F_{AVA}$ of the video tape 36. This scheme frees the users of the conventional devices of this kind from the chores of running the video tape in search mode or reproducing mode every time it is necessary to verify the contents of a desired program recorded anywhere on the video tape.

Because various kinds of management data $D_{AV}$ may be retained on each video tape as the management data specific thereto, it is possible to further improve the intrinsic functions of the video tape recorder in terms of sophistication. When combined with external devices to constitute a system, the video tape recorder may function as the command center thereof.

(2) Other Embodiments of the Third Embodiment (2-1) In the embodiment of FIG. 16, the encoder circuit 53A and the decoder circuit 54C are located in the audio recording encoder 53 and the audio recording decoder 54, respectively. In this arrangement, the management data, which is read from the basic data memory 43, is converted into data audio signal format. In the same arrangement, the reproduced data audio signal is converted to management data whose format is conductive to being written to the basic data memory 43. Alternatively, the convention involved may be implemented by the control management data processing CPU 8 on a software basis.

(2-2) In the embodiment of FIG. 6, the management data $D_{AV}$ comprises the volume data block $D_{VM}$ and program data block $D_{PR}$ written in that order from the beginning of the recording tracks. Alternatively, the blocks may be switched between their positions, subdivided into further blocks for different arrangements, or otherwise allocated on the tape.

(2-3) In the embodiment of FIG. 16, the management database audio track recording field $F_{AVA}$ is located at the tape top part of the video tape 36. Alternatively the field may be located somewhere else on the tape.

Figure 18A:
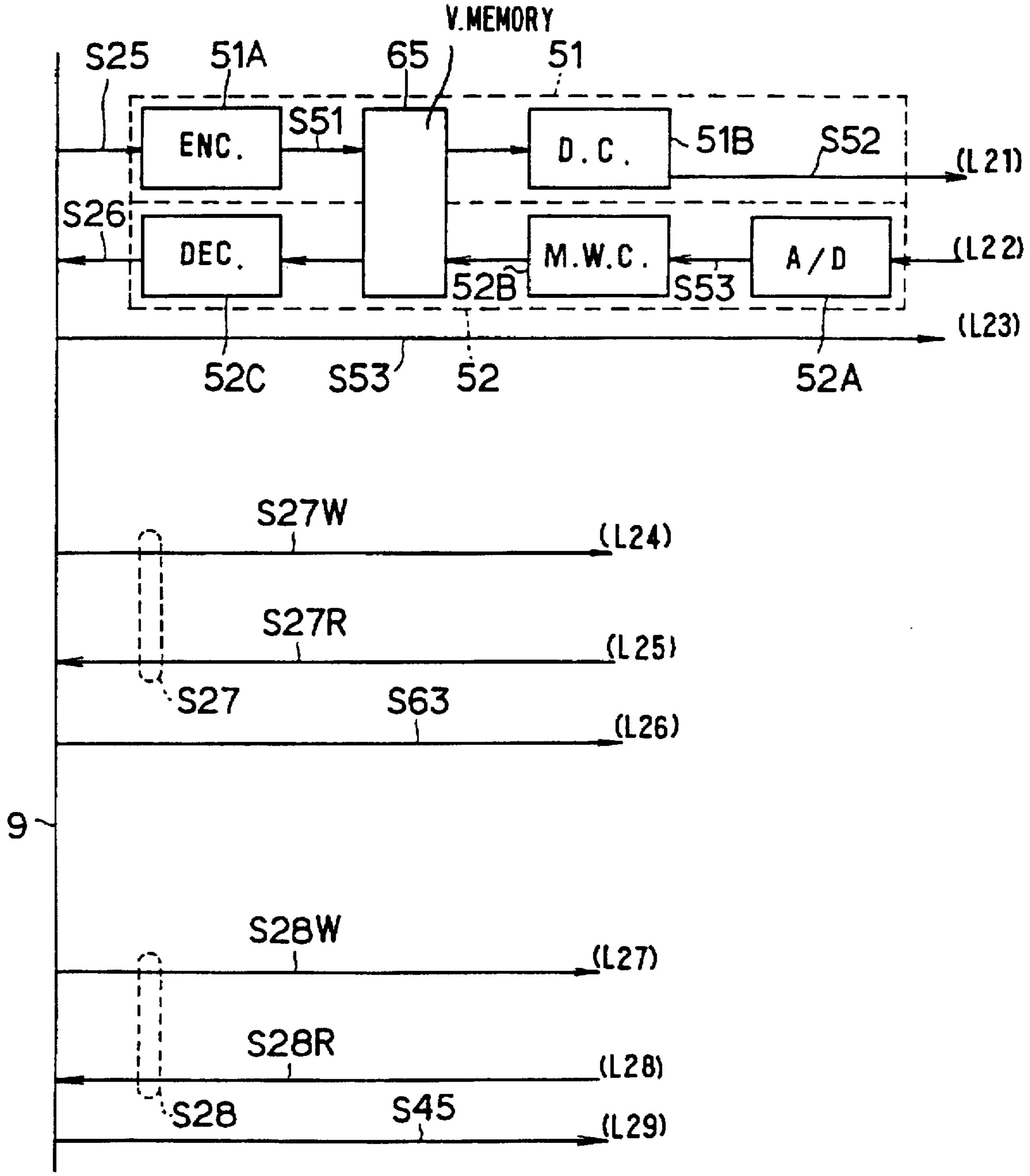
FIG. 18A–18B is a detailed block diagram of the video recording encoder and decoder, the audio recording encoder/decoder, and the CTL recording encoder/decoder contained in the video tape recorder.
Figure 18B:
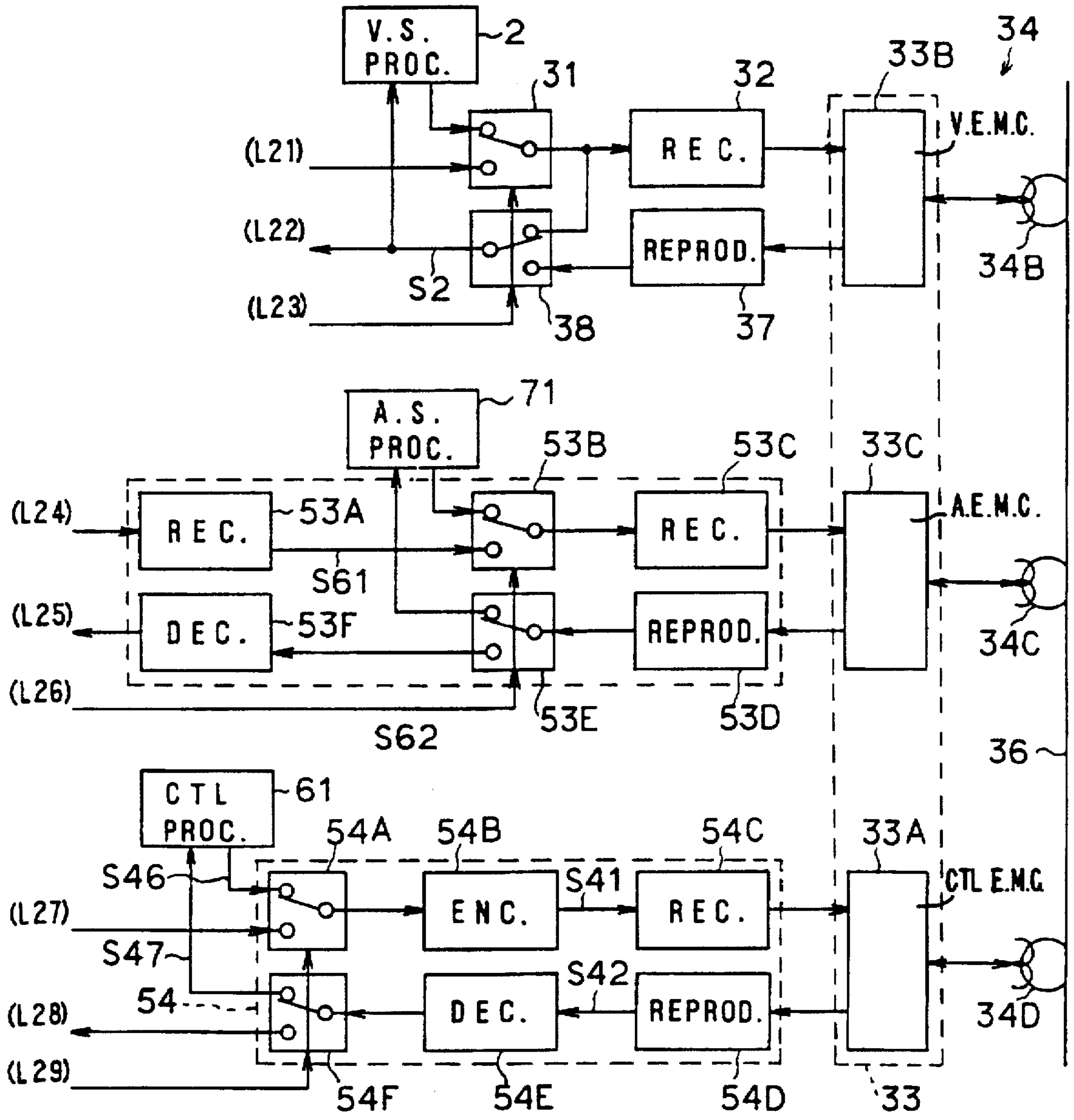

[4] Fourth Embodiment (1) Recording of Management Data $D_{AV}$ to Management Database Control Signal Track Recording Field $F_{AVC}$ In fourth embodiment, as shown in FIG. 18, the CTL recording encoder/decoder 54 is connected to the control signal head 34A in the magnetic head 34 through the CTL electromagnetic conversion circuit 33A in the electromagnetic conversion circuit 33. In operation, the CTL recording encoder/decoder 54 converts the management data $D_{AV}$ into a data control signal, and writes the signal to the control signal recording track TCT in the format identical to that of the control signal. The data control signal reproduced from the control signal recording track TCT in the format identical to that of the control signal is converted to the management data $D_{AV}$ which is input under control of the control management data processing CPU 8.

That is, the CTL recording encoder/decoder 54 lets the control management data processing CPU 8 supply the management data $D_{AV}$ as recording management data S28W to the encoder circuit 54B via the write switchover circuit 54A according to the control data S5, the management data $D_{AV}$ being contained in the register 44 (FIG. 1), the recording management data S28W constituting the write/read management data S28.

The encoder circuit 54B converts the write management data S28 into the data control signal S41 which is supplied to the CTL electromagnetic conversion circuit 33A via the recording circuit 54C. Then the control head S4A records the data control signal S41 to the management signal recording track TCT (FIG. 3) on the video tape 36.

In this manner, the management database control signal track recording field $F_{AVC}$ (FIG. 3) is formed at the tape top part of the video tape 36.

When the control management data processing CPU 8 enters management data reproducing mode, the management data $D_{AV}$ recorded in the management database control signal recording field $F_{AVC}$ is reproduced by the control signal head 34A from the control signal recording track TCT thereof. The reproduced signal is supplied as the data control signal S42 to the decoder circuit 54E through the CTL electromagnetic conversion circuit 33A and the reproducing circuit 54D. The decoder circuit 54E writes the data control signal S42 over the bus 9 to the register 44 under control of the control management data processing CPU 8, the data control signal being forwarded as the read management data S28R constituting part of the write/read management data S28.

When management data recording mode or management data reproducing mode is selected, the recording switchover circuit 54A or the reproducing switchover circuit 54F is switched to the position corresponding to the management data recording mode or management data reproducing mode, respectively, according to the switchover control signal S45 given by the control management data processing CPU 8. If recording mode or reproducing mode is selected, the recording switchover circuit 54A or the reproducing switchover circuit 54F is switched to the side of the CTL processing circuit 61. Thus in recording mode, the recording control signal S46 is recorded onto the video tape 36 through the recording switchover circuit 54A, the encoder circuit 54B, the recording circuits 54C, the CTL electromagnetic conversion circuit 33A, and the control signal head 34A. In reproducing mode, the reproducing control signal S47 is read out to the CTL processing circuit 61, the control signal being obtained via the control signal head 34A, the CTL electromagnetic conversion circuit 33A, the reproduction circuit 54D, the decoder circuit 54E and the reproduction switchover circuit 54F.

Figures 19A, 19B, 19C, 20A, 20B, 20C:
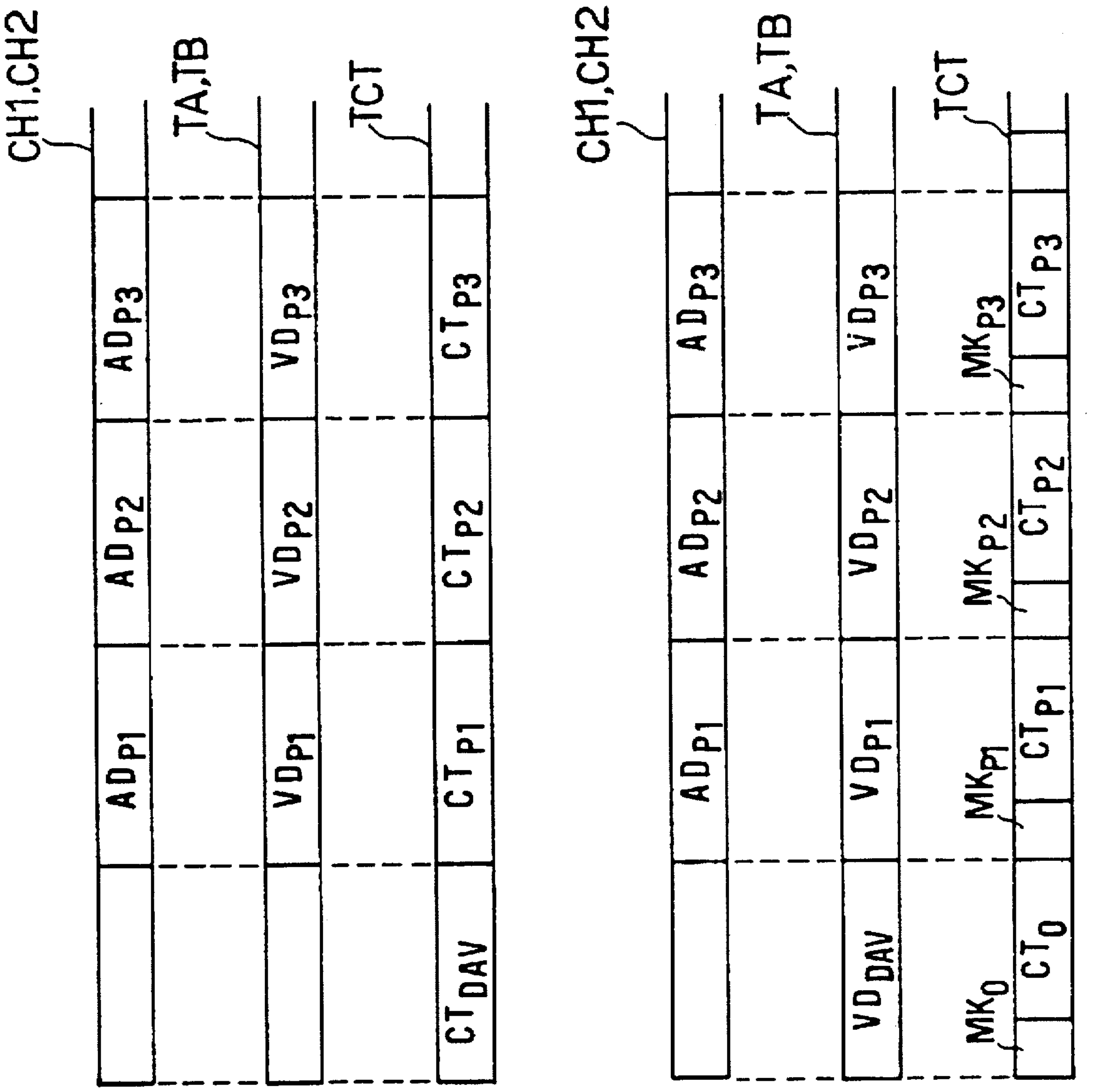

In the setup of FIG. 18, the CTL recording encoder/decoder 54 gets the encoder circuit 54B to convert the write management data S28W into the data control signal S41, the write management data being transferred from the register 44 when the control management data processing CPU 8 enters management data recording mode. As illustrated in FIG. 19C, the data control signal S41 is recorded to a specific part of the video tape 36, e.g., to the control signal recording track TCT at the tape top.

When the write management data S28W is logically set to 1 or 0, the encoder circuit 54B changes accordingly the duty factor of the CTL pulses constituting the control signal. This causes the write control data S28W to be converted to the data control signal S41.

After the management data control signal $CT_{DAV}$ (FIG. 19C) has been recorded to the tape top part of the control signal recording track TCT, programs P1, P2, P3, etc., are recorded on the video tape 36. This causes program video signals $VD_{P1}$, $VD_{P2}$, $VD_{P3}$, etc., to be recorded to the video recording tracks TA and TB (FIG. 19B) and audio signals $AD_{P1}$, $AD_{P2}$, $AD_{P3}$, etc., to be recorded to the audio recording tracks CH1 and CH2. At the same time, management signals $CT_{P1}$, $CT_{P2}$, $CT_{P3}$, etc., are recorded to the control signal recording track TCT (FIG. 13A).

With the video tape recorded in the manner above, the tape top thereof contains the management data about the programs recorded or preset to be recorded thereon. The management data is subsequently used to have manage the video tape and/or the programs recorded or preset to be recorded thereon.

If the user wants to view a program on the video tape 36, or if the user loads the video cassette 35 into the video tape recorder unit 3 in order to preset a program for recording onto the video tape 36 (FIG. 1), the control management data processing CPU 8 communicates with the mechanism control CPU 11 using the control information S6 so as to put the entire video tape recorder in management data reading mode. With the video tape 36 forwarded and indexed to the position where the management data control signal $CT_{DAV}$ is recorded, the control management data processing CPU 8 gets the control signal head 34A to reproduce the management data control signal $CT_{DAV}$ so that the read management data S28R may be output from the decoder circuit 54E. The read management data S28R is supplied to the register 44 over the bus 9.

Thereafter, the control management data processing CPU 8 resorts to the management data $D_{AV}$ in the register 44 to know the control status of the programs in the video cassette 35 which is set in the video tape recorder unit 3. Thus whenever the user specifies a desired recorded program for viewing or presets a program for subsequent unattended recording, the control management data processing CPU 8 reads the management data $D_{AV}$ from the register 44 for managing the video tape recorder unit 3, or overwrites or alters the management data $D_{AV}$ in the register 44 as needed. In this way, diverse kinds of management data including the presetting of programs may be written by the user when necessary.

As described, when the user gives operating instructions to the mechanism control CPU 11 using the management data, the management data processing CPU 8 automatically controls the video tape recorder unit 3 for recording, presetting and other actions.

In the above-described setup of the CTL recording encoder/decoder 54, the management data control signal $CT_{DAV}$ is recorded to the control signal recording track TCT. Using the management data in this manner makes management the programs on the video tape 36 substantially easier than the prior art devices of the comparable kind.

Figure 13:
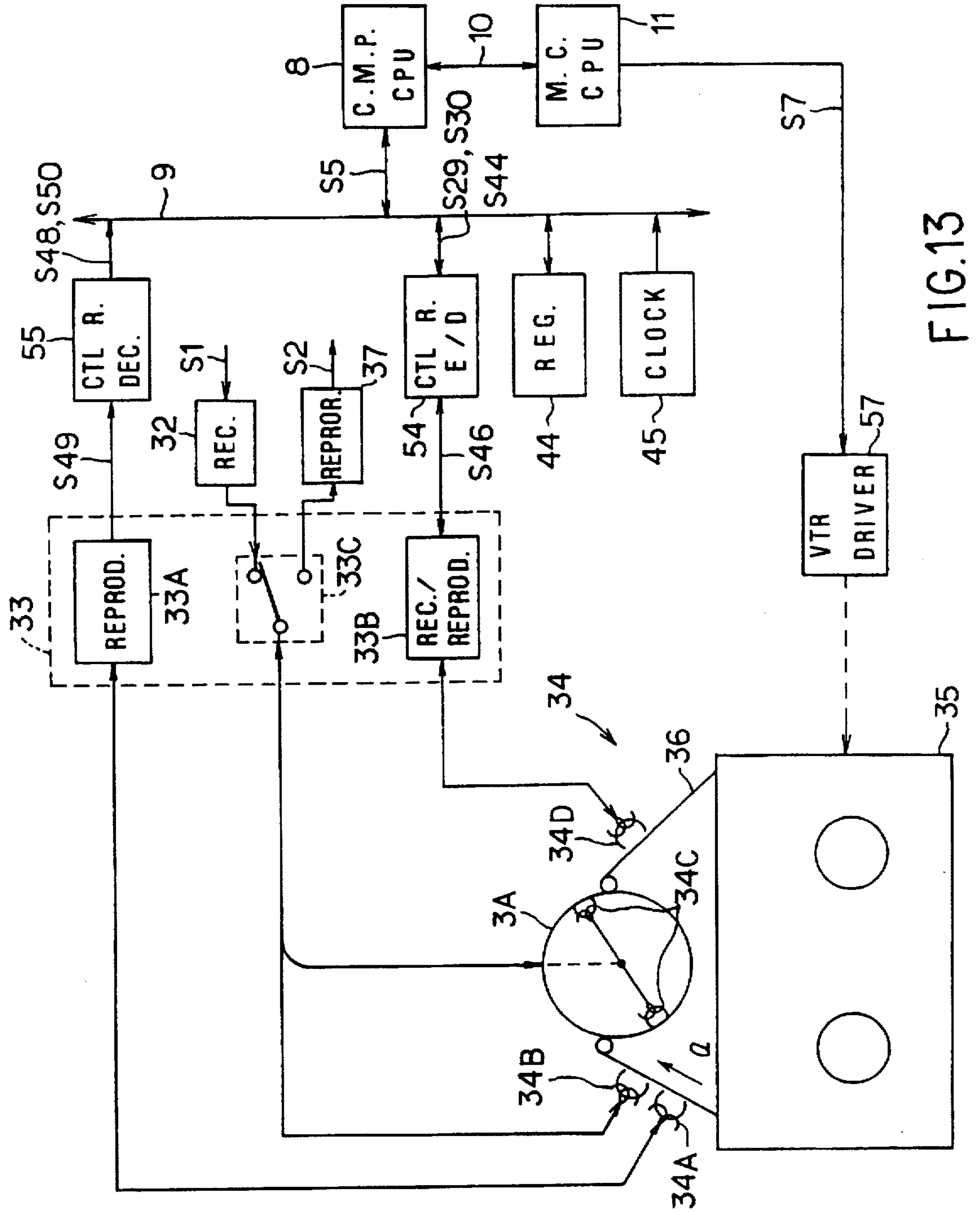
FIG. 13 is a block diagram showing how a recorded program is overwritten with a new program.

(2) Distributed Recording of Management Data $D_{AV}$ (2-1) Recording in Control Signal Format and Video Signal Format In the embodiment of FIG. 13, the control management data processing CPU 8 may distributively record the management data $D_{AV}$ to positions adjacent and corresponding to the programs recorded on the video tape 36. The distributed recording of the management data is performed using the CTL recording encoder/decoder 54, the video recording encoder 51 and the video recording decoder 52.

In the setup of FIG. 18, the video recording encoder 51 has the same construction as embodiment as shown in FIG. '14 has. Therefore as described with reference to FIG. 14, the tape top part of the video tape 36 contains the management database video track recording field $F_{AVV}$. The management data video signal $VD_{DAV}$ is recorded to the management database video track recording field $F_{AVV}$, as shown in FIG. 20B.

When the control management data processing CPU 8 enters management data reproducing mode, the management data video signal $VD_{DAV}$ reproduced by the video head 34B from the management database video track recording field $F_{AVV}$ is supplied as the reproduced video signal S2 to the video recording decoder 52, the management data video signal $VD_{DAV}$ being forwarded through the video electromagnetic conversion circuit 33B, the reproduction circuit 37 and the reproduction switchover circuit 38.

At this point, the video recording decoder 52 gets the analog/digital conversion circuit 52A to convert the reproduced video signal S2 (data video signal) into the video data S53. The converted data is written to the video memory 65 via the memory write control circuit 52B.

The video data written to the video memory 65 in the manner above is converted by the decoder circuit 52C into the read control data S26 for output onto the bus 9.

In this embodiment, the recording switchover circuit 31 and the reproducing switchover circuit 38 are switched according to the switchover control signal S53 given by the control management data processing CPU 8 over the bus 9. In management data writing mode, the recording switchover circuit 31 is switched to the side of the video recording encoder 51. In management data reproduction mode, the reproduction switchover circuit 38 is switched to the side of the reproducing circuit 37. The switchover allows the reproduced video signal S2 to reach the video recording decoder 52.

When the control management data processing CPU 8 enters video signal recording mode, the recording switchover circuit 31 is switched to the side of the video signal processing unit 2. In that case, as shown in FIG. 20B, the video signals $VD_{P1}$, $VD_{P2}$, $VD_{P3}$, etc., of the programs P1, P2, P3, etc., are recorded to the video tracks TA and TB following the management data video signal $VD_{DAV}$. When the control management data processing CPU 8 enters reproducing mode, the video signals $VD_{P1}$, $VD_{P2}$, $VD_{P3}$, etc., are supplied consecutively to the video signal processor 2 via the reproducing switchover circuit 38 which is switched to the side of the video signal processing unit 2.

Simultaneously with the video signals $VD_{P1}$, $VD_{P2}$, $VD_{P3}$, etc., of the programs P1, P2, P3, etc., being recorded to the video recording tracks TA and TB, the audio signals $AD_{P1}$, $AD_{P2}$, $AD_{P3}$, etc., are recorded to the audio recording tracks CH1 and CH2, as depicted in FIG. 20A. At the same time, as illustrated in FIG. 20C, the control signals $CT_{P1}$, $CT_{P2}$, $CT_{P3}$, etc., are recorded along with the mark signals $MK_{P1}$, $MK_{P2}$, $MK_{P3}$, etc., to the control signal recording track TCT.

In the above-described setup, with the control management data processing CPU 8 in management data recording mode, the management data $D_{AV}$ in the register 44 is given to the video recording encoder 51 as the write management data S25. This causes the management data video signal $VD_{DAV}$ (FIG. 14B) to be recorded to the tape top part of the video recording tracks TA and TB on the video tape 36.

Concurrently, the control management data processing CPU 8 supplies the CTL recording encoder/decoder 54 with part of the management data in the register 44 as the write management data S28W. This in turn causes the mark management signal $MK_0$, as part of the management data $D_{AV}$, to be recorded to a position on the control signal recording track TCT, that position corresponding to the beginning of the management data video signal $VD_{DAV}$.

Thus, at the same time as the management data video signal $VD_{DAV}$ is recorded to the video recording tracks TA and TB on the video tape 36 via the video recording encoder 51, the control management data processing CPU 8 switches the recording switchover circuit 54A to the side of the bus 9 using the switchover control signal S45. The switchover allows the write management data S28W to be written as the mark management signal $MK_0$ to the control signal recording track TCT. After this, the recording switchover circuit 54A is switched to the side of the CTL processor 61 so that the control (CTL) signal about each recording track in which the management data video signal $VD_{DAV}$ is recorded may be recorded onto the control signal recording track TCT.

When the video cassette 35 containing the recorded video tape 36 is loaded into the video tape recorder unit 3, the control management data processing CPU 8 enters management database reproducing mode while communicating with the mechanism control CPU 11, and gets the video recording decoder 52 to read out the management data video signal $DV_{DAV}$ as the read control data S26 onto the bus 9 through the reproducing switchover circuit 38. At this point, the mark management signal $MK_0$ recorded in the control signal recording track TCT is output to the bus 9 as the read management data S28R through the reproducing switchover circuit 54F. This makes it much easier to extract the management data video signal $VD_{DAV}$.

Furthermore, when the video signals $VD_{P1}$, $VD_{P2}$, $VD_{P3}$, etc., of the programs P1, P2, P3, etc., are recorded to the video recording tracks TA and TB by the video signal processor 2, the control management data processing CPU 8 writes management data to specific positions on the control signal recording track TCT, those positions corresponding to the beginning of each mark control signal, the management data being read from the register 44 as the mark control signals $MK_{P1}$, $MK_{P2}$, $MK_{P3}$, etc., and forwarded as the write management data S28W through the recording switchover circuit 54A of the CTL recording encoder/decoder 54.

When the program video signals $VD_{P1}$, $VD_{P2}$, $VD_{P3}$, etc., recorded on the video recording tracks TA and TB are reproduced illustratively according to the management data placed in the register 44, the mark control signals $MK_{P1}$, $MK_{P2}$, $MK_{P3}$, etc., are read from the CTL recording encoder/decoder 54 as the read management data S28R representing the recorded positions of the video data signals $VD_{P1}$, $VD_{P2}$, $VD_{P3}$, etc. Because the video data of each program recorded on the video recording tracks TA and TB is reproduced easily and reliably in the manner above, management of the programs in their recording and reproduction is made considerably easier.

(2-2) Recording in Control Signal Format and Audio Signal Format

Figures 21A, 21B, 21C, 22A, 22B, 22C:
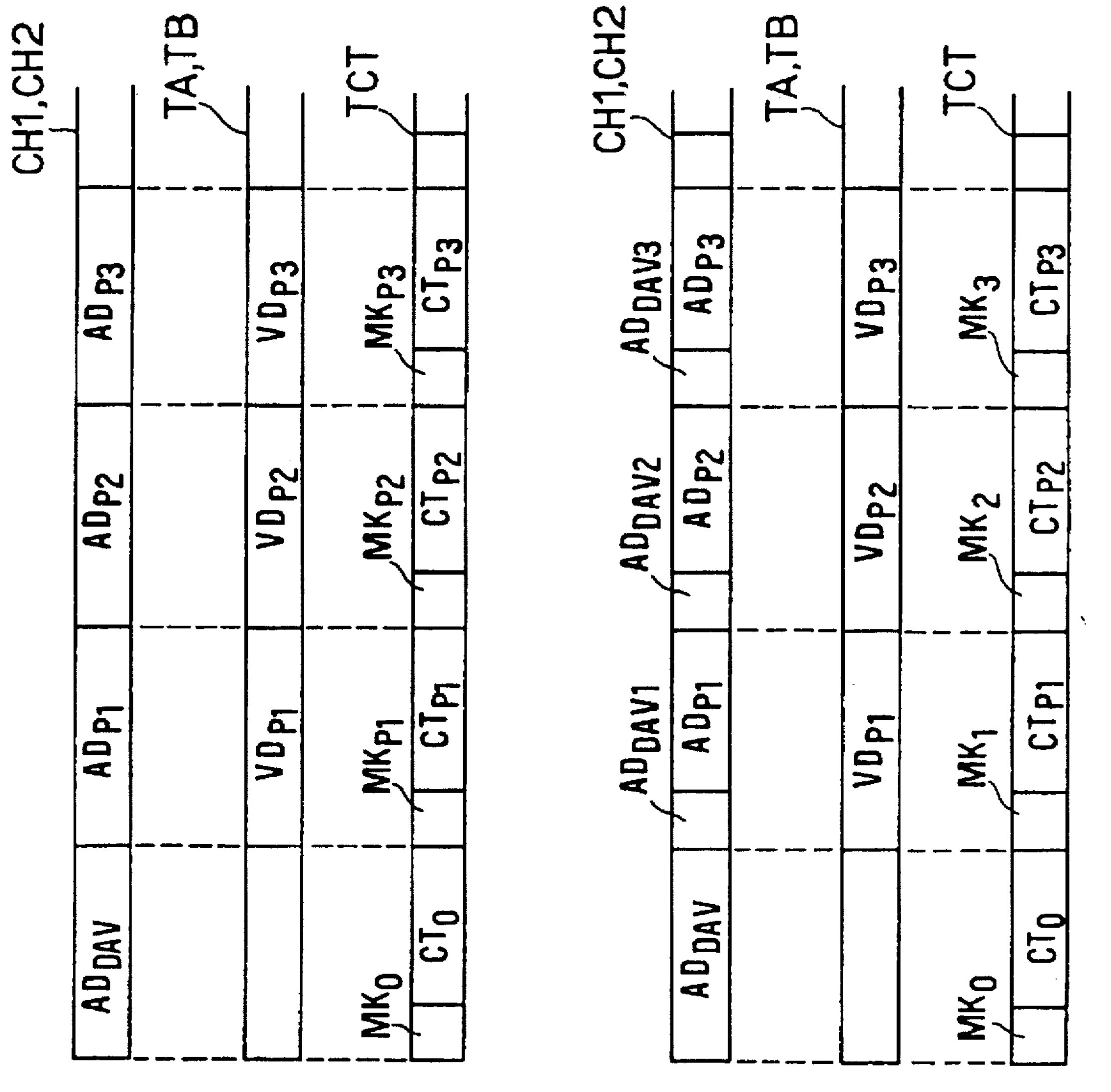

In the setup of FIG. 18, the audio recording encoder/decoder 53 has the same contraction as embodiment as shown in FIG. 16 so as to convert the management data $D_{AV}$ to the data audio signal for recording onto the video tape 36 in the same format as that of the audio signal as shown in FIG. 21A. In addition, the audio recording encoder/decoder 53 converts to the management data $D_{AV}$ the data audio signal reproduced from the video tape 36 in the same format as that of the audio signal, the management data being supplied to the control management data processing CPU 8.

Furthermore, the control management data processing CPU 8 switches the recording switchover circuit 54A in the CTL recording encoder/decoder 54 to the side of the bus 9. The switchover allows part of the management data $D_{AV}$ read from the register 44 to be supplied as the write management data S28W to the CTL recording encoder/decoder 54. In this way, as depleted in FIG. 21C, the write management data S28W is written as the mark signal $MK_0$ to the part corresponding to the beginning of the management database audio track recording field $F_{AVA}$ (FIG. 3) where the management database audio signal $AD_{DAV}$ is recorded.

At this point, the mark signal $MK_0$ is recorded by changing the duty factor of the control signal $CT_0$ in accordance with the logic level of the control data, the control signal being constituted by the CTL pulses recorded on the control signal recording track TCT.

As a result, the management data audio signal $AD_{DAV}$ is recorded to the tape top part of the audio recording tracks CH1 and CH2 on the video tape 36. At the same time, the mark signal $MK_0$ is distributively recorded as part of the management data onto the control signal recording track TCT which corresponds to the beginning of the part where the management data audio signal $AD_{DAV}$ is recorded.

In the manner described, the video signals $VD_{P1}$, $VD_{P2}$, $VD_{P3}$, etc., of the programs P1, P2, P3, etc., are recorded by the video signal processing unit 2 onto the video recording tracks TA and TB of the video tape 86 which has the management data $D_{AV}$ as its header data. In addition, when the audio signals $AD_{P1}$, $AD_{P2}$, $AD_{P3}$, etc., are to be concurrently recorded to the audio tracks CH1 and CH2 via the audio signal processing circuit 71 (FIG. 21B), the control management data processing CPU 8 switches the recording switchover circuit 54A in the CTL recording encoder 1 decorder 54 to the side of the bus 9. The switchover allows the mark signals $MK_1$, $MK_2$, $MK_3$, etc., to be recorded as part of the management data to the positions corresponding to the recording start positions of the video signals $VD_{P1}$, $VD_{P2}$, $VD_{P3}$, etc., of the programs P1, P2, P3, etc.

A recorded video tape 36 is created in the manner described above. When the user wants to view a given program on the recorded video tape 36, the user first loads the video cassette 35 into the video tape recorder unit 3. This causes the control management data processing CPU 8 to read the management data audio signal $AD_{DAV}$ from the audio recording tracks CH1 and CH2 on the video tape 36 through the audio recording encoder/decoder 53 and to place the signal into the register 44. Using the management data in the register 44 about the recorded programs P1, P2, P3, etc., the control management data processing CPU 8 reproduces, records or presets the desired program as specified by the user.

With the mark signals $MK_0$, $MK_1$, $MK_2$, etc., thus attached to the control signal recording track TCT, the video tape recorder according to the invention identifies quickly and precisely the recorded position of each program on the video tape 36. Thus the video tape recorder as embodied above allows the user to record, reproduce or preset programs on the video tape much more easily than before.

(2-3) Recording in Control Signal Format and Another Signal Format

FIG. 22 illustrates another embodiment of the invention whereby control data is distributively recorded to the audio recording tracks CH1 and CH2 as well as to the control signal recording track TCT. In FIGS. 22 as well as FIG. 21, like reference characters designate like or corresponding parts. The format of FIG. 22 comprises an addition to that of FIG. 21. That is, in the format of FIG. 21, when the video signal $VD_{P1}$, $VD_{P2}$, $VD_{P3}$, etc., of the programs P1, P2, P3, etc., are recorded onto the video tracks TA and TB, the corresponding audio signals $AD_{P1}$, $AD_{P2}$, $AD_{P3}$, etc., are recorded to the audio recording tracks CH1 and CH2. In addition to the above format, program-wise control data audio signals $AD_{DAV1}$, $AD_{DAV2}$, $AD_{DAV3}$, etc., are recorded at the beginning of each of the audio signals $AD_{P1}$, $AD_{P2}$, $AD_{P3}$, etc., recorded in the format of FIG. 22.

With the format of FIG. 22 in use and with the control management data processing CPU 8 in management data recording mode, those items of the management data $D_{AV}$ which are common to the programs are read from the register 44 and supplied as the write management data S27W to the audio recording encoder/decoder 53. The write management data S27W is then recorded as the management data audio signal $AD_{DAV}$ to the tape head part of the audio recording tracks CH1 and CH2 on the video tape 36.

At this point, when the management data audio signal $AD_{DAV}$ beings to be recorded, the recording switchover circuit 54A in the CTL recording encoder/decoder 54 is switched to the side of the bus 9. The switchover allows the write management data S28W constituting the mark signal $MK_0$ to be transferred from the register 44 and written to the control signal recording track TCT.

Thereafter, when the video signals $VD_{P1}$, $VD_{P2}$, $VD_{P3}$, etc., of the programs P1, P2, P3, etc., are to be recorded to the video recording tracks TA and TB, the control management data processing CPU 8 switches the recording switchover circuit 53B in the audio recording encoder/decoder 53 to the side of the encoder circuit 53A. The switchover causes the management data on each program to be transferred from the register 44 as the write management data S27W. This in turn causes the program-wise management data audio signals $AD_{DAV1}$, $AD_{DAV2}$, $AD_{DAV3}$, etc., to be recorded to the audio recording tracks CH1 and CH2 of the video tape 36.

When the recorded video cassette 35 is loaded into the video tape recorder unit 3, the control management data processing CPU 8 indexes the video tape 36 to the management data audio signal $AD_{DAV1}$ using the mark signal $MK_0$, and then switches the reproduction switchover circuit 53E of the audio recording encoder/decoder 53 to the side of the decoder circuit 53F. This causes the management data audio signal $AD_{DAV}$ to be read as the read management data S27R into the register 44.

Thereafter, when the video signals $VD_{P1}$, $VD_{P2}$, $VD_{P3}$, etc., of the programs P1, P2, P3, etc., are to be reproduced from the video recording tracks TA and TB, the control management data processing CPU 8 indexes the video tape 36 using the mark signals $MK_1$, $MK_2$, $MK_3$, etc., corresponding to the programs, and then switches the reproduction switchover circuit 53E to the side of the decoder circuit 53F. This causes the program-wise management data audio signals $AD_{DAV1}$, $AD_{DAV2}$, $AD_{DAV3}$, etc., to be reproduced from the audio recording tracks CH1 and CH2 and written as the read management data S27R to the register 44. The individual programs are controlled in accordance with the program-wise management data.

In the alternative embodiment described above, the program-wise management data audio signals $AD_{DAV1}$, $AD_{DAV2}$, $AD_{DAV3}$, etc., of the individual programs are recorded to the audio recording tracks CH1 and CH2. Because the management data specific to each program is recorded to the position where that program is recorded, management of the individual programs is made much more reliable and precise than before.

(3) Other Embodiments of the Fourth Embodiment (3-1) In the embodiments of FIGS. 18 to 22, the video recording encoder 51 and the video recording decoder 52 convert the write management data S25 to the data video signal; the audio recording encoder/decoder 53 converts the write management data S27 to the data audio signal; and the CTL recording encoder/decoder 54 converts the write management data S28W to the data control signal. All write management data are transferred from the register 44. The data video signal, data audio signal and data control signal are recorded onto the video tape 36. When reproduced, the data video signal, data audio signal and data control signal are converted by hardware to the read management data S26, S27R and S28R, respectively, for writing to the register 44. Alternatively, the above conversion may be carried out on a software basis by the control management data processing CPU 8.

(3-2) In the embodiments of FIGS. 18 to 22, the management data $D_{AV}$ comprises the volume data block $D_{VM}$ and program data block $D_{PR}$ written in that order from the beginning of the recording tracks. Alternatively, the blocks may be switched between their positions, subdivided into further blocks for different arrangements, or otherwise allocated on the tape.

[5] Fifth Embodiment (1) Recording of the Program Start Address and Program End Address In fifth embodiment as shown In FIG. 23, when recording one or a plurality of programs P1, P2, P3, etc., onto the video tape 36, the control data processing CPU 8 also records address-related data into the start address item B1 and end address item B2 of the address data $D_{PRX}$ (FIG. 6), the data representing the recording start point and the recording end point of each program as the program start address value and the program end address value, respectively, relative to the tape top. Thereafter, whenever a program on the recorded video tape 36 is to be reproduced, overwritten or otherwise accessed, the system may recognize the recorded position of that program without actually running the tap until the program is reached.

When the user inputs each item of the management data $D_{AV}$ (FIG. 4) as the I/O data S4 through the remote control transceiver 7 by operating the remote controller 6, the control management data processing CPU 8 places the data into the register 44. Thereafter, in management data recording mode for example, with the video cassette 35 ejected, the control management data processing CPU 8 transfers the management data $D_{AV}$ from the register 44 to the video recording encoder 51 in the form of write management data S25. In turn, the video recording encoder 51 converts the write management data S25 into the data video signal S42 and supplies the signal to the recording circuit 32 through the recording switchover circuit 31.

At this point, the recording circuit 32 handles the data video signal S42 in the same manner as the recording video signal S1, i.e., writes the signal as one corresponding to a one-field video signal onto the video recording track TA and TB (FIG. 3) of the video tape 36. The writing of the data video signal S42 is carried out via the video electromagnetic conversion circuit, part of the electromagnetic conversion circuit 33 and via the video head, part of the magnetic head 34.

Figures 23A, 23B, 23C, 24A, 24B, 24C:
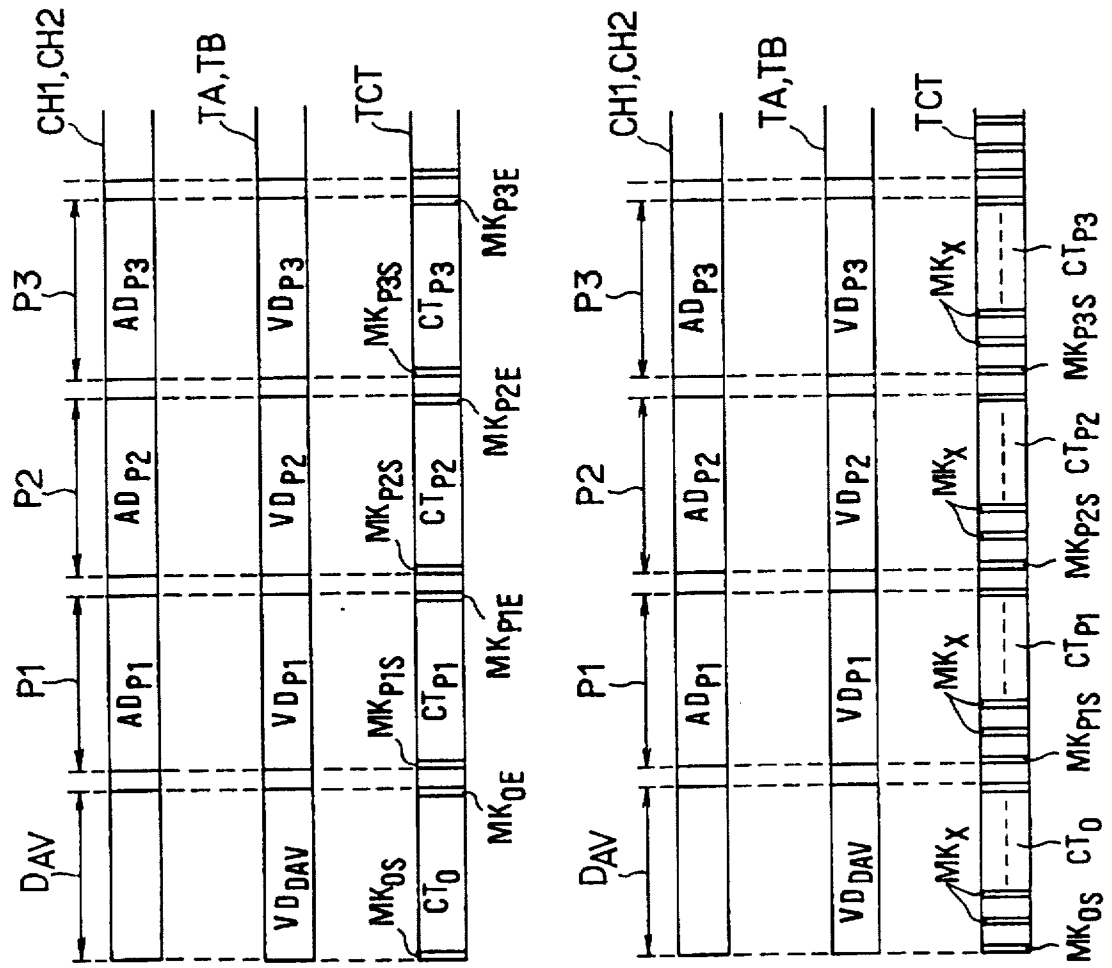
FIG. 23A–23C is a schematic diagram of the format of start and end addresses for use with the fifth embodiment.
FIG. 24A–24C is a schematic diagram of the recording format for use with the another embodiment.

In this manner, the management database video track recording field $F_{AVV}$ (FIG. 3) is formed illustratively at the tape top part of the video tape. As depicted in FIG. 23B, the management data video signal $VD_{DAV}$ is recorded to the management database video track recording field $F_{AVV}$.

While the write operation above is under way, the control management data processing CPU 8 transfers the mark recording data as the control signal recording data S44 to the CTL recording encoder/decoder 54. The CTL recording encoder/decoder 54 converts the control signal recording data S44 into the data control signal S46. In turn, the data control signal S46 is written as a recording start point mark signal $MK_{0S}$ (FIG. 12C) to the control signal recording track TCT on the video tape 36 through the control signal electromagnetic conversion circuit, part of the electromagnetic conversion circuit 33 and through the control signal head, part of the magnetic head 34.

Thereafter, the control management data processing CPU 8 transfers the control signal as the control signal recording data S44. This causes the control signal $CT_0$ to be recorded to the control signal recording track TCT. At the same time, the recording end point mark signal $MK_{0E}$ is recorded by once again supplying the control signal recording data S44 the moment that recording of the management data video signal $VD_{DAV}$ (FIG. 12B) has ended.

In program recording mode, the control management data processing CPU 8 records the program video signals $VD_{P1}$, $VD_{P2}$, $VD_{P3}$, etc., of the programs P1, P2, P3, etc., (FIG. 12B) consecutively to the video recording tracks TA and TB in the video signal recording field $F_{VD}$ (FIG. 3) following the management database video track recording field $F_{AVV}$. Concurrently, the control management data processing CPU 8 records the corresponding program audio signals $AD_{P1}$, $AD_{P2}$, $AD_{P3}$, etc., to the audio recording tracks CH1 and CH2 (FIG. 23A, while recording the control signals $CT_{P1}$, $CT_{P2}$, $CT_{P3}$, etc., to the control signal recording track TCT (FIG. 23C).

In the above program recording mode, the control management data processing CPU 8 supplies the CTL recording encoder/decoder 54 with the mark signal data as the control signal recording data S44 both at the recording start point and at the recording end point of each of the video signals $VD_{P1}$, $VD_{P2}$, $VD_{P3}$, etc. This permits recording of the recording start point mark signals $MK_{P1S}$, $MK_{P2S}$, $MK_{P3S}$, etc., as well as the recording end point mark signals $MK_{P1E}$, $MK_{P2E}$, $MK_{P3E}$, etc. (FIG. 23C).

In this embodiment, each of the mark signals $MK_{0S}$ and $MK_{0E}$, $MK_{P1S}$ and $MK_{P1E}$, $MK_{P2S}$ and $MK_{P2E}$, $MK_{P3S}$ and $MK_{P3E}$, etc., is constituted by a tape position address value relative to the reference point at the tape top on the video tape 36. The tape position address value is obtained illustratively by transferring to the control management data processing CPU 8 the value of the tape counter in the video tape recorder unit 3, the value being forwarded via the mechanism control CPU 11.

When the recorded video cassette 35 is loaded into the video tape recorder unit 3 in the above-described setup, the control management data processing CPU 8 enters management database reproducing mode through communication with the mechanism control CPU 11. Once in management database reproducing mode, the control management data processing CPU 8 picks up the data video signal from the management database video track recording field $F_{AVV}$ on the video tape 86 and writes the signal into the register 44, the signal being forwarded through the magnetic head 34, the video electromagnetic conversion circuit 33, the reproducing circuit 37, the reproducing switchover circuit 38 and the video recording decoder 52.

Thus the register 44 retains the management data $D_{AV}$ (FIG. 4) as the management data specific to the current video tape 36. The program data block $D_{PR}$ retains the program data $D_{PRX}$ (FIG. 6) about the programs P1, P2, P3, etc., recorded on the video tape 36.

In the manner described, the register 44 constitutes an arrangement of concentrated management of program positions on a video tape, with the start address item B1 and the end address item B2 of the program data $D_{PRX}$ containing positional data representing the recording start points and recording end points $MK_{P1S}$ and $MK_{P1E}$, $MK_{P2S}$ and $MK_{P2E}$, $MK_{P3S}$ and $MK_{P3E}$, etc., of the programs P1, P2, P3, etc., each point being an address indicating the starting or ending position of a given program on the video tape 36 relative to the reference point at the tape top.

Using the above arrangement, the user verifies the contents of the start address item B1 and the end address item B2 of the program data $D_{PRX}$ on each program. This allows the user to know easily where the desired program is located on the video tape 36 without undergoing the chores of actually forwarding fast and reproducing the video tape. Access to any of the programs on the video tape is thus made much easier than before.

For example, assume that the user wishes to reproduce programs recorded on the video tape 36 in a predetermined order. In that case, all that needs to be done is to get the control management data processing CPU 8 to rearrange the start and end addresses of the programs involved into the desired order. This simplified process readily implements reproduction of recorded programs in a predetermined order.

It may also be desired to record a new program onto the video tape 36 or to overwrite a new program onto a previously recorded program. In such cases, the new recording position is determined beforehand by resorting to the register 44 which retains the start and end addresses of the recorded programs in a concentrated manner.

When the user wants to get to the beginning of a certain program so that the program may be manipulated as desired, the control management data processing CPU 8 reads the start and end addresses of that program from the register 44 according to the specification data entered through the remote controller 6. Thereafter, while communicating with the mechanism control CPU 11, the control management data processing CPU 8 forwards fast the video tape 36 and consecutively picks up the mark signals $MK_{P1S}$ and $MK_{P1E}$, $MK_{P2S}$ and $MK_{P2E}$, $MK_{P3S}$ and $MK_{P3E}$, etc., of the programs P1, P2, P3, etc., from the control signal head which is part of the magnetic head 34. A check is then made to see if the picked-up mark signals coincide with the addresses entered through the CTL recording encoder/decoder 54. When a matched recording start point mark signal is obtained, access to the beginning of the desired program on the video tape 36 is completed.

Where a new program is recorded onto the video tape 36, the following takes place. When the new program is recorded, the recording start point mark signal and the recording end point mark signal of that program are recorded to the control signal recording track TCT. At the end of recording operation mode, the addresses represented by these mark signals are respectively written to the start address item B1 and the end address item B2 constituting the program data $D_{PRX}$ for the program, the program data being part of the management data $D_{AV}$ in the register 44.

In this manner, every time a new program is recorded, the start address data and end address data thereabout are retained in the register 44 for concentrated control.

With the processing of the video tape 36 completed, and with the user about to eject the video cassette 35, specification data supplied to the control management data processing CPU 8 through the remote controller 6 causes the mechanism control CPU 11 to rewind the video tape 36 back to its tape top position. The supplied data is then recorded as the management data video signal $VD_{DAV}$ to the management database video track recording field $F_{AVV}$ of the video tracks TA and TB. Finally the video cassette 36 is ejected.

As a result, the tape top part of the video tape 36 retains the address data representing the recorded position of each program on the tape, the address data being specific to the current video tape 36. Whenever the video cassette 35 is loaded into the video tape recorder unit 3, the address data is read out easily for control purposes.

(2) Another Embodiment

FIG. 24 schematically describes the recording format for use with another embodiment of the invention. In FIGS. 23 and 24, like reference characters designate like or corresponding parts. As shown in FIG. 24, the recording start point mark signals $MK_{0S}$, $MK_{P1S}$, $MK_{P2S}$, $MK_{P3S}$, etc., are recorded to the positions of the control signals $CT_{P0}$, $CT_{P1}$, $CT_{P2}$, $CT_{P3}$, etc., on the control signal recording track TCT. At certain distances from each of these recording start point mark signals, count mark signals $MK_X$ are recorded. Each of the count mark signals is constituted by numerical data representing a predetermined value. In this format, the recording end point mark signals $MK_{0E}$, $MK_{P1E}$, $MK_{P2E}$, $MK_{P3E}$, etc., (FIG. 23C) are not included.

When the format of FIG. 24 is in use and the control management data processing CPU 8 records the management data $D_{AV}$ to the management database video track recording field $F_{AVV}$ (FIG. 24A), the recording start point mark signal $MK_{0S}$ and the count mark signal $MK_X$ are recorded in synchronization with each recording start point of the video recording tracks TA and TB.

Likewise, when the program video signals $VD_{P1}$, $VD_{P2}$, $VD_{P3}$, etc., of the programs P1, P2, P3, etc., are recorded to the video tracks TA and TB, the control management data processing CPU 8 records the recording start point mark signals $MK_{P1S}$, $MK_{P2S}$, $MK_{P3S}$, etc., in synchronization with the recording start points of these program video signals, each recording start point mark signal being followed by a count mark signal $MK_X$.

Assume that with the format of FIG. 24 in use, the program video signals $VD_{P1}$, $VD_{P2}$, $VD_{P3}$, etc., of the programs P1, P2, P3, etc., are recorded to the video tracks TA and TB. At the end of the recording, the control management data processing CPU 8 writes the addresses of the recording start point mark signals $MK_{P1S}$, $MK_{P2S}$, $MK_{P3S}$, etc., to the start address item B1 of the program data $D_{PRX}$ for the current program, the addresses being retained in the register 44 as the management data $D_{AV}$. Concurrently, the number of the count mark signals $MK_X$ up to the recording end point of the current programs written to the end address item B2 of the program data $D_{PRX}$.

The start and end addresses thus written to the management data $D_{AV}$ are recorded as the management data video signal $VD_{DAV}$ to the management database video track recording field $F_{AVV}$ when the video cassette 35 is ejected.

If the user wants to specify and reproduce one of the programs from the recorded video tape 36, the management data video signal $VD_{DAV}$ is read from the video recording tracks TA and TB and written to the register 44. Concurrently, the control management data processing CPU a gains access to the beginning of the desired program on the tape according to the start address of the program, and starts reproducing the program once it is reached on the tape.

The amount of feed of the video tape 36 in reproducing mode is monitored by the control management data processing CPU 8 counting the number of count mark signals $MK_X$ picked up from the control signal recording track TCT. When the count value coincides with the end address data stored in the end address item B2 of the register 44, the control management data processing CPU 8 judges the program to have been reproduced up to the recording end point thereof, and discontinues the reproduction.

It may be desired to overwrite a new program onto a previously recorded program on the tape. In that case, the control management data processing CPU 8 receives a command signal from the remote controller 6 and reads accordingly the start and end addresses of the old program to be overwritten from the program data $D_{PRX}$ in the register 44. With the video tape 36 forwarded up to the start address and stopped there, the video signal processing unit 2 records the new program as the video input signal S1 onto the video tape 36 through the recording circuit 32, the electromagnetic conversion circuit 83 and the magnetic head 34.

The amount of feed of the video tape 36 in recording mode is monitored by the control management data processing CPU 8 counting the number of the count mark signals $MK_X$ read from the control signal recording track TCT. When the count value coincides with the end address, the overwriting of the new program is terminated.

In the manner described, a new program is overwritten onto a precisely specified location of a recorded video tape 36 (i.e., onto the area between recording start point and recording end point).

With the format of FIG. 24 in use, the recording of programs on the video tape 36 is controlled as easily and reliably as with the format of FIG. 23.

(3) Other Embodiments of the Fifth Embodiment (3-1) In the embodiments comprising the formats of FIGS. 23 and 84, the management data $D_{AV}$ is recorded to the video recording tracks TA and TB while the mark signals representing the recording start point and recording end point of each program are recorded to the control signal recording track TCT on the tape. Alternatively, the same effect is obtained by recording the management data $D_{AV}$ to the tape top part of the audio recording tracks CH1 and CH2 or of the control signal recording track TCT.

The mark signals may also be recorded to the audio recording tracks CH1 and CH2 or to the video recording tracks TA and TB, and not to the control signal recording track TCT.

(3-2) In the embodiment of FIG. 24, the recording start point mark signals $MK_{P1S}$, $MK_{P2S}$, $MK_{P3S}$, etc., of the programs P1, P2, P3, etc., and the count mark signals $MK_X$ are recorded to the same recording track, i.e., to the control signal recording track TCT. Alternatively, the recording start point mark signals $MK_{P1S}$, $MK_{P2S}$, $MK_{P3S}$, etc., may be recorded to a recording track different from the one to which the count mark signals $MK_X$ are recorded.

(3-3) In the embodiment of FIG. 24, the mark signals of a predetermined code (i.e., of a fixed value) each are recorded as count mark signals $MK_X$ on the tape at intervals of the unit tape feed amount (or feed time). In reproduction mode, the count mark signals $MK_X$ are picked up and counted so that the current tape feed position or the recording end point is determined. Alternatively, the count mark signals $MK_X$ may be represented by numerical data which are incremented in keeping with the tape feed amount (or feed time) and which are generated illustratively by the control management data processing CPU 8. Then the numerical data may be recorded as the count mark signals $MK_X$.

In the above case, the consecutively recorded count mark signals $MK_X$ represent the tape feed amount (or feed time) relative to the recording start point. In this way, the recording end point is expressed in terms of the tape feed amount (or feed time) relative to the recording start point.

(3-4) In the embodiments of FIGS. 23 and 24, the data written to the start address item B1 and the end address item B2 of the program data $D_{PRX}$ (FIG. 6) are address values relative to the reference address position at the tape top, i.e., the absolute address values. Alternatively, in the embodiment of FIG. 24 in which the count mark signals $MK_X$ are a fixed value each, the number of the count mark signals $MK_X$ relative to the recording start point may be used instead.

Secondly, where an incremental value is used as the count mark signal $MK_X$ representing the tape feed amount (or feed time), the end address may be represented by the tape feed amount (or feed time) as it is given by the count mark signal $MK_X$ at the recording end point.

Thirdly, where the count mark signal $MK_X$ is represented by an incremental value recorded in keeping with the tape feed amount (or feed time), it is possible to utilize the difference in tape feed amount (or feed time) between the recording start point of the program and the recording end point thereof.

Fourthly, where the count mark signal $MK_X$ is represented by a fixed value, it is possible to use the number of the mark signals from the first mark signal at the tape top (i.e., the count mark signal $MK_X$, sometimes including the recording start point mark signal and the recording end point mark signal)up to the mark signal of the recording end point of the program.

(3-5) In the above embodiments, the start and end addresses are each represented by the data indicating a certain position on the video tape 36 relative to the reference address position at the tape top. Alternatively, the time at which each program was recorded may be used as the reference point relative to which the start and end addresses are determined.

When the preceding alternative is in use and the programs P1, P2, P3, etc., are recorded, the control data processing CPU 8 (FIG. 1) records to the control signal recording track TCT the recording start point mark signals $MK_{P1S}$, $MK_{P2S}$, $MK_{P3S}$, etc., in terms of the times of day at which the programs were recorded. Concurrently, in the embodiment of FIG. 23, the control management data processing CPU 8 records the recording end times as the recording end point mark signals $MK_{P1E}$, $MK_{P2E}$, $MK_{P3E}$, etc., at each recording end point; in the embodiment of FIG. 24, the control management data processing CPU 8 records a count mark signal $MK_X$ every time a certain period of time has elapsed relative to the recording time.

Figure 25:
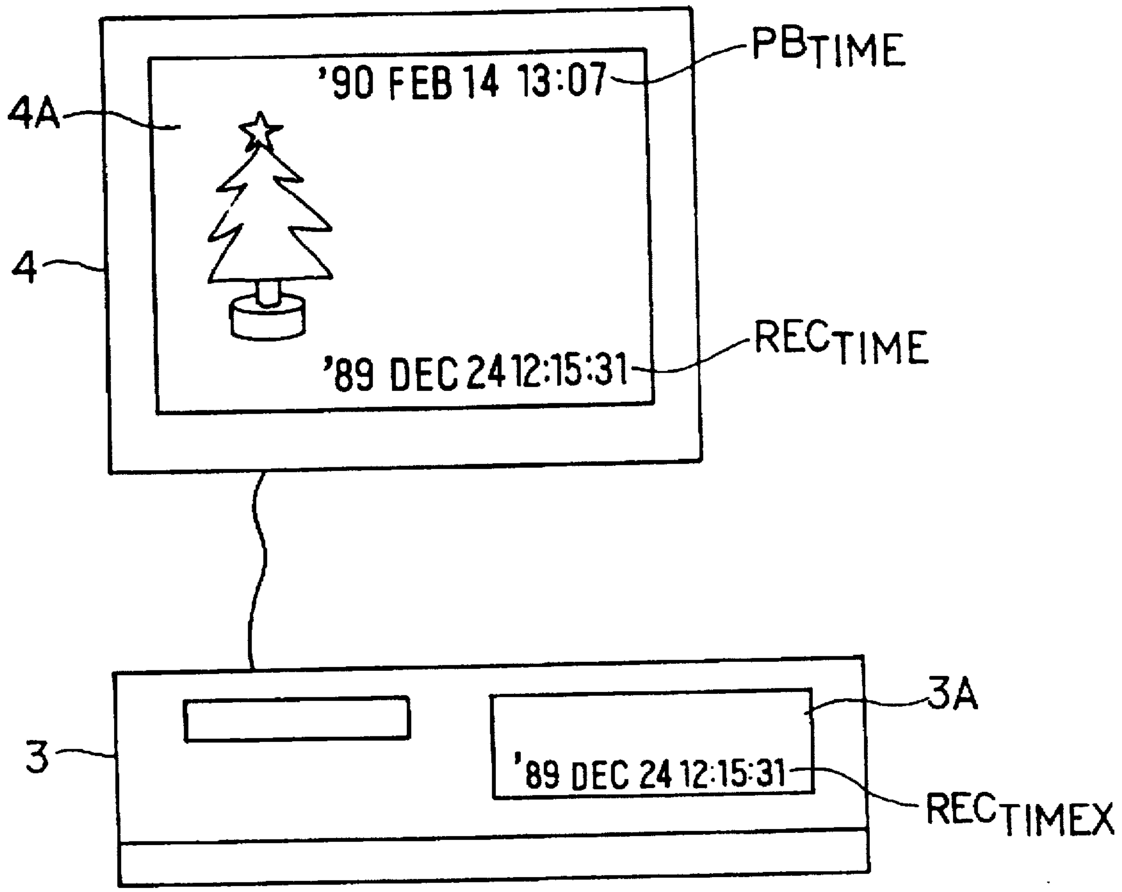
FIG. 25 is a front view of the monitor and the video tape recorder for use with the other embodiments.

After the programs P1, P2, P3, etc., have been recorded in the above manner, the recording start point mark signals $MK_{P1S}$, $MK_{P2S}$, $MK_{P3S}$, etc., and the recording end point mark signals $MK_{P1E}$, $MK_{P2E}$, $MK_{P3E}$, etc., are read from the control signal recording track TCT by the control management data processing CPU 8 and written to the start address item B1 and end address item B2 in the register 44 as the program data $D_{PRX}$ (FIG. 4). Thereafter, whenever the video cassette 35 is ejected, the program data is recorded onto the video tape 36 as the management data video signal $VD_{DAV}$ specific to that tape.

Where any of the programs recorded in the above-described manner in the video cassette 35 is reproduced, the following takes place: Loading the video cassette into the video tape recorder unit 3 causes the control management data processing CPU 8 to read the management data video signal $VD_{DAV}$ into the register 44. Thereafter, the user specifies one program to be reproduced. When the specified program starts being reproduced on the display screen 4A of the monitor 4, the control management data processing CPU 8 displays a recording time-of-day indication $REC_{TIME}$ for the program in, say, the bottom right corner of the display screen 4A.

Where a program starts to be reproduced in the embodiment of FIG. 25, the control management data processing CPU 8 presets the recording start time on a reproducing time counter and counts up the reproducing time while displaying the count value as the recording indication $REC_{TIME}$ on the screen.

Where a program is being reproduced in the embodiment of FIG. 24, the control management data processing CPU 8 reproduces the count mark signals $MK_X$ and displays the recording time indication $REC_{TIME}$ on the screen.

In the above embodiments, a recording time indication $REC_{TIMEX}$ whose contents are the same as those of the recording time indication $REC_{TIME}$ is displayed on the display device 3A of the video tape recorder unit 3. Concurrently, the current time indication $PB_{TIME}$ is displayed in the top right corner of the display screen 4A of the monitor 4.

Thus the setup of FIG. 25 makes it possible to display the time of day at which the currently viewed program was recorded while the program is being reproduced. This is yet another feature that may be implemented by the video tape recorder according to the invention.

[6] Sixth Embodiment (1) Recording of Index Data

Where one or a plurality of programs P1, P2, P3, etc., are recorded on the video tape 36, the control management data processing CPU 8 records data to the start address item B1 and end address item B2 of the program data $D_{PRX}$ (FIG. 6), the recorded data representing the recording start point and recording end point of each program in terms of a program start address value and a program end address value, respectively. Thereafter, if any program on the recorded video tape 36 is to be reproduced, overwritten or otherwise manipulated, the system recognizes the recorded position of the program without actually running the tape until that program is located.

The management data $D_{AV}$ that the user enters as needed is used to alter the contents if the volume data block $D_{VM}$ and to update the reproducing order data.

When the user operates the remote controller 7 to input each item of the management data $D_{AV}$ (FIG. 4) as the I/O data S4 through the remote control transceiver 7, the control management data processing CPU 8 places the input data into the register 44. Thereafter, when for example the video cassette 35 is ejected, management data recording mode is selected. In this mode, the control management data processing CPU 8 retains the management data $D_{AV}$ in the register 44 while transferring the data therefrom to the video recording encoder 51 as the write management data S25. In turn, the video recording encoder 51 converts the write management data S25 into the data video signal S42 which is supplied to the recording circuit 32 via the recording switchover circuit 31.

At this point, the recording circuit 32 handles the data video signal S42 in the same way as the recording video signal S1, and writes the management data $D_{AV}$ as a one-field video signal to the video recording tracks TA and TB (FIG. 3) on the video tape 36 through the video electromagnetic conversion circuit, part of the electromagnetic conversion circuit 33 as well as the video head, part of the magnetic head 34.

Figures 26A, 26B, 26C:
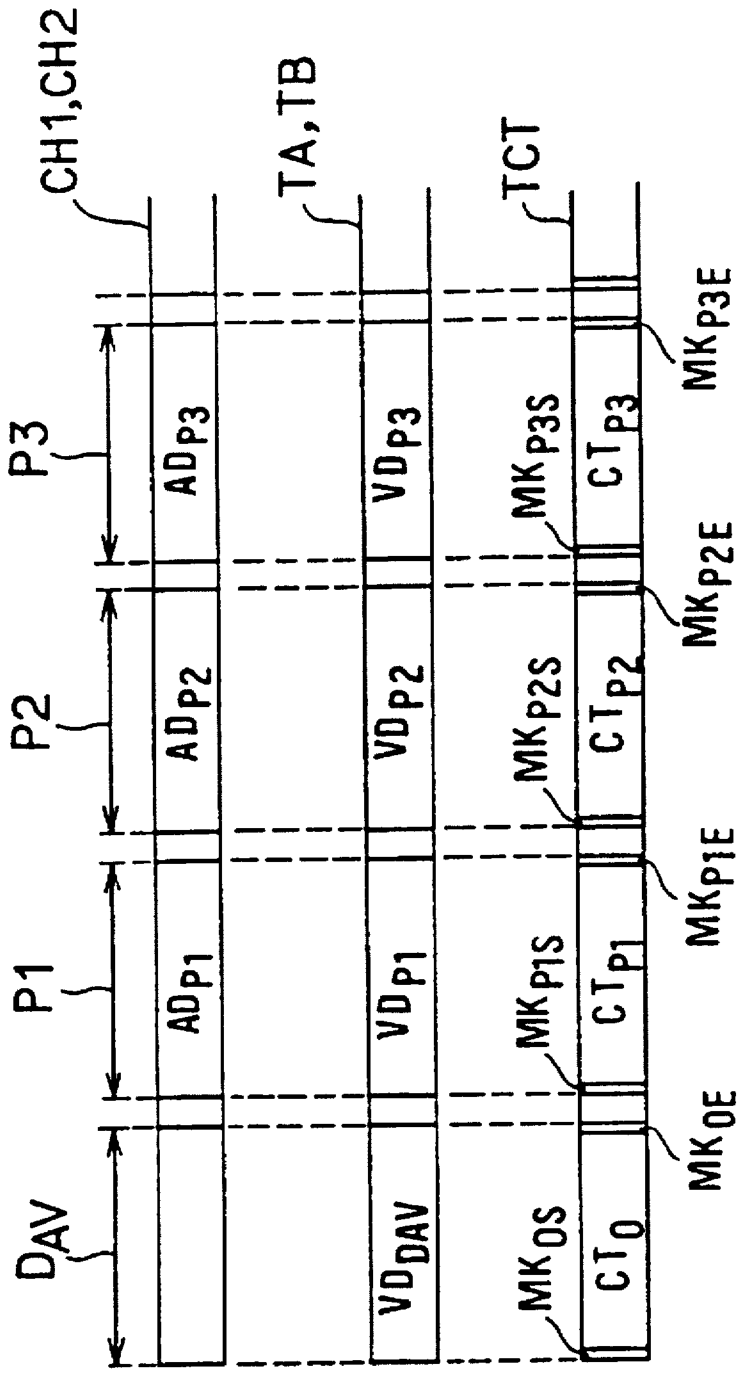
FIG. 26A–26C is a schematic diagram of the format of program start and end addresses for use with the embodiment.

In this manner, the management data base video track recording field $F_{AVV}$ (FIG. 3) is formed illustratively at the tape top part of the video tape 36. As shown in FIG. 26B, the management data video signal $VD_{DAV}$ is recorded to the management database video track recording field $F_{AVV}$.

In addition the control management data processing CPU 8 transfers the mark recording data as control signal recording data S44 to the CTL recording encoder/decoder 54. In turn, the CTL recording encoder/decoder 54 converts the management signal recording data S44 into the data control signal S46. The data control signal S46 is recorded as the recording start point mark signal $MK_{0S}$ (FIG. 26C) to the control signal recording track TCT of the video tape 36 through the control signal electromagnetic conversion circuit, part of the electromagnetic conversion circuit 33 as well as the control signal head, part of the magnetic head 34.

Thereafter, the control management data processing CPU 8 records the control signal $CT_0$ to the control signal recording track TCT by transferring the control signal as the management signal recording data S44. At the recording end point of the management data video signal $VD_{DAV}$ (FIG. 26B), the control management data processing CPU 8 once again supplies the control signal recording data S44 in order to record the recording end point mark signal $MK_{0E}$.

Before management data recording mode is selected, the control management data processing CPU 8 records, in program recording mode, the program video signals $VD_{P1}$, $VD_{P2}$, $VD_{P3}$, etc., of the programs P1, P2, P3, etc., to the video recording tracks TA and TB of the video signal recording field $F_{VD}$ (FIG. 3) which follows the management database video track recording field $F_{AVV}$. Concurrently, the control management data processing CPU 8 records the corresponding program audio signals $AD_{P1}$, $AD_{P2}$, $AD_{P3}$, etc., as well as the control signals $CT_{P1}$, $CT_{P2}$, $CT_{P3}$, etc., to the audio recording tracks CH1 and CH2 (FIG. 26A) as well as to the control signal recording track TCT (FIG. 26C), respectively.

In the above program recording mode, the control management data processing CPU 8 supplies the mark signal data as the control signal recording data S44 to the CTL recording encoder/decoder 54 in synchronization with the recording start points and recording end pints of the program video signals $VD_{P1}$, $VD_{P2}$, $VD_{P3}$, etc. This permits recording of the recording start point mark signals $MK_{P1S}$, $MK_{P2S}$, $MK_{P3S}$, etc., and the recording end point mark signals $MK_{P1E}$, $MK_{P2E}$, $MK_{P3E}$, etc., (FIG. 26C).

In this embodiment, the mark signals $MK_{0S}$ and $MK_{0E}$, $MK_{P1S}$ and $_{MKP1E}$, $MK_{P2S}$ and $MK_{P2E}$, $MK_{P3S}$ and $MK_{P3E}$, etc., are each constituted by a tape position address value relative to the reference point at the tap top of the video tape 36. The tape position address value is obtained illustratively by transferring the count value of the tape counter circuit in the video tape recorder unit 3 to the control management data processing CPU 8 via the mechanism control CPU 11.

Thus the mark signals $MK_{P1S}$, $MK_{P1E}$, $MK_{P2S}$ and $MK_{P2E}$ may be used as index data representing the start positions of the programs P1, P2, etc., the positions corresponding to the system program number B4 recorded in the management database video track recording field $F_{AVV}$. When the mark signals $MK_{P1S}$, $MK_{P1E}$, $MK_{P2S}$ and $MK_{P2E}$ are each counted from the reference point at the tape top, the system program numbers of the programs P1, P2, etc., recorded relative to the same reference point are detected.

In terms of reproduction order data, the system program numbers (FIG. 6) for consecutive reproduction are recorded from byte 1 to byte 32. When the user specifies and inputs a reproducing order, the system program numbers of the programs recorded in the current video cassette are recorded in the specified order from byte 1 onward in management data recording mode.

If the user does not input any reproducing order, the system program numbers of the programs recorded in the current video cassette are recorded in the originally recorded order from byte 1 on in management data recording mode.

Where it is desired to record a plurality of programs continuously and the user specifies the order in which to reproduce these programs later, management data recording mode is selected and the system program numbers from byte 1 are replaced by those of the programs to be recorded to the current video cassette in the specified order. If the user does not specify and reproducing order, the system program numbers following the last reproducing order data in effect before the update are recorded as the reproducing order data for the newly recorded programs.

Concurrently, where a plurality of programs are recorded continuously, the control management data processing CPU 8 enters management data recording mode and alters the repeat recording count item A2, date of update item A6, etc.

As described, it is possible to determine the reproducing order based on the reproducing order data specified beforehand upon recording of programs. For example, if a plurality of programs constituting a serial drama are recorded in a random order on one tape, the order in which to reproduce these programs later may be specified in advance.

Thus, recorded programs are easily reproduced in a predetermined order using the start address data item B1 for each program and the mark signals $MK_{P1S}$, $MK_{P1E}$, $MK_{P2S}$ and $MK_{P2E}$ in addition to the reproducing order data. This feature boosts the level of convenience which the video tape recorder 1 provides.

(2) Program Reproducing Mode

As described with reference to FIG. 8, when the user selects "auto reproducing" item in the management data list on the display screen in step SP21, the control management data processing CPU 8 enters program reproducing mode and executes auto reproducing processing in step SP31.

That is, when the recorded video cassette 35 is loaded into the video tape recorder unit 3, the control management data processing CPU 8 enters management database reproducing mode while maintaining communication with the mechanism control CPU 11. In management database reproducing mode, the control management data processing CPU 8 picks up the data video signal from the management database video track recording field $F_{AVV}$ of the video tape 36, and writes the signal to the register 44, the picked-up signal being forwarded through the magnetic head 34, the video electromagnetic conversion circuit 33, the reproducing circuit 37, the reproducing switchover circuit 38 and the video recording decoder 52.

In this manner, the register 44 retains the management data $D_{AV}$ (FIG. 4) as the data specific to the current video tape 36. Thus both the reproducing order data and the program data $D_{PRX}$ (FIG. 8) about the programs P1, P2, P3, etc., are retained.

In the manner described, the register 44 constitutes an arrangement of concentrated control over program positions on a video tape, with the start address item B1 and the end address item B2 of the program data $D_{PRX}$ containing positional data representing the recording start points and recording end points $MK_{P1S}$ and $MK_{P1E}$, $MK_{P2S}$ and $MK_{P2E}$, $MK_{P3S}$ and $MK_{P3E}$, etc., of the programs P1, P2, P3, etc., each point being an address indicating the start or end position of a given program on the video tape 36 relative to the reference point at the tape top.

Figure 27A:
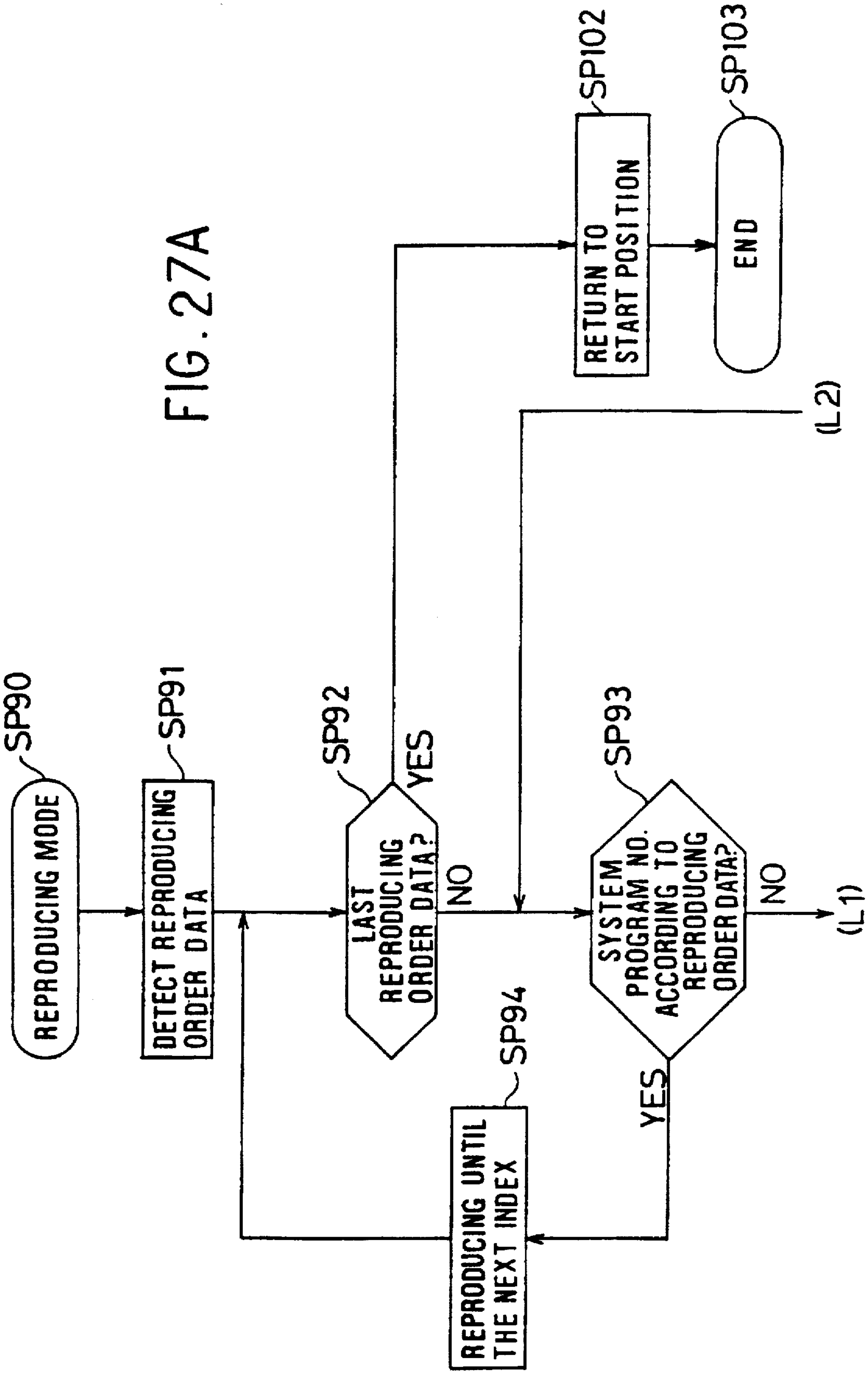
FIG. 27A–27B is a flowchart of the steps carried out while program reproduction mode is in effect.
Figure 27B:
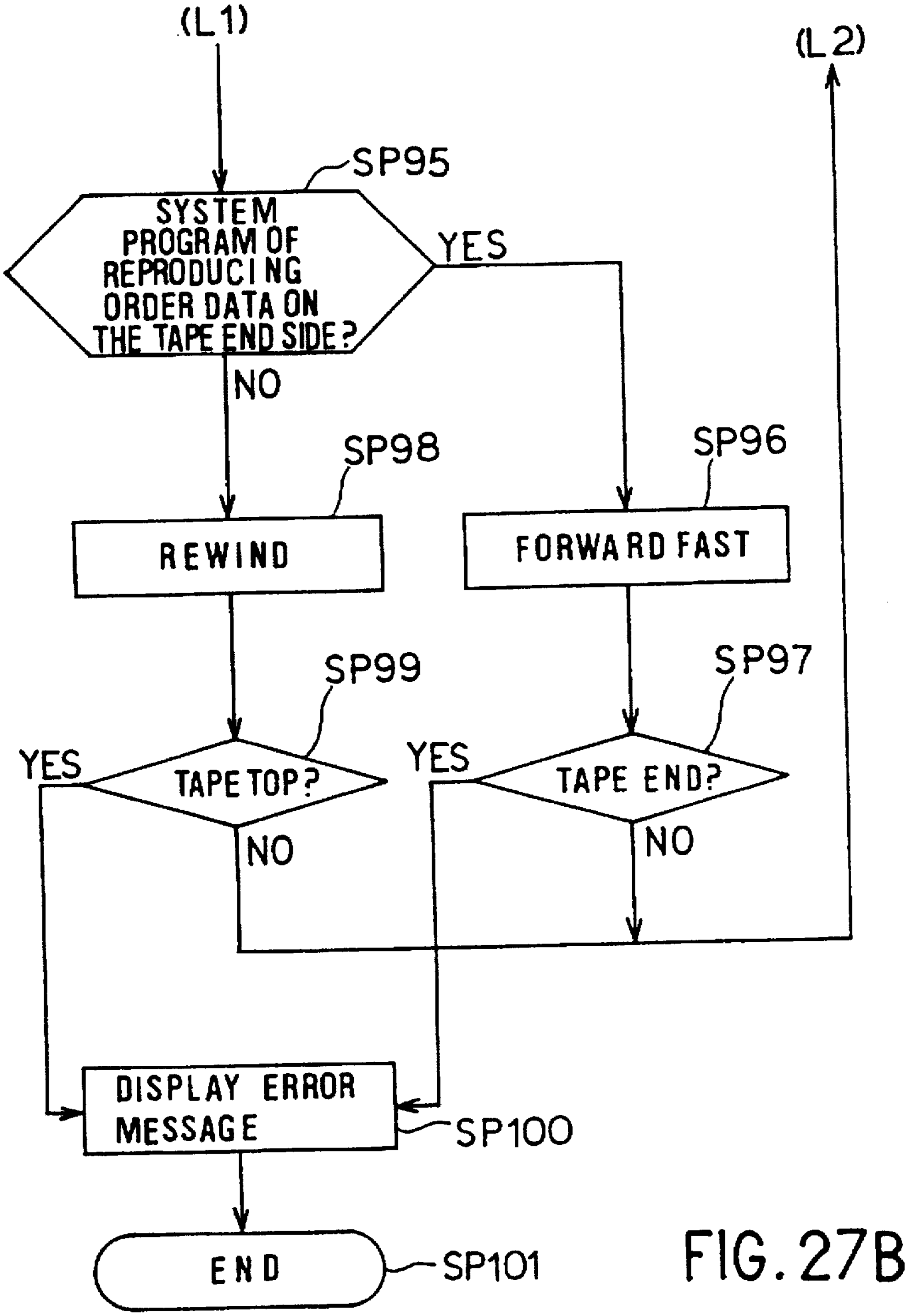
Figure 29:
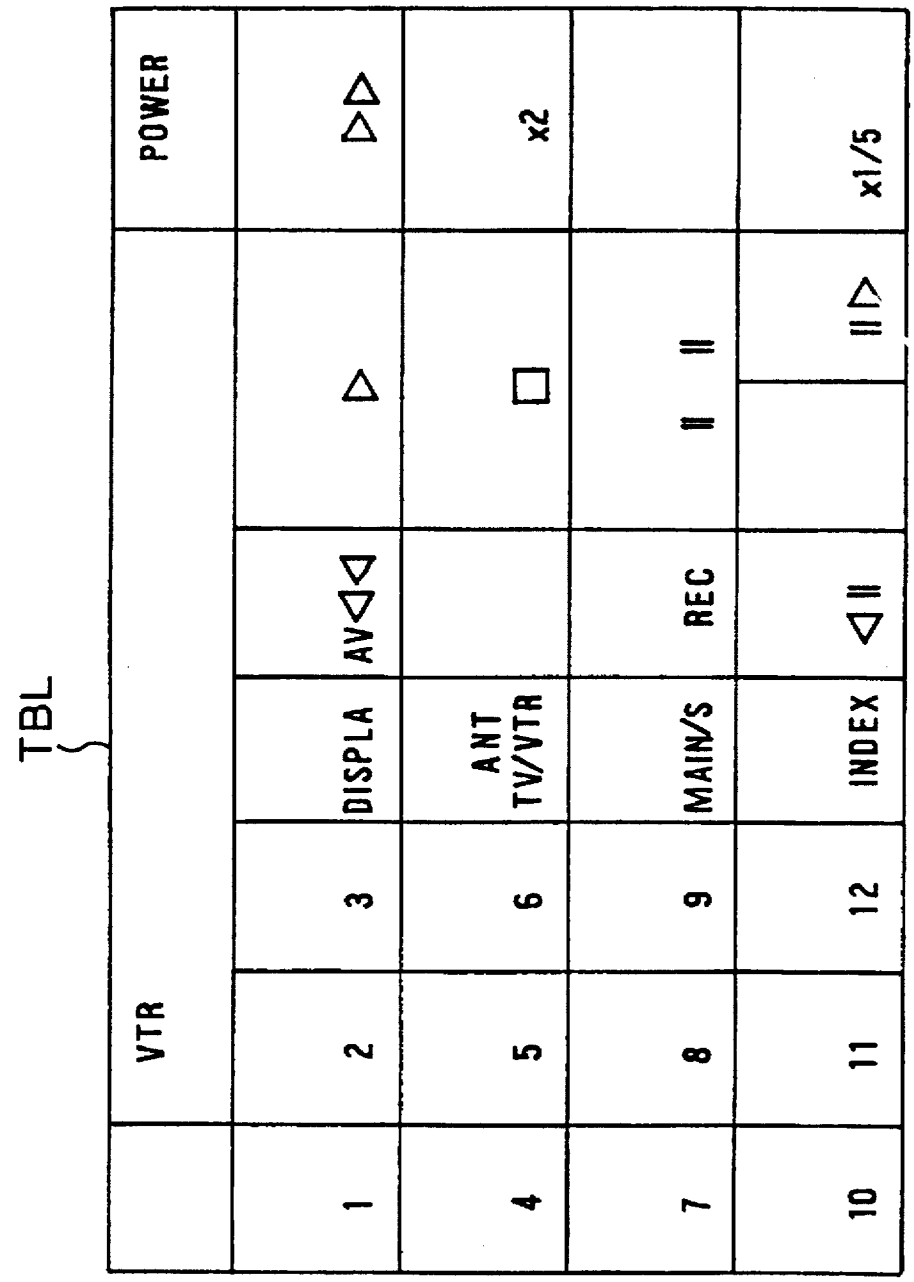
Figure 30:
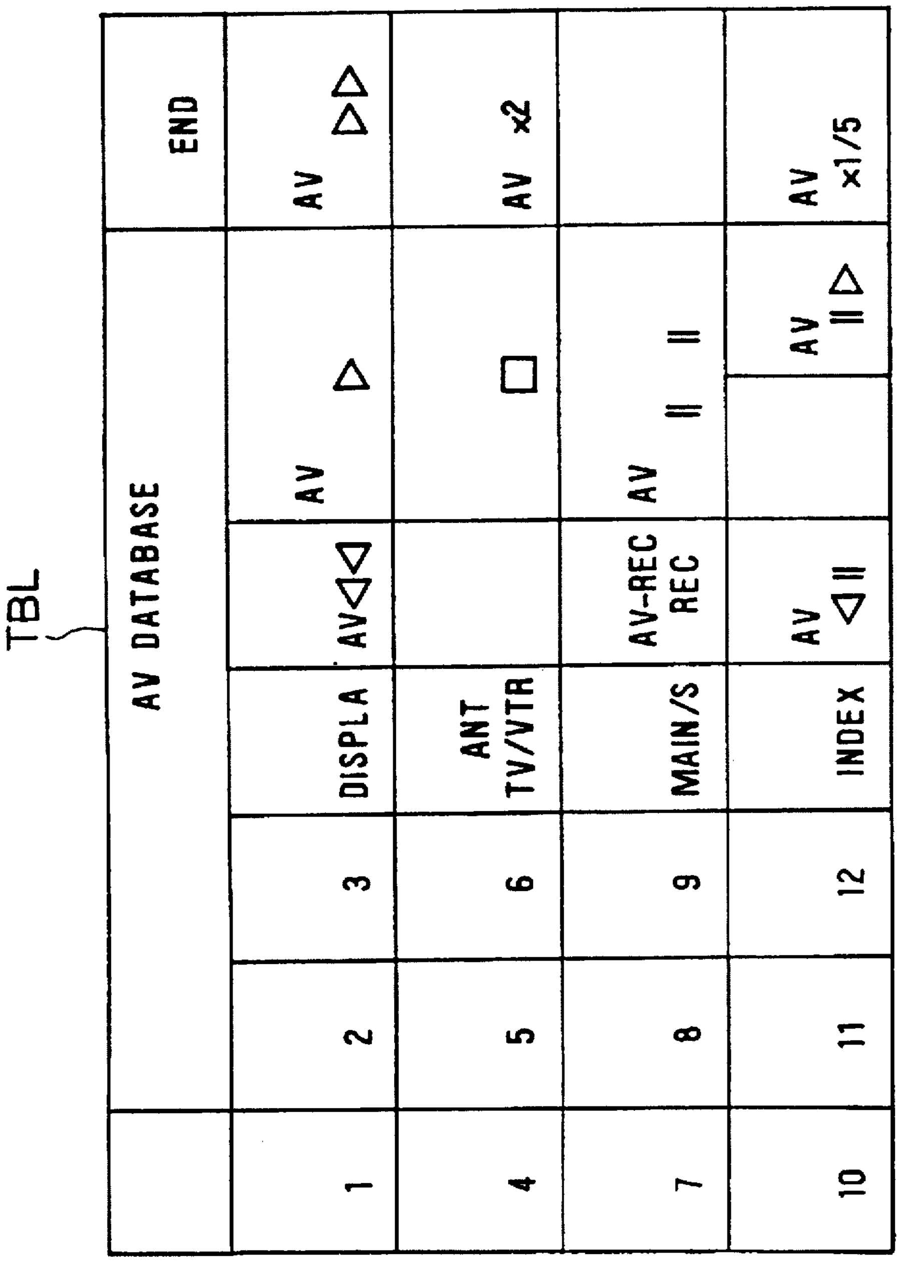
Figure 31:
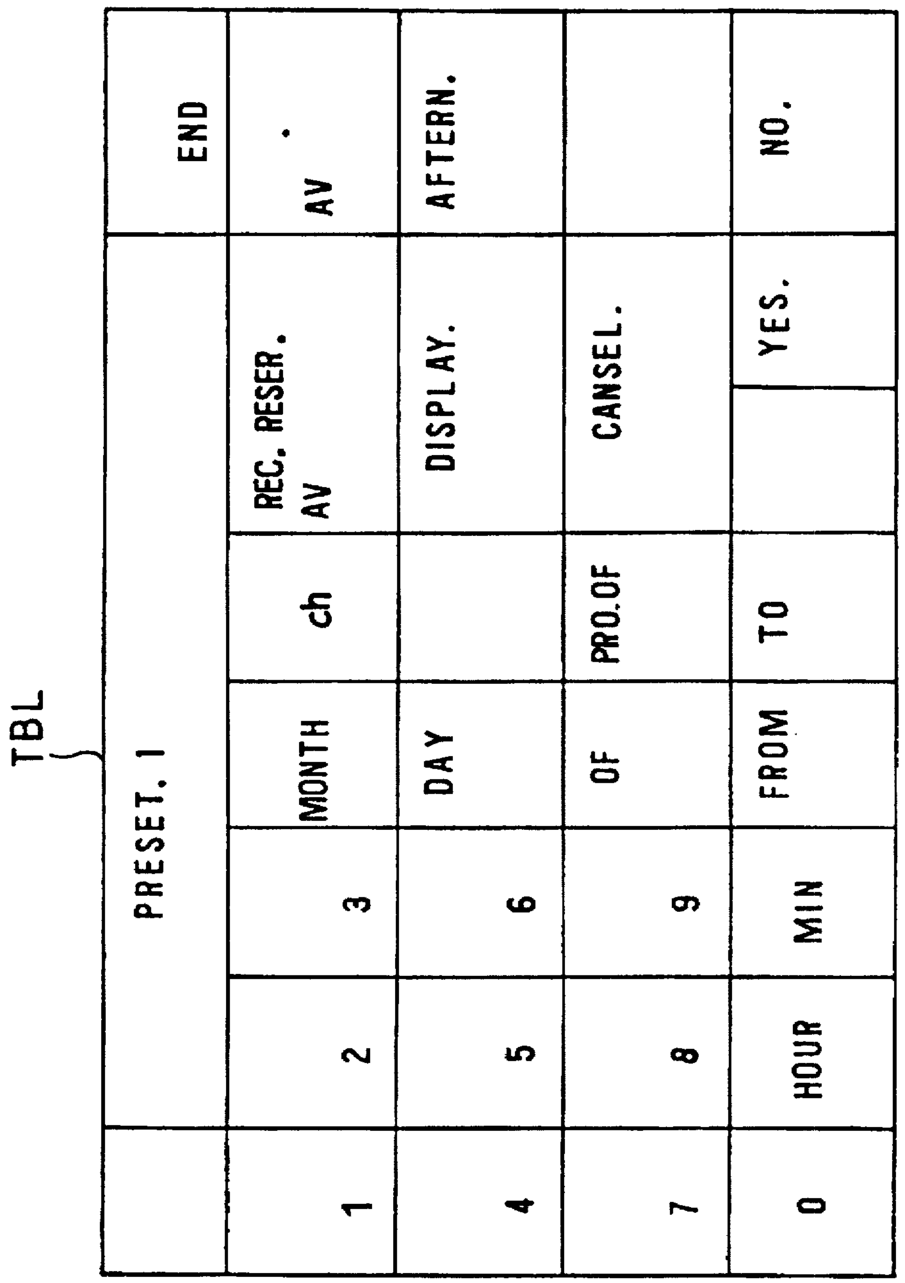

As illustrated in FIG. 27, the CPU 8 in program reproducing mode moves from step SP90 to step SP91. After detecting the system program numbers using the reproducing order data in the register 44, the CPU 8 detects the start address of the specified system program number.

Upon start of program reproducing, the CPU 8 detects the system program number recorded in byte 1 of the reproducing order data.

The CPU 8 then goes to step SP92 in which a check is made to see if the system program number is specified in the reproducing order data.

Because the system program number is detected in byte 1 of the reproducing order data upon start of program reproducing, the CPU 8 goes to step SP93. In step SP93, the CPU 8 outputs the control data S6 to the mechanism control CPU 11 over the bus 10, whereby the video tape recorder 1 is switched to reproducing mode.

When the mark signal $MK_{P1S}$ is detected, the CPU 8 checks to see if the program recorded following the mark signal $MK_{P1S}$ is the program represented by the system program number recorded in byte 1. If the result of the check is affirmative, step SP94 is reached.

Thereafter, the CPU 8 remains in reproducing mode until the next mark signal $MK_{P1S}$ is detected. At that point, the CPU goes to step SP92.

Where a program recorded on the tape top side is specified to be reproduced first, the CPU 8 carries out steps SP92, SP93 and SP94. These steps cause the video tape recorder 1 to reproduce the program.

After detecting the system program number recorded in the reproducing order data that follows, the CPU 8 goes to step SP93 via step SP92.

If the system program number of the program located on the tape top side is not recorded in byte 1 of the reproducing order data, or if a program recorded on the tape top side is specified to be reproduced first, followed by another program whose system program number is specified in the reproducing order data that follows, the result of the check by the CPU 8 in step SP93 is negative. In that case, the CPU 8 goes to step SP95.

In step SP95, the CPU 8 checks to see if the system program number of the program to be reproduced next is on the tape end side. If the result of the check is affirmative, the CPU 8 goes to step SP96. In step SP96, the CPU 8 forwards fast the video tape 36 until the mark signal $MK_{P2S}$ is detected. The CPU 8 then goes to step SP97.

In step SP97, the CPU 8 checks to see if the tape end is reached. If the result of the check is negative, the CPU 8 goes to step SP93. In step SP93, the CPU 8 checks to see if the current number is the system program number specified in the reproducing order data.

As described, where a program on the tape top side is reproduced first, followed by another program reached by skipping the program or programs immediately following the first, or where a program or programs on the tape top side are skipped for reproduction of a subsequent program, the CPU 8 goes through the steps SP93, SP95, SP96, SP97 and back to SP93, repeatedly. When the check in step SP93 reveals that the current number is the system program number specified in the reproducing order data, the programs are reproduced one after another in the order specified beforehand.

If the result of the check in step SP95 is negative, the CPU 8 goes to step SP98. In step SP98, contrary to what took place in step SP97, the video tape 36 is rewound until the mark $MK_{P2S}$ is detected. Then the CPU 8 checks in step SP99 to see if the tape top is reached.

If the result of the check in step SP99 is negative, the CPU 8 goes to step SP93 and again checks to see if the number is the system program number specified in the reproducing order data.

If the check in step SP93 reveals that the system program number of the already reproduced program is again specified for reproduction, the system goes to step SP94. In step SP94, the CPU 8 again reproduces the program.

If the system program number of a program recorded on the tape top side is specified following the already reproduced program, the result of the check in step SP93 is negative. The CPU 8 then goes to step SP95.

As described, where the system program number of a program recorded on the tape top side is specified following an already reproduced program, the CPU goes through steps SP93, SP95, SP98, SP99 and back to SP93, repeatedly. When the result of the check in step SP93 is positive for the system program number specified in the reproducing order data, the video tape 36 is rewound for reproduction of each program in the order specified in advance.

With the above steps repeated as needed, it is possible to reproduce one program repeatedly or to reproduce a plurality of randomly recorded programs in the correct broadcast order according to the order specified in the reproducing order data.

If the system program number of any program not recorded in the current video cassette 35 is specified inadvertently, the CPU 8 goes to step SP100 following the affirmative result obtained in step CP97 or SP99.

At this point, the CPU 8 displays an error message on the monitor 4 as well as on the display screen 6A of the remote control 6. The CPU 8 then goes to step SP101 and terminates the processing.

From then on, the CPU 8 waits for an input by the user from the remote controller 6 or from the keyboard 12.

When the programs of the system program numbers specified in the reproducing order data have all been reproduced, the result of the check in step SP92 causes the CPU 8 to go to step SP102.

In step SP102, the CPU 8 outputs the control data S6 to the mechanism control CPU 11 over the bus 10, rewinds or forwards fast the video tape 36 to the program reproducing start position, and goes to step SP103 where the processing is terminated.

The setup described above records to the tape top the reproducing order data of the programs recorded in the video cassette. Because the programs are reproduced without user intervention in a predetermined order according to the reproducing order data, the video tape recorder according to the invention is more convenient to use.

(3) Other Embodiments of the Sixth Embodiment (3-1) In the above embodiment of FIGS. 27 and 28, the output management data $D_{AV}$ is recorded to the management database video track recording field $F_{AVV}$, the management database audio track recording field $F_{AVA}$ and the management signal recording track on the video tape 36. Alternatively, the same effect is obtained by recording the management data to one of these recording portions on the tape.

(3-2) In the above embodiment of FIGS. 27 and 28, the beginnings of the programs are detected with reference to the mark signals $MK_{P1S}$, $MK_{P1E}$, $MK_{P2S}$ and $MK_{2E}$. Alternatively, the beginnings of the programs may be detected by referring to the start address item B1 of the program data.

(3-3) In the above embodiment of FIGS. 27 and 28, the recording-related data is input from the remote controller 6 by use of the language-based input item table TBL shown in FIG. 11. Alternatively, the data may be input by many other methods.

(3-4) In the embodiment of FIGS. 27 and 28, the invention is applied to a video tape recorder.

Alternatively, the invention may be applied likewise to a radio-equipped tape cassette recorder which is preset to record audio signals.

(3-5) In the embodiment of FIGS. 27 and 28, the management data $D_{AV}$ comprises the volume data block $D_{VM}$ and program data block $D_{PR}$ written in that order from the beginning of the recording tracks. Alternatively, the blocks may be switched between their positions, subdivided into further blocks for different arrangements, or otherwise allocated on the tape.

[7] Seventh Embodiments (1) In the above-described embodiment, the management data $D_{AV}$ when output is recorded into both the management database video track recording fielield $F_{AVV}$ and the management database audio track recording field $F_{AVA}$ on the video tape 36. Alternatively, the same effect is obtained by recording the management data into either of these two fields.

(2) In the above embodiment, the language-based input item table TBL of FIG. 11 is used to input recording data from the remote controller 6. Alternatively, the display screen 6A of the remote controller 6 may carry an LCD panel capable of displaying three lines of data in each item field, as shown in FIG. 28. The normal operation mode setting key 6D, the management database mode setting key 6F, the first preset operation mode setting key 6G and the second preset operation mode setting key 6H are operated to have, respectively, the displays in FIGS. 29, 30, 31 and 32. In this arrangement, common fields may be used to input presetting data of different operation modes.

(3) In the above embodiment, the invention is applied to a video tape recorder. Alternatively, the invention may also be applied to appliances such as radio cassette recorders designed to preset the recording of audio signals.

(4) In the above embodiment, the management data $D_{AV}$ comprises the volume data block $D_{VM}$ and program data block $D_{PR}$ written in that order from the beginning of the recording track. Alternatively, the blocks may be switched between their positions, subdivided into further blocks for different arrangements, or otherwise allocated on the tape.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A video tape recorder for recording at least one program on a video tape, comprising:

recording/reproducing means for recording and reproducing signals on the video tape;

input means for receiving said at least one program;

display means for providing a display to a user;

user command input means for receiving recording commands from a user; and control means for controlling the recording of said at least one program on said video tape by said recording/reproducing means;

said control means being operative to control said recording/reproducing means to record management data in a management database recording field formed at a predetermined position on said video tape, said management data including recording control data for subsequent display to a user carrying out a recording command input for indicating a recording condition of said video tape;

said control means being operative to control said recording/reproducing means to record data indicating an unused recording capacity of said video tape and to control said recording/reproducing means to record on said video tape data indicating a total number of programs recorded on said video tape and data identifying at least an identity and a total number of programs reserved to be recorded thereon as at least a portion of said data indicating an unused recording capacity of said video tape;

said control means being operative to control said recording/reproducing means to reproduce said recording control data from said management database recording field of said video tape and to control said display means to display a recording condition of said video tape based on the reproduced recording control data;

said user command input means being operative to input recording commands from a user responding to the display of said recording condition;

said control means being further operative to control the recording of said at least one program based on said recording commands.

2. The video tape recorder of claim 1, wherein said control means is operative to control said recording/reproducing means to record data indicating whether said at least one program has been recorded.

3. The video tape recorder of claim 1, wherein said control means is operative to control said recording/reproducing means to record data indicating whether said at least one program has been recorded completely.

* * * * *